United States Patent
Jeong et al.

(10) Patent No.: US 9,204,176 B2
(45) Date of Patent: Dec. 1, 2015

(54) DIGITAL BROADCAST TRANSMITTER, DIGITAL BROADCAST RECEIVER, AND METHOD FOR CONSTRUCTING AND PROCESSING STREAMS FOR SAME

(75) Inventors: Jin-hee Jeong, Yongin-si (KR); Hak-ju Lee, Incheon (KR); Yong-Sik Kwon, Suwon-si (KR); Kum-ran Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 307 days.

(21) Appl. No.: 13/697,682

(22) PCT Filed: May 13, 2011

(86) PCT No.: PCT/KR2011/003564
§ 371 (c)(1),
(2), (4) Date: Nov. 13, 2012

(87) PCT Pub. No.: WO2011/142630
PCT Pub. Date: Nov. 17, 2011

(65) Prior Publication Data
US 2013/0058359 A1 Mar. 7, 2013

Related U.S. Application Data

(60) Provisional application No. 61/334,228, filed on May 13, 2010.

(51) Int. Cl.
*H04J 3/16* (2006.01)
*H04N 21/2381* (2011.01)
*H04H 60/07* (2008.01)
*H04N 21/2383* (2011.01)
*H04N 21/438* (2011.01)

(52) U.S. Cl.
CPC .......... *H04N 21/2381* (2013.01); *H04H 60/07* (2013.01); *H04N 21/2383* (2013.01); *H04N 21/4382* (2013.01)

(58) Field of Classification Search
None
See application file for complete search history.

(56) References Cited

U.S. PATENT DOCUMENTS 6,353,637 B1 * 3/2002 Mansour et al. .............. 375/260
6,799,294 B1 * 9/2004 Chung et al. .................. 714/786
6,874,115 B1 * 3/2005 Laneman et al. .............. 714/758
6,931,372 B1 * 8/2005 Sinha et al. ................... 704/229

(Continued)

OTHER PUBLICATIONS

International Search Report dated Dec. 12, 2011 from the International Searching Authority in counterpart application No. PCT/KR2011/003564.

(Continued)

*Primary Examiner* — Phirin Sam
(74) *Attorney, Agent, or Firm* — Sughrue Mion, PLLC

(57) ABSTRACT

Provided are a digital broadcast transmitter, a digital broadcast receiver, a method for processing a stream of the transmitter, and a method for processing a stream of the receiver. The method of processing the stream of the transmitter includes: generating a stream in which a plurality of slots of different formats is consecutively arranged; and encoding and interleaving the generated stream, and outputting the encoded and interleaved stream as a transport stream, wherein the generating the stream includes arranging at least one of second mobile data, training data, and dummy data in an orphan region generated according to a difference of the formats between consecutive slots of the plurality of slots.

22 Claims, 65 Drawing Sheets

(56) References Cited

U.S. PATENT DOCUMENTS

| | | | |
|---|---|---|---|
| 8,077,744 B2* | 12/2011 | Song et al. | 370/477 |
| 2006/0239636 A1* | 10/2006 | Sugiyama et al. | 386/44 |
| 2006/0244865 A1 | 11/2006 | Simon | |
| 2008/0069147 A1 | 3/2008 | Lee et al. | |
| 2010/0029320 A1* | 2/2010 | Malladi et al. | 455/522 |
| 2010/0054361 A1 | 3/2010 | Yu et al. | |
| 2010/0064323 A1 | 3/2010 | Song et al. | |
| 2011/0158338 A1* | 6/2011 | Choi et al. | 375/265 |
| 2012/0023522 A1* | 1/2012 | Anderson et al. | 725/35 |

OTHER PUBLICATIONS

Written Opinion dated Dec. 12, 2011 from the International Searching Authority in counterpart application No. PCT/KR2011/003564.

* cited by examiner

FIG. 41

| Type 1 |
|---|
| Type 0 |
| Type 0 |
| Type 0 |
| Type 1 |
| Type 0 |
| Type 0 |
| Type 0 |
| Type 1 |
| Type 0 |
| Type 0 |
| Type 0 |

FIG. 42

DIGITAL BROADCAST TRANSMITTER, DIGITAL BROADCAST RECEIVER, AND METHOD FOR CONSTRUCTING AND PROCESSING STREAMS FOR SAME

CROSS-REFERENCE TO RELATED APPLICATIONS

This application is a National Stage application under 35 U.S.C. §371 of PCT/KR2011/003564 filed on May 13, 2011, which claims the benefit of U.S. Provisional Application No. 61/331,228, filed on May 13, 2010 in the United States Patent and Trademark Office, the disclosure of which is incorporated herein by reference in its entirety.

BACKGROUND

1. Field

Apparatuses and methods consistent with exemplary embodiments relate to a digital broadcast transmitter, a digital broadcast receiver, and methods for constructing and processing streams thereof, and more particularly, to a digital broadcast transmitter for generating and transmitting a transport stream including normal data and mobile data, a digital broadcast receiver for receiving and processing the transport stream, and methods thereof.

2. Description of the Related Art

As digital broadcasting is propagated, various electronic devices support a digital broadcast service. In particular, recently, other than devices such as a digital broadcast TV and a set-top box in the house, portable devices of the individual, for example, a mobile phone, a navigation device, a personal digital assistant (PDA), a portable multimedia player (e.g., an MP3 player), etc., have a function for supporting the digital broadcast service.

Hence, digital broadcast standards for providing the digital broadcast service to the portable devices are under discussion.

Among them, an ATSC-Mobile/Handheld (MH) standard has been discussed. The ATSC-MH standard describes a technique for placing and transmitting mobile data in a transport stream for carrying data for a related art digital broadcast service, that is, normal data.

Since the mobile data is data received and processed by the portable device, the mobile data is processed robustly against errors, compared to the normal data, because of the mobility of the portable device and is included in a transport stream (TS).

FIG. 1 is a diagram of an example of a TS including the mobile data and the normal data.

Section (A) of FIG. 1 depicts the stream in which the mobile data and the normal data each are placed and multiplexed in their allocated packets.

The stream of section (A) of FIG. 1 is converted to a stream of section (B) of FIG. 1 through interleaving. Referring to section (B) of FIG. 1, mobile data (MH) can be divided to a region A and a region B according to the interleaving. The region A indicates a region within a certain range based on aggregation of the mobile data over a certain size in a plurality of transmission units, and the region B indicates a region excluding the region A. The division into the region A and the region B is merely exemplary, and may be differently divided in some cases. That is, in section (B) of FIG. 1, the portion not including the normal data may be set to the region A, and the portion corresponding to the transmission unit including the normal data may be set to the region B.

Meanwhile, compared to the region A, the region B is relatively vulnerable to error. That is, the digital broadcast data can include known data, for example, a training sequence which is properly demodulated and equalized by a receiver for error correction. According to the related art ATSC-MH standard, the region B does not include the known data and thus is vulnerable to the error.

Due to the stream structure of FIG. 1, the transmission of the mobile data can be limited. That is, while broadcasting stations and devices supporting the mobile broadcast service gradually increase, efficiency degradation of the stream occurs because the portion allocated to the normal data is unavailable in the stream as constructed in FIG. 1.

Hence, a technique for efficiently using the structure of the transport stream is demanded.

SUMMARY

Aspects of one or more exemplary embodiments provide a digital broadcast transmitter, a digital broadcast receiver, and methods for constructing and processing streams thereof, for diversifying transmission efficiency of mobile data and enhancing reception performance of a transport stream by variously utilizing a packet allocated to normal data in the transport stream.

According to an aspect of an exemplary embodiment, there is provided a stream processing method of a digital broadcast transmitter, the stream processing method including: generating a stream in which a plurality of slots of different formats is consecutively arranged; encoding and interleaving the stream, and outputting the encoded and interleaved stream as a transport stream.

The generating the steam may include arranging at least one of new mobile data, training data, and dummy data in an orphan region generated because of a difference of the format between the consecutive slots.

The orphan region may be one of a first type orphan region generated in a head portion of an SFCMM slot when a CMM slot and the SFCMM slot of a block extension mode is 01, are consecutively arranged or when a full main slot comprising only the normal data and the SFCMM slot of the block extension mode 01 are consecutively arranged, a second type orphan region generated in a tail portion of the CMM slot when the SFCMM slot of the block extension mode 01 and the CMM slot are consecutively arranged, and a third type orphan region generated in a body portion of the full main slot when the SFCMM slot of the block extension mode 01 and the full main slot comprising only the normal data are consecutively arranged.

The CMM slot may be a slot which arranges existing mobile data in a first region allocated for the existing mobile data and arranges the normal data in a second region allocated for the normal data, and the SFCMM slot may be a slot which arranges the new mobile data according to a set mode, in at least part of the whole region covering the first region and the second region.

The generating the stream may include, when the new mobile data is placed in the orphan region, adding signaling data regarding presence and a type of the new mobile data placed in the orphan region, to the stream.

The encoding the stream may include, when the training data is placed in the orphan region, initializing a trellis encoder according to the training data and then trellis-encoding the training data portion.

According to an aspect of another exemplary embodiment, there is provided a digital broadcast transmitter including: a stream generator for generating a stream in which a plurality of slots of different formats is consecutively arranged; and an exciter for encoding and interleaving the stream, and outputting as a transport stream.

The stream generator may arrange at least one of new mobile data, training data, and dummy data in an orphan region generated by a difference of the format between the consecutive slots.

The orphan region may be one of a first type orphan region generated in a head portion of an SFCMM slot when a CMM slot and the SFCMM slot of a block extension mode is 01, are consecutively arranged or when a full main slot comprising only the normal data and the SFCMM slot of the block extension mode 01 are consecutively arranged, a second type orphan region generated in a tail portion of the CMM slot when the SFCMM slot of the block extension mode 01 and the CMM slot are consecutively arranged, and a third type orphan region generated in a body portion of the full main slot when the SFCMM slot of the block extension mode 01 and the full main slot comprising only the normal data are consecutively arranged.

The CMM slot may be a slot which arranges existing mobile data in a first region allocated for the existing mobile data and arranges the normal data in a second region allocated for the normal data, and the SFCMM slot may be a slot which arranges the new mobile data according to a set mode, in at least part of the whole region covering the first region and the second region.

When the new mobile data is placed in the orphan region, the stream generator may add signaling data relating to presence and a type of the new mobile data placed in the orphan region, to the stream.

When the training data is placed in the orphan region, the exciter may initialize a trellis encoder according to the training data and then trellis-encode the training data portion.

According to an aspect of another exemplary embodiment, there is provided a stream processing method of a digital broadcast receiver, the stream processing method including: receiving a transport stream encoded and interleaved while a plurality of slots of different formats is consecutively arranged; demodulating the transport stream; equalizing the demodulated transport stream; and decoding the new mobile data from the equalized stream.

The transport stream may include an orphan region generated by a difference of the formats between the consecutive slots, and at least one of new mobile data, training data, and dummy data can be placed in the orphan region.

The orphan region may be one of a first type orphan region generated in a head portion of an SFCMM slot when a CMM slot and the SFCMM slot of a block extension mode is 01, are consecutively arranged or when a full main slot comprising only the normal data and the SFCMM slot of the block extension mode 01 are consecutively arranged, a second type orphan region generated in a tail portion of the CMM slot when the SFCMM slot of the block extension mode 01 and the CMM slot are consecutively arranged, and a third type orphan region generated in a body portion of the full main slot when the SFCMM slot of the block extension mode 01 and the full main slot comprising only the normal data are consecutively arranged.

The CMM slot may be a slot which arranges existing mobile data in a first region allocated for the existing mobile data and arranges the normal data in a second region allocated for the normal data, and the SFCMM slot is a slot which arranges the new mobile data according to a set mode, in at least part of the whole region covering the first region and the second region.

The stream processing method may further include identifying presence and a type of data in the orphan region by decoding signaling information.

According to an aspect of another exemplary embodiment, there is provided a digital broadcast receiver including: a receiver for receiving a transport stream encoded and interleaved while a plurality of slots of different formats are consecutively arranged; a demodulator for demodulating the transport stream; an equalizer for equalizing the demodulated transport stream; and a decoder for decoding the new mobile data from the equalized stream.

The transport stream may include an orphan region generated by a difference of the format between the consecutive slots, and at least one of new mobile data, training data, and dummy data can be placed in the orphan region.

The orphan region may be one of a first type orphan region generated in a head portion of an SFCMM slot when a CMM slot and the SFCMM slot of a block extension mode is 01, are consecutively arranged or when a full main slot comprising only the normal data and the SFCMM slot of the block extension mode 01 are consecutively arranged, a second type orphan region generated in a tail portion of the CMM slot when the SFCMM slot of the block extension mode 01 and the CMM slot are consecutively arranged, and a third type orphan region generated in a body portion of the full main slot when the SFCMM slot of the block extension mode 01 and the full main slot comprising only the normal data are consecutively arranged.

The CMM slot may be a slot which arranges existing mobile data in a first region allocated for the existing mobile data and arranges the normal data in a second region allocated for the normal data, and the SFCMM slot can be a slot which arranges the new mobile data according to a set mode, in at least part of the whole region covering the first region and the second region.

The digital broadcast receiver may further include a signaling decoder for identifying presence and a type of data in the orphan region by decoding signaling information.

According to aspects of one or more exemplary embodiments, since the transport stream is constructed and transmitted in various forms, the receiver can receive various mobile data.

BRIEF DESCRIPTION OF THE DRAWINGS

The above and other features and advantages will become more apparent by describing in detail exemplary embodiments with reference to the attached drawings in which:

FIGS. 41 through 43 are diagrams of various slots repeatedly arranged in sequence, according to exemplary embodiments;

CONSTRUCTION AND OPERATION OF THE INVENTION

Figure 1:
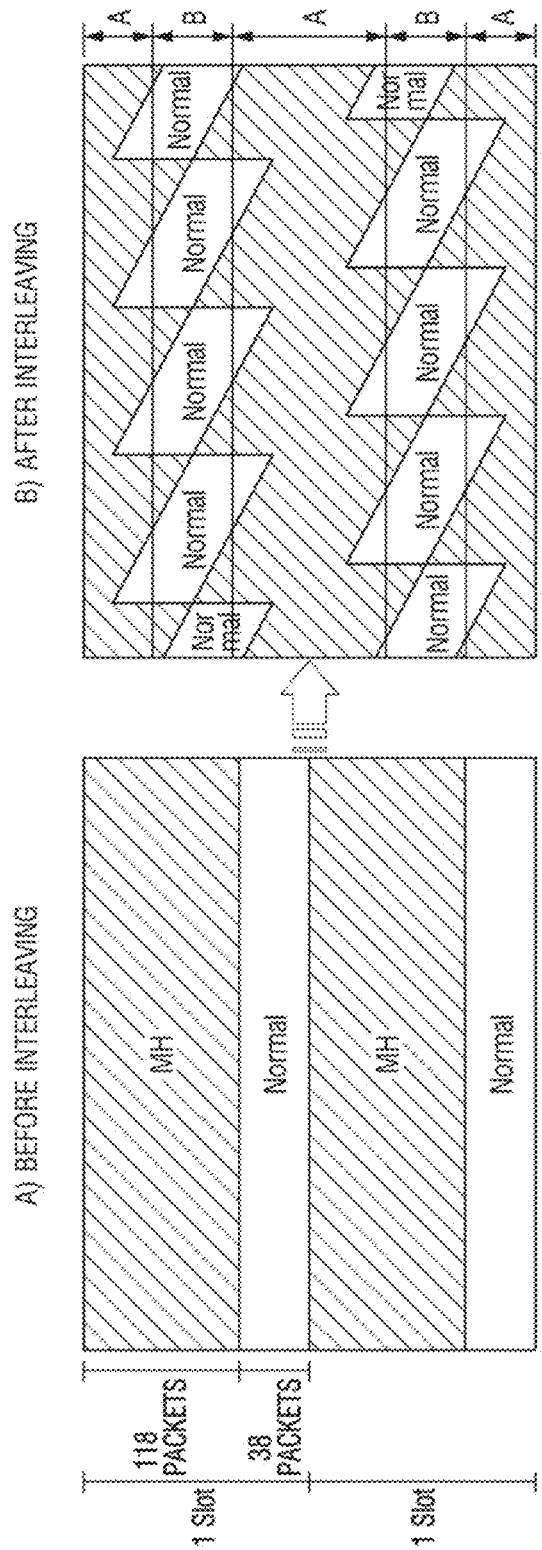
FIG. 1 is a diagram of an example of a transport stream according to ATSC-MH standard.

The present invention will now be described in greater detail with reference to the accompanying drawings.

DETAILED DESCRIPTION OF EXEMPLARY EMBODIMENTS

Hereinafter, exemplary embodiments will be described in detail with reference to the attached drawings. Like reference numerals in the drawings denote like elements.

Figure 2:
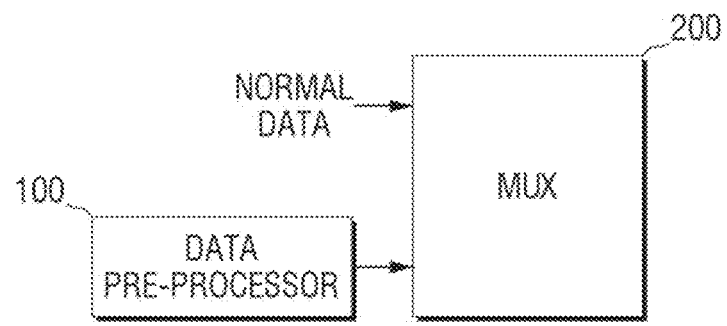
FIGS. 2 through 4 are block diagrams of a digital broadcast transmitter according to various exemplary embodiments.

Referring to FIG. 2, a digital broadcast transmitter according to an exemplary embodiment includes a data preprocessor 100 and a multiplexer (MUX) 200.

The data preprocessor 100 receives and adequately processes mobile data, and converts the mobile data into a format suitable for the transmission.

The MUX 200 generates a transport stream including the mobile data output from the data preprocessor 100. When transmitting normal data together with the mobile data, the MUX 200 generates the transport stream by multiplexing the mobile data and the normal data.

The data preprocessor 100 processes to arrange the mobile data in all or part of a packet allocated to the normal data in the whole stream.

That is, as indicated in FIG. 1, according to the related art ATSC-MH standard, some of the packets are allocated to the normal data. In detail, for example, as shown in FIG. 1, the stream can be divided into a plurality of slots on the time basis, and one slot can include 156 packets in total. Among them, 38 packets can be allocated to the normal data and the remaining 118 packets can be allocated to the mobile data. To ease the understanding, the 118 packets are referred to as a region allocated to the mobile data or a first region, and the 38 packets are referred to as a region allocated to the normal data or a second region. The normal data indicates various existing data received and processed by an existing TV, and the mobile data indicates data received and processed by a mobile device. In some cases, the mobile data can be expressed using various terms such as robust data, turbo data, additional data, etc.

The data preprocessor 100 can place the mobile data in a packet region allocated to the mobile data. Separately, the data processor 100 can place the mobile data in part or all of the packets allocated to the normal data. To ease the understanding, the mobile data placed in the packet allocated to the mobile data is referred to as an existing mobile data or first mobile data, and the region allocated to the existing mobile data is referred to as the first region as mentioned above. By contrast, the mobile data placed in the second region, that is, in the packet allocated to the normal data is referred to as new mobile data, mobile data, or second mobile data to ease the understanding. The existing mobile data and the mobile data may be the same or different data.

Meanwhile, the data preprocessor 100 can arrange the mobile data in various patterns according to a frame mode or setting status of the mode. The arrangement pattern of the mobile data shall be explained below with reference to the drawings.

The MUX 200 generates the transport stream by multiplexing the stream output from the data preprocessor 100 and the normal data.

Figure 3:
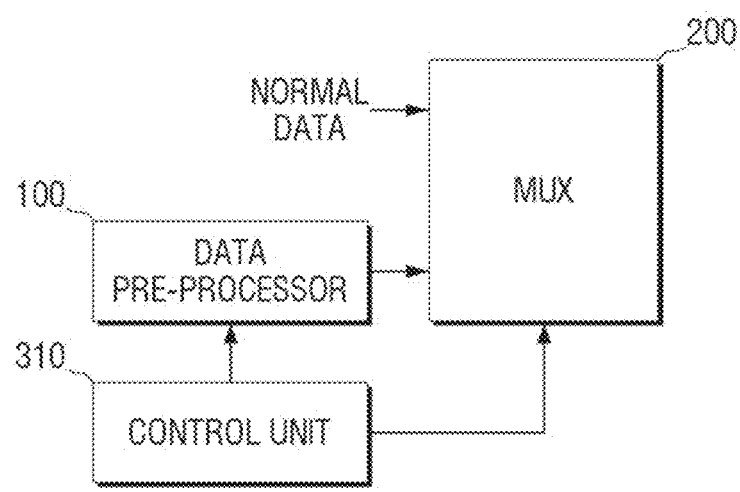

FIG. 3 depicts a controller 310 added to the digital broadcast transmitter of FIG. 2. Referring to FIG. 3, the controller 310 of the digital broadcast transmitter controls the operation of the data preprocessor 100 by determining the setting status of the frame mode.

In detail, when determining that a first frame mode is set, the controller 310 controls the data preprocessor 100 to place the mobile data only in the first region, rather than placing the mobile data in the whole packet allocated to the normal data. That is, the data preprocessor 100 outputs the stream including only the existing mobile data. Hence, the MUX 200 places the normal data in the packet allocated to the normal data to thus generate the transport stream.

Meanwhile, when determining that a second frame mode is set, the controller 310 controls the data preprocessor 100 to place the existing mobile data in the packets allocated to the mobile data, that is, in the first region, and also to place the mobile data in at least part of the packets allocated to the normal data, that is, in at least part of the second region.

In this case, the controller 310 can determine the setting status of a mode separately provided from the frame mode, that is, a mode for determining the number of packets to place the mobile data among the packets allocated to the normal data. Accordingly, the controller 310 can control the data preprocessor 100 to place the mobile data in a number of packets corresponding to the setting status of the mode among all of the packets allocated to the normal data.

Herein, the mode can be provided in various styles. For example, the mode can include one or more compatible modes and incompatible modes. The compatible mode indicates a mode which maintains compatibility with an existing normal data receiver receiving and processing the normal data, and the incompatible mode indicates a mode which does not maintain the compatibility.

More specifically, the compatible mode can include a plurality of compatible modes which place the new mobile data in at least part of the second region. For example, the compatible mode can be one of a first compatible mode which places the mobile data only in some of the packets allocated to the normal data, and a second compatible mode which places the mobile data in all of the packets allocated to the normal data.

Herein, the first compatible mode can be a mode which places the mobile data in only some of data regions of each of some packets in the second region. That is, the first compatible mode can be the mode which places the mobile data in some data regions of some packets and places the normal data in the remaining data regions.

Alternatively, the first compatible mode can be a mode which places the mobile data in all of the data regions of some packets in the second region.

Furthermore, the mode can be provided in a variety of styles by collectively considering the number of the packets allocated to the normal data and a size, a type, a transmission time, and a transmission environment of the mobile data.

For example, when 38 packets are allocated to the normal data as shown in FIG. 1, the first compatible mode can include:

1) a first mode for placing the new mobile data in the 38 packets at a rate of ¼, 2) a second mode for placing the new mobile data in the 38 packets at a rate of 2/4, 3) a third mode for placing the new mobile data in the 38 packets at a rate of ¾, and 4) a fourth mode for placing the new mobile data in all of the 38 packets.

Herein, in the first mode, the new mobile data can be placed in 11 packets in total, that is, the sum of 2 packets of the 38 packets and 9 packets corresponding to the quotient of the remaining 36 packets divided by 4. In the second mode, the new mobile data can be placed in 20 packets in total, that is, the sum of 2 packets of the 38 packets and 18 packets corresponding to the quotient of the remaining 36 packets divided by 2. In the third mode, the new mobile data can be placed in 29 packets in total, that is, the sum of 2 packets of the 38 packets and 27 packets corresponding to the product of the remaining 36 packets and ¾. In the fourth mode, the new mobile data can be placed in all of the 38 packets.

Meanwhile, the incompatible mode indicates the mode which can disregard the compatibility with the receiver receiving the normal data and increase a transmission capacity of the new mobile data. More specifically, the incompatible mode can be a mode which places the new mobile data even using an MPEG header and a Reed Solomon (RS) parity region (or area) of the first region, in addition to the entire second region.

As a result, the data preprocessor 100 of FIG. 2 or FIG. 3 can generate the transport stream by placing the new mobile data according to the following various modes:

1) a first mode for placing the new mobile data in 11 packets of the 38 packets allocated to the normal data, 2) a second mode for placing the new mobile data in 20 packets of the 38 packets allocated to the normal data, 3) a third mode for placing the new mobile data in 29 packets of the 38 packets allocated to the normal data, 4) a fourth mode for placing the new mobile data in all of the 38 packets allocated to the normal data, and 5) a fifth mode for placing the new mobile data in all of the 38 packets allocated to the normal data, and a region corresponding to the MPEG header and the parity area of the region allocated to the existing mobile data.

Herein, while the fifth mode is referred to as the incompatible mode and the first through fourth modes are referred to as the compatible modes to ease the understanding, the name or designation of each mode may vary. Also, while the five modes in total including the four compatible modes and the one incompatible mode are described in the present exemplary embodiment, the number of the compatible modes can vary. For example, the first through third modes may be used as the compatible modes, and the fourth mode may be set to the fifth mode, that is, to the incompatible mode.

Meanwhile, the data preprocessor 100 can insert known data in addition to the mobile data. The known data indicates a sequence which is commonly known to the digital broadcast transmitter and the digital broadcast receiver. The digital broadcast receiver can receive the known data from the digital broadcast transmitter, identify a difference from a pre-known sequence, and then determine a degree of error correction. The known data may be expressed differently, e.g., as training data, training sequence, reference signal, and additional reference signal. Herein, the term "known data" is applied.

The data preprocessor 100 can insert at least one of the mobile data and the known data into diverse portions of the entire transport stream, thus improving the reception performance.

That is, in the stream of section (B) of FIG. 1, the MH, that is, the mobile data, is gathered in the region A and formed in the region B in a conical form. Accordingly, the region A may be referred to as a body region and the region B may be referred to as a head/tail region. In the related art, the head/tail region does not contain the known data and thus does not perform well, compared to the body region data.

Hence, the data preprocessor 100 inserts the known data into an appropriate location so that the known data can be placed in the head/tail region. The known data may be arranged as a long training sequence in which data over a certain size are continued, or may be discontinuously distributed.

The mobile data and the known data can be inserted in various manners according to exemplary embodiments, which shall be explained in detail below with reference to the drawings. Yet, a detailed structure of the digital broadcast transmitter is explained first.

[Example of Detailed Construction of Digital Broadcast Transmitter]

Figure 4:
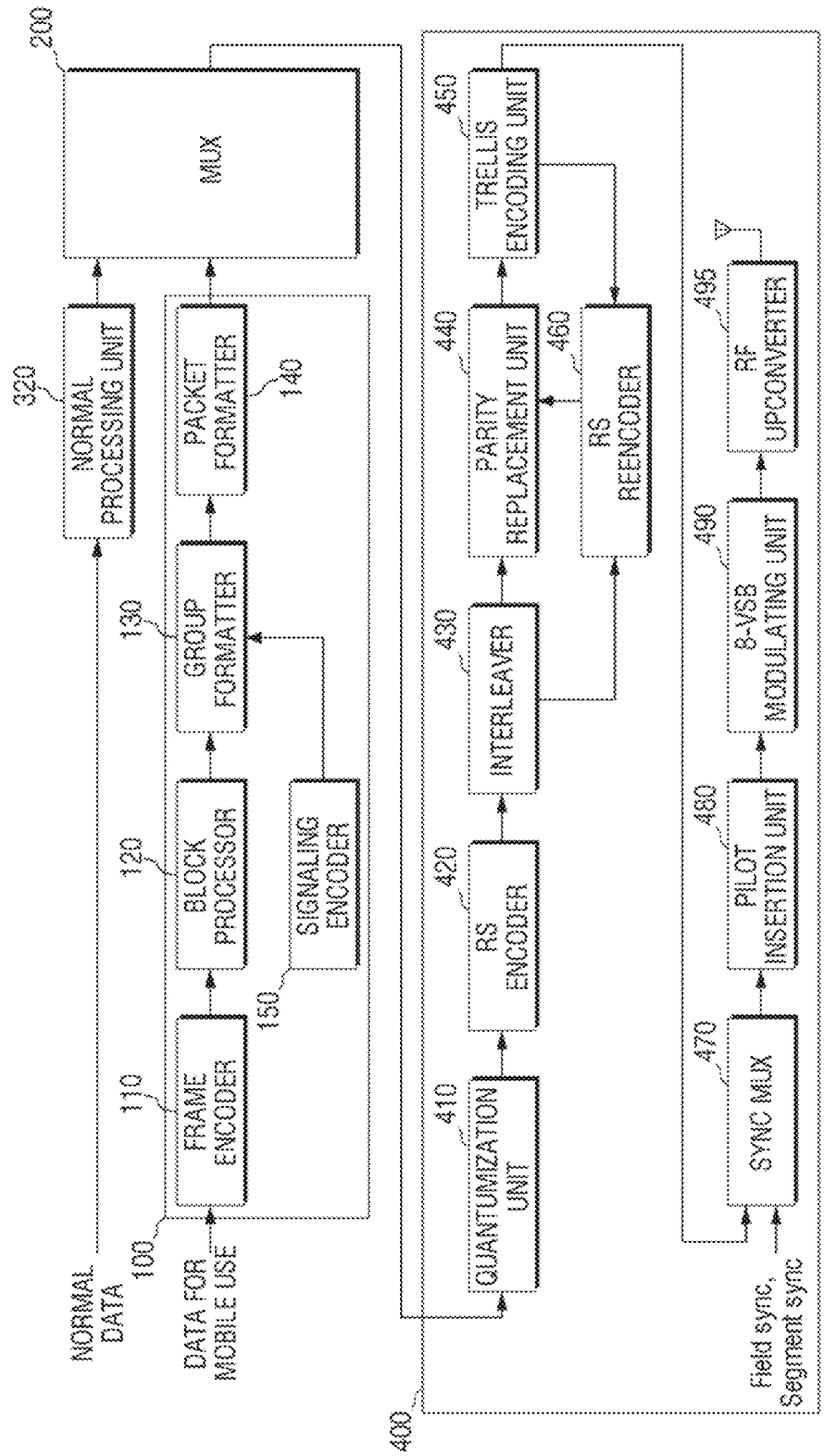

FIG. 4 is a detailed block diagram of the digital broadcast transmitter according to an exemplary embodiment. Referring to FIG. 4, the digital broadcast transmitter can include a normal processor 320 and an exciter 400 in addition to the data preprocessor 100 and the MUX 200. Herein, a portion including the data preprocessor 100, the normal processor 320, and the MUX 200 can be referred to as a stream generator, to ease the understanding.

While the controller 310 of FIG. 3 is omitted from FIG. 4, it is understood that the controller 310 can be included in the digital broadcast transmitter. Also, in some cases, some components of the digital broadcast transmitter of FIG. 4 may be deleted or new components may be added, and the arrangement order and the number of the components can vary.

Referring to FIG. 4, the normal processor 320 receives and converts the normal data into a format suitable for generating the transport stream. That is, the present digital broadcast transmitter generates and transmits the transport stream including the normal data and the mobile data, and the receiver for receiving the normal data should be able to receive and process the normal data appropriately. Accordingly, the normal processor 320 adjusts a packet timing and a PCR of the normal data (which may be referred to as main service data) into the format suitable for MPEG/ATSC standard which is used to decode the normal data. A detailed description thereof is disclosed in ANNEX B of the ATSC-MH standard and thus omitted herein.

The data preprocessor 100 includes a frame encoder 110, a block processor 120, a group formatter 130, a packet formatter 140, and a signaling encoder 150.

The frame encoder 110 performs RS frame encoding. More specifically, the frame encoder 110 receives a single service and builds a predefined number of RS frames. For example, when the single service is an M/H ensemble unit including a plurality of M/H parades, a certain number of RS frames are built for each M/H parade. In particular, the frame encoder 110 randomizes the input mobile data, performs RS-Cyclic Redundancy Check (CRC) encoding, divides each RS frame according to a preset frame mode, and outputs a certain number of RS frames.

Figure 5:
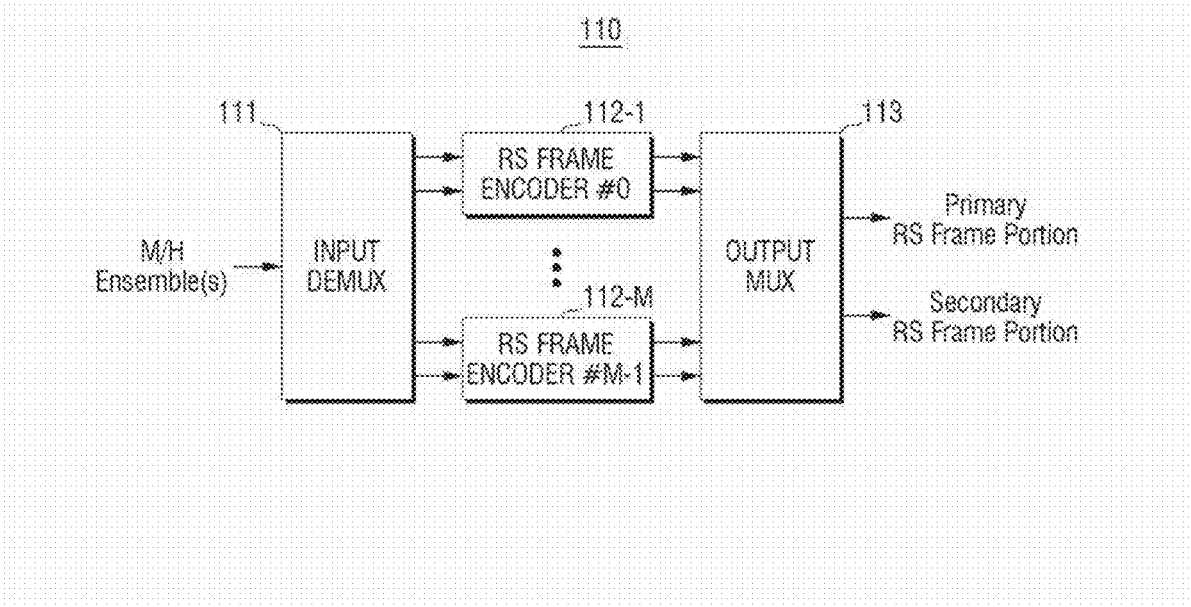
FIG. 5 is a block diagram of a frame encoder according to an exemplary embodiment.

FIG. 5 is a block diagram of the frame encoder 110 according to an exemplary embodiment. Referring to FIG. 5, the frame encoder 110 includes an input demultiplexer (DE-MUX) 111, a plurality of RS frame encoders 112-1 through 112-M, and an output MUX 113.

When the mobile data of a certain service unit (for example, the M/H ensemble) is input, the input DEMUX 111 demultiplexes the mobile data into a plurality of ensembles, for example, into a primary ensemble and a secondary ensemble according to preset construction information, that is, the frame mode, and outputs the ensembles to the RS frame encoders 112-1 through 112-M. The RS frame encoders 112-1 through 122-M each perform randomization, RS-CRC encoding, and dividing to the input ensembles, and output the ensembles to the output MUX 113. The output MUX 113 outputs a primary RS frame portion and a secondary RS frame portion by multiplexing frame portions output from the RS frame encoders 112-1 through 112-M. In this case, only the primary RS frame portion may be output according to the setting status of the frame mode.

Figure 6:
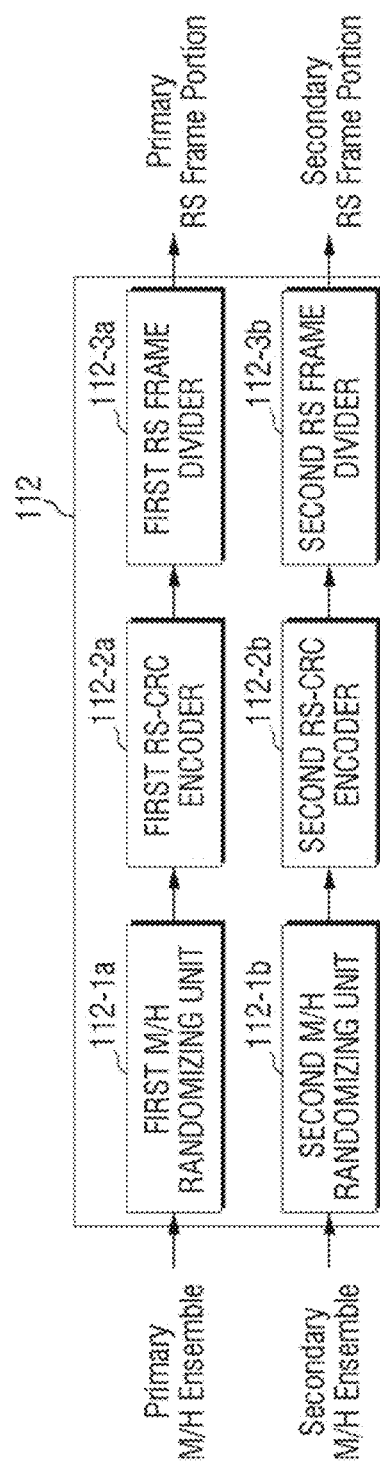
FIG. 6 is a block diagram of an RS frame encoder of the frame encoder of FIG. 5.

FIG. 6 is a block diagram of an RS frame encoder 112 which can be implemented using one of the RS frame encoders 112-1 through 112-M, according to an exemplary embodiment. Referring to FIG. 6, the frame encoder 112 includes a plurality of M/H randomizers 112-1a and 112-1b, a plurality of RS-CRC encoders 112-2a and 112-2b, and a plurality of RS frame dividers 112-3a and 112-3b.

When the primary M/H ensemble and the secondary M/H ensemble are input from the input DEMUX 111, the M/H randomizers 112-1a and 112-1b randomize and the RS-CRC encoders 112-2a and 112-2b RS-CRC encode the randomized data. The RS frame dividers 112-3a and 112-3b appropriately divide the data to be block-coded and outputs the divided data to the output MUX 113 so that the block processor 120 disposed at the rear end of the frame encoder 110 can properly block-code the data. The output MUX 113 properly combines and multiplexes the frame portions and then outputs the frame portions to the block processor 120 so that the block processor 120 can block-code the frame portions.

The block processor 120 codes, that is, block-codes, the stream output from the frame encoder 110 based on the block unit.

Figure 7:
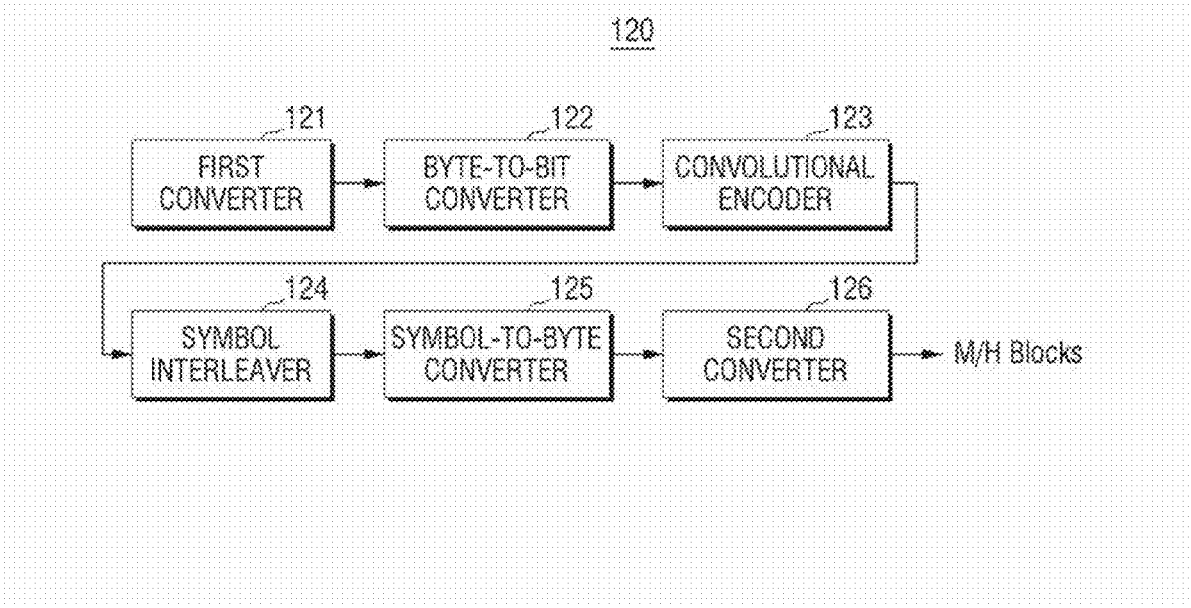
FIG. 7 is a block diagram of a block processor according to an exemplary embodiment.

FIG. 7 is a block diagram of the block processor 120, according to an exemplary embodiment.

Referring to FIG. 7, the block processor 120 includes a first converter 121, a byte-to-bit converter 122, a convolutional encoder 123, a symbol interleaver 124, a symbol-to-byte converter 125, and a second converter 126.

The first converter 121 converts the RS frame input from the frame encoder 110 to the blocks. That is, the first converter 121 combines the mobile data in the RS frame according to a preset block mode and outputs a Serially Concatenated Convolutional Code (SCCC) block.

For example, when the block mode is "00", a single M/H block is converted to a single SCCC block.

Figure 8:
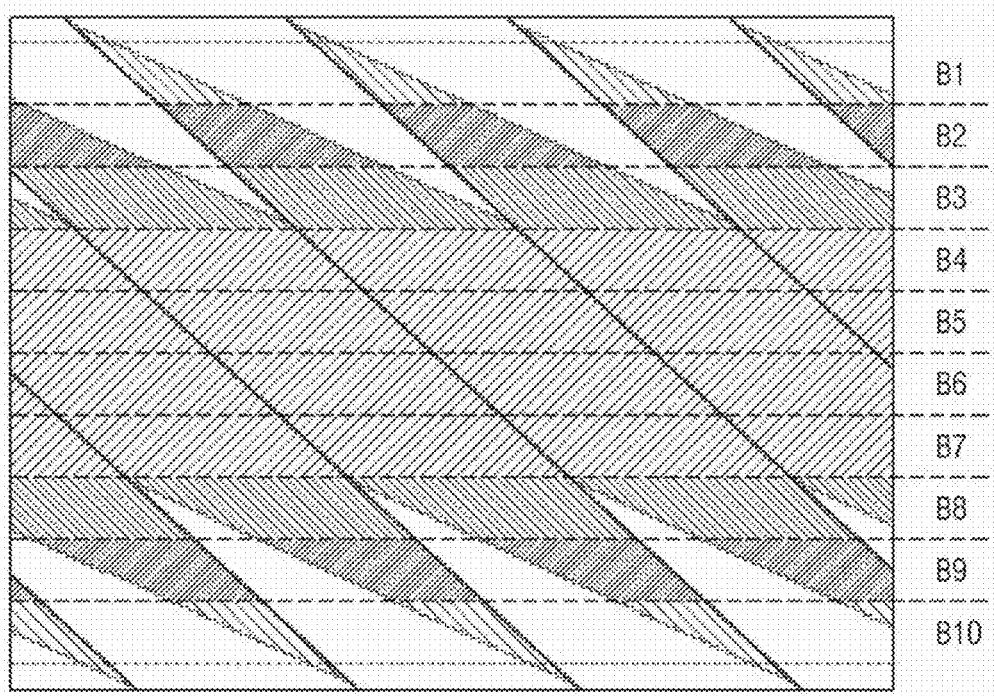
FIG. 8 is a diagram of stream block division according to an exemplary embodiment.

FIG. 8 is a diagram of the M/H blocks divided from the mobile data on the block basis, according to an exemplary embodiment. Referring to FIG. 8, one mobile data unit, for example, one M/H group, can be divided into 10 blocks B1 through B10. When the block mode is "00", the blocks B1 through B10 are output as the SCCC blocks. When the block mode is "01", two M/H blocks are combined and output as a single SCCC block. The combination pattern can be variously set. For example, B1 and B6 are unified to form a block SCB1, and B2 and B7, B3 and B8, B4 and B9, and B5 and B10 are unified to form SCB2, SCB3, SCB4, and SCB5. According to the other block modes, the blocks can be combined in various manners and numbers.

The byte-to-bit converter 122 converts the SCCC block from the byte unit into the bit unit. This is because the convolutional encoder 123 operates on the bit basis. Accordingly, the convolutional encoder 123 convolutionally encodes the converted data.

Next, the symbol interleaver 124 interleaves the symbol. The symbol interleaving can be performed in the same way as the block interleaving. The symbol-interleaved data is converted into the bytes by the symbol-to-byte converter 125, re-converted into the M/H blocks by the second converter 126, and then output.

The group formatter 130 receives the stream processed by the block processor 120 and formats the stream on the group basis. More specifically, the group formatter 130 maps the data output from the block processor 120 onto adequate locations in the stream, and adds the known data, the signaling data, and initialization data. In addition, the group formatter 130 adds a placeholder byte for the normal data, an MPEG-2 header, and a non-systematic RS parity, and a dummy byte for the group format consistency.

The signaling data indicates various information used for processing the transport stream. The signaling data can be properly processed by the signaling encoder 150 and then provided to the group formatter 130.

A Transmission Parameter Channel (TPC) and a Fast Information Channel (FIC) can be used to transmit the mobile data. The TPC is used to provide various parameters such as various Forward Error Correction (FEC) mode information and M/H frame information. The FIC is used for rapid service acquisition of the receiver and includes cross layer information between a physical layer and a higher layer. When the TPC information and the FIC information are provided to the signaling encoder 150, the signaling encoder 150 adequately processes the provided information and provides the information as the signaling data.

Figure 9:
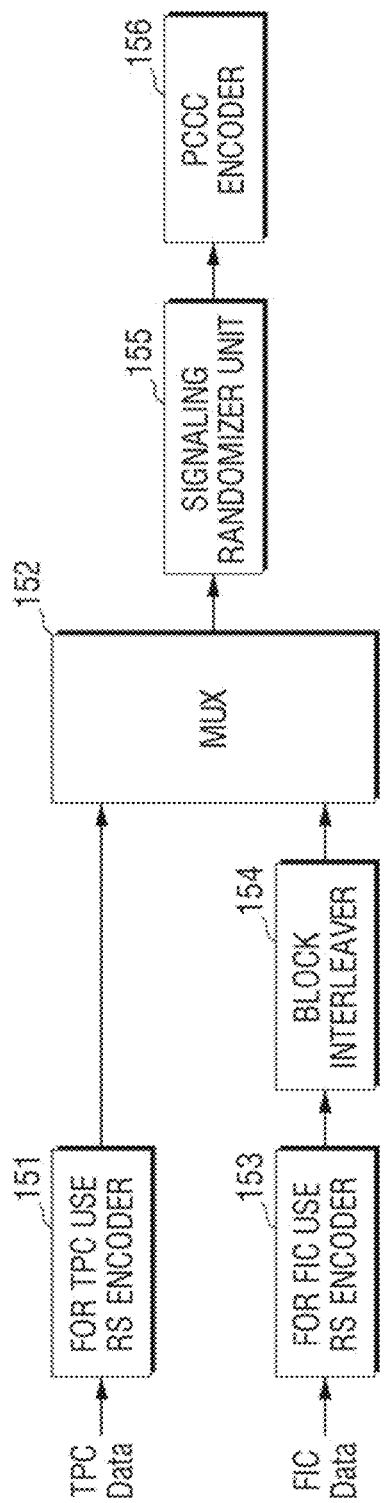
FIG. 9 is a block diagram of a signaling encoder according to an exemplary embodiment.

FIG. 9 is a block diagram of the signaling encoder 150 according to an exemplary embodiment.

Referring to FIG. 9, the signaling encoder 150 includes an RS encoder for the TPC 151, a MUX 152, an RS encoder for FIC 153, a block interleaver 154, a signaling randomizer 155, and a Parallel Concatenated Convolutional Code (PCCC) encoder 156. The RS encoder for the TPC 151 forms a TPC code word by RS-encoding the input TPC data. The RS encoder for the FIC 153 and the block interleaver 154 RS-encode and block-interleave the input FIC data to form an FIC code word. The MUX 152 generates a series of sequences by placing the FIC code word after the TPC code word. The generated sequence is randomized by the signaling randomizer 155, PCCC-coded by the PCCC encoder 156, and then output to the group formatter 130 as the signaling data.

Meanwhile, the known data indicates the sequence commonly known to the digital broadcast receiver as described above. The group formatter 130 inserts the known data to an adequate location according to a control signal provided from a separate component (for example, the controller 310) so that the known data is interleaved by the exciter 400 and then arranged in an adequate location in the stream. For example, the known data can be inserted into an adequate location so as to be placed even in the region B of the stream structure of section B of FIG. 1. The group formatter 130 may determine the known data insertion location by considering an interleaving rule by itself.

Meanwhile, the initialization data indicates data for the trellis encoder 450 of the exciter 400 to initialize internal memories at an appropriate time, which will be described in detail below in relation to the exciter 400.

The group formatter 130 can include a group formatter for generating the stream in the group format by inserting various regions and signals into the stream, and a data deinterleaver for deinterleaving the stream generated in the group format.

The data deinterleaver rearranges the data in the reverse order of the interleaver 430 disposed at the rear end with reference to the stream. The stream deinterleaved by the data deinterleaver can be provided to the packet formatter 140.

The packet formatter 140 can remove various place holders generated by the group formatter 130 in the stream, and add the MPEG header having a packet identifier (PID) of the mobile data. Accordingly, the packet formatter 140 outputs the stream in a preset number of packets for every group. For example, the packet formatter 140 can output 118 TS packets.

As such, the data preprocessor 100 is implemented in various ways to generate the mobile data in an adequate form. Particularly, when a plurality of mobile services is provided, the data preprocessor 100 may include a plurality of components.

The MUX 200 generates the transport stream by multiplexing the normal stream processed by the normal processor 320 and the mobile stream processed by the data preprocessor 100. The transport stream output from the MUX 200 includes the normal data and the mobile data and may further include the known data in order to improve reception performance.

The exciter 400 encodes, interleaves, trellis encodes, and modulates the transport stream generated by the MUX 200, and outputs the processed transport stream. In some cases, the exciter 400 may be referred to as a data postprocessor.

Referring to FIG. 4, the exciter 400 includes a randomizer 410, an RS encoder 420, an interleaver 430, a parity replacer 440, a trellis encoder 450, an RS re-encoder 460, a sync MUX 470, a pilot inserter 480, an 8-VSB modulator 490, and an RF up-converter 495.

The randomizer 410 randomizes the transport stream output from the MUX 200. The randomizer 410 can basically perform the same function as a randomizer according to the ATSC standard.

The randomizer 410 can apply an XOR operation to the MPEG header of the mobile data and the entire normal data with a Pseudo Random Binary Sequence (PRBS) in length of 16 bits at maximum, but may not apply the XOR operation to a payload byte of the mobile data. Still, a PRBS generator can continue shifting of a shift register. That is, the randomizer 410 bypasses the payload byte of the mobile data.

The RS encoder 420 RS-encodes the randomized stream. More specifically, when the portion corresponding to the normal data is input, the RS encoder 420 performs systematic RS encoding in the same manner as the related art ATSC system. That is, the RS encoder 420 adds a 20-byte parity to the end of each 187-bytes packet. By contrast, when the portion corresponding to the mobile data is input, the RS encoder 420 performs non-systematic RS encoding. In this case, the 20-byte RS FEC data obtained by the non-systematic RS encoding is placed in a certain parity byte location within each mobile data packet. Accordingly, the data is compatible with a related art receiver of the ATSC standard.

The interleaver 430 interleaves the stream encoded by the RS encoder 420. The interleaving may be conducted in the same manner as in the related art ATSC system. That is, the interleaver 430 can sequentially select a plurality of paths including different numbers of shift registers using a switch, and write and read the data, to thus conduct the interleaving as many times as the shift registers on the path.

The parity replacer 440 corrects the parity which is changed according to the memory initialization of the trellis encoder 450 at the rear end.

That is, the trellis encoder 450 receives and trellis-encodes the interleaved stream. The trellis encoder 450 may use 12 trellis encoders. Accordingly, the trellis encoder 450 can use a DEMUX for dividing the stream into 12 independent streams and outputting the streams to the trellis encoders respectively, and a MUX for combining the streams trellis-encoded by the trellis encoders into the single stream.

The trellis encoders each use a plurality of internal memories to perform the trellis encoding by logically operating and outputting a newly input value and a value prestored to the internal memory.

As described above, the transport stream can include the known data. The known data is the sequence commonly known to the digital broadcast transmitter and the digital broadcast receiver. The digital broadcast receiver can determine the error correction degree by checking the state of the received known data. As such, the known data should be transmitted as it is known to the receiver. However, since the value stored to the internal memory of the trellis encoder is unknown, the internal memories need to be initialized with an arbitrary value prior to the known data input. Accordingly, the trellis encoder 450 initializes the memory before trellis-encoding the known data. The memory initialization may be referred to as trellis reset.

Figure 10:
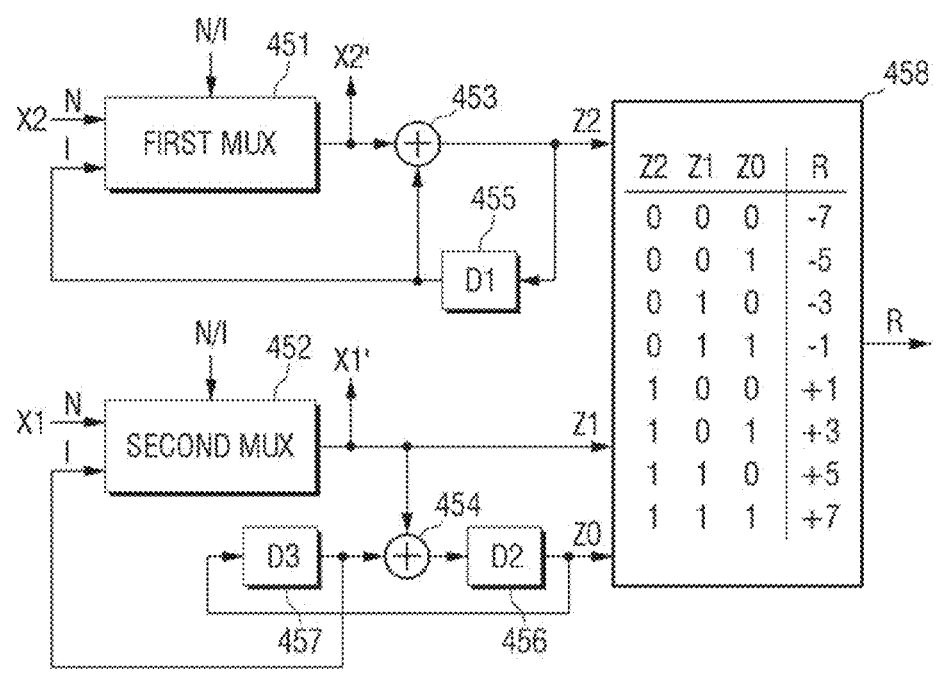
FIGS. 10 through 13 are diagrams of various trellis encoders according to various exemplary embodiments.

FIG. 10 is diagram of one of the plurality of the trellis encoders provided in the trellis encoder 450, according to an exemplary embodiment.

Referring to FIG. 10, the trellis encoder includes first and second MUXs 451 and 452, first and second adders 453 and 454, first through third memories 455, 456 and 457, and a mapper 458.

The first MUX 451 receives data N of the stream and a value I stored to the first memory 455 and outputs one value, that is, N or I, according to a control signal N/I. More specifically, when a value corresponding to an initialization data section is input, a control signal instructing to select I is applied and the first MUX 451 outputs I. N is output in other sections. Likewise, the second MUX 452 outputs I only for the initialization data section.

Accordingly, for non-initialization data section, the first MUX 451 outputs the interleaved value to the rear end and the output value is input to the first adder 453 together with a value prestored to the first memory 455. The first adder 453 applies the logical operation, for example, the XOR, to the input values and thus outputs Z2. At this time, in the initialization data section, the value stored to the first memory 455 is selected and output by the first MUX 451. Hence, as the two same values are input to the first adder 453, the logical operation value is constant. That is, the XOR produces the output 0. Since the output value of the first adder 453 is input to the first memory 455, the value of the first memory 455 is initialized to 0.

In the initialization data section, the second MUX 452 selects and outputs a value stored to the third memory 457. The output value is input to the second adder 454 together with a value stored to the third memory 457. The second adder 454 logically operates on the two same values and outputs the result to the second memory 456. Since the input values of the second adder 454 are the same, the logical operation value, for example, the XOR of the same values inputs 0 to the second memory 456. Thus, the second memory 456 is initialized. By contrast, the value stored to the second memory 456 is shifted and stored to the third memory 457. Accordingly, when next initialization data is input, the current value of the second memory 456, that is, zero is input to the third memory 457 to initialize the third memory 457.

The mapper 458 receives and maps the output value of the first adder 453, the output value of the second MUX 452, and the output value of the second memory 456, onto a corresponding symbol value R and outputs the mapped values. For example, when Z0, Z1, and Z2 are output as 0, 1, and 0, the mapper 458 outputs the symbol −3.

Since the RS encoder 420 is located before the trellis encoder 450, the parity is already added to the value input to the trellis encoder 450. Hence, as the trellis encoder 450 is initialized and some data value is changed, the parity is to be changed as well.

The RS re-encoder 460 generates a new parity by changing the value of the initialization data section using X1' and X2' output from the trellis encoder 450. The RS re-encoder 460 may be referred to as a non-systematic RS encoder.

Meanwhile, while the memory is initialized to zero in FIG. 10, the memory may be initialized to some other value than zero in other exemplary embodiments.

Figure 11:
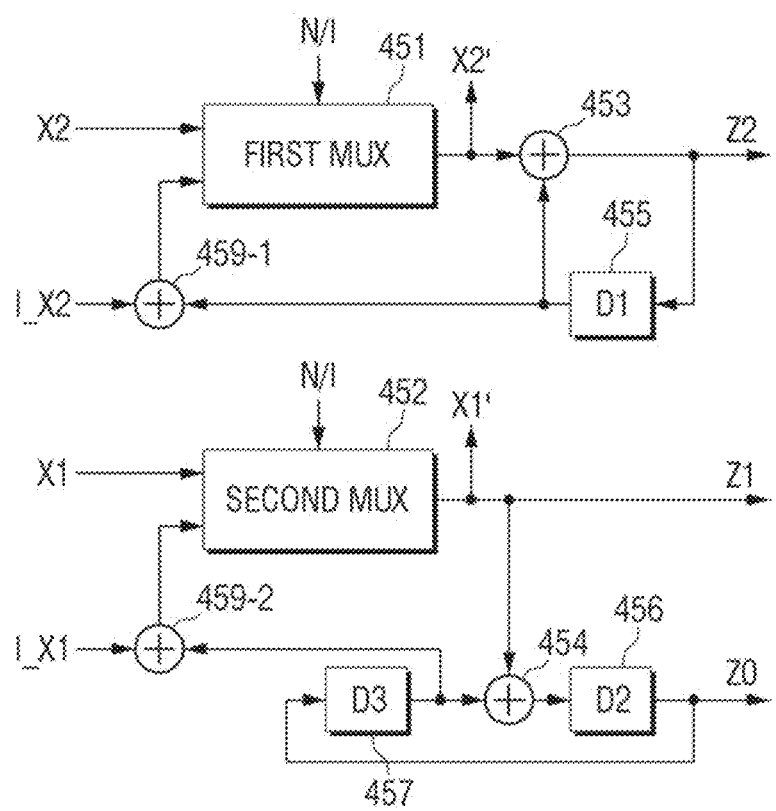

FIG. 11 is a diagram of another trellis encoder, according to an exemplary embodiment.

Referring to FIG. 11, the trellis encoder can include first and second MUXs 451 and 452, first through fourth adders 453, 454, 459-1, and 459-2, and first through third memories 455, 456, and 457. The mapper 458 is omitted in FIG. 11.

As constructed above, the first MUX 451 can output one of a stream input value X2 and a value of the third adder 459-1. I_X2 and a storage value of the first memory 455 are input to the third adder 459-1. The I_X2 denotes a memory reset value input from the outside. For example, in order to initialize the first memory 455 to 1, I_X2 is input as 1. When the storage value of the first memory 455 is zero, the output value of the third adder 459-1 is 1 and thus the first MUX 451 outputs 1. Accordingly, the first adder 453 applies the XOR to the output value 1 of the first MUX 451 and the storage value 0 of the first memory 455 and stores the result value 1 to the first memory 455. As a result, the first memory 455 is initialized to 1.

Likewise, the second MUX 452 selects and outputs the output value of the fourth adder 459-2 in the initialization data section. The fourth adder 459-2 outputs the XOR value of the memory reset value I_X1 input from the outside and the third memory 457. For example, when the second and third memories 456 and 457 store values 1 and 0, respectively, and the two memories are to be initialized to 1 and 1, respectively, the second MUX 452 outputs 1 which is the XOR value of the value 0 stored to the third memory 457 and the I_X1 value 1. The output 1 is XOR-processed with 0 stored to the third memory 457 in the second adder 454, and the result value 1 is input to the second memory 456. Meanwhile, the original value 1 stored to the second memory 456 is shifted to the third memory 457 to set the third memory 457 to 1. In this state, when the second I_X1 is also input as 1, it is XOR-processed with the value 1 of the third memory 457 and the result value 0 is output from the second MUX 452. When the second adder 454 XOR-processes 0 output from the second MUX 452 and 1 stored to the third memory 457, the result value 1 is input to the second memory 456 and the value 1 stored to the second memory 456 is shifted and stored to the third memory 457. As a result, both the second and third memories 456 and 457 can be initialized to 1.

Figure 12:
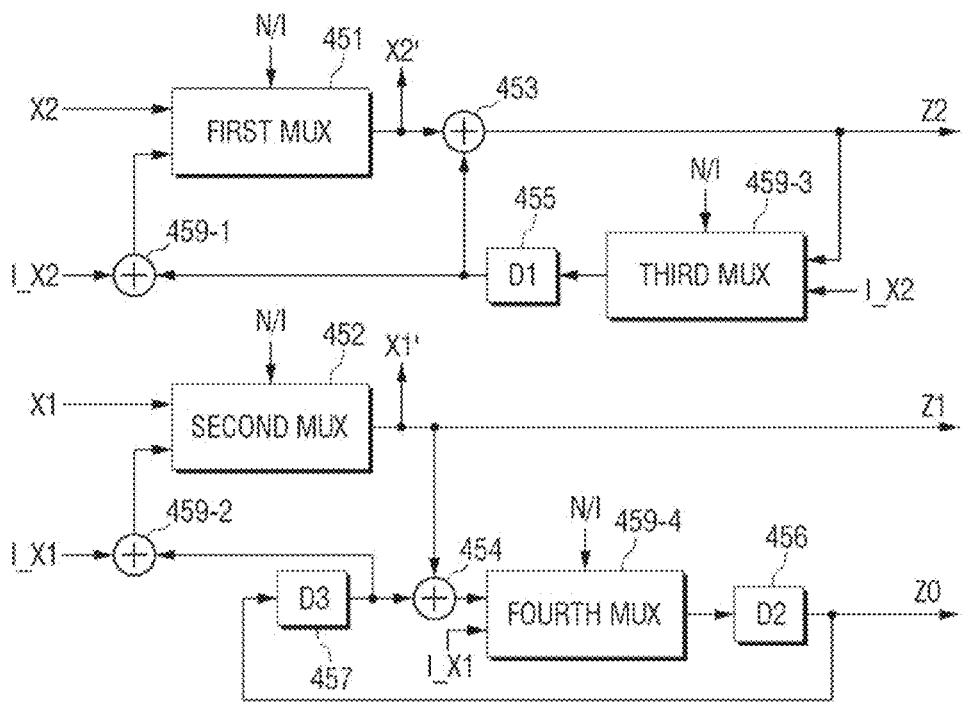
Figure 13:
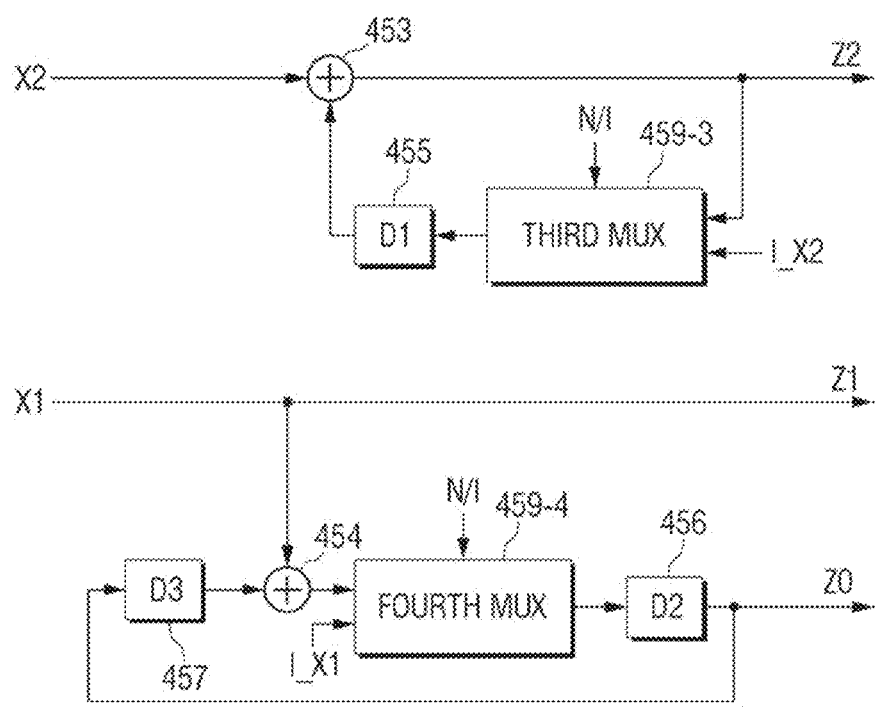

FIGS. 12 and 13 are diagrams of the trellis encoder according to various exemplary embodiments.

Referring to FIG. 12, the trellis encoder can further include third and fourth MUXs 459-3 and 459-4 in addition to the structure of FIG. 11. The third and the fourth MUXs 459-3 and 459-4 can output the output value of the first and the second adders 453 and 454 or the values I_X2 and I_X1 according to their control signal N/I. Thus, the first through third memories 455, 456, and 457 can be initialized to desired values.

FIG. 13 depicts the trellis encoder more simplified. Referring to FIG. 13, the trellis encoder can include first and second adders 453 and 454, first through third memories 455, 456, and 457, and third and fourth MUXs 459-3 and 459-4. Accordingly, the first through third memories 455, 456, and 457 can be initialized according to the values I_X1 and I_X2 input to the third and the fourth MUXs 459-3 and 459-4. That is, referring to FIG. 13, I_X2 and I_X1 are input to the first memory 455 and the second memory 456 and become the first memory 455 value and the second memory 456 value.

Further detailed descriptions of the trellis encoder operation of FIGS. 12 and 13 are omitted.

Referring back to FIG. 4, the sync MUX 470 adds a field sync and a segment sync to the stream trellis-encoded by the trellis encoder 450.

As described above, when the data preprocessor 100 places and uses the mobile data even in the packets allocated to the existing normal data, the receiver is to be informed of the new mobile data. The existence of the new mobile data can be notified in various fashions, and one of them is a method using the field sync, which shall be described in detail below.

The pilot inserter 480 inserts a pilot into the transport stream which is processed by the sync MUX 470, and the 8-VSB modulator 490 modulates the transport stream according to an 8-VSB modulation scheme. The radio frequency (RF) up-converter 495 converts the modulated stream to a higher RF band signal for the transmission, and the converted signal is transmitted over an antenna.

As described above, the transport stream is transmitted to the receiver by including the normal data, the mobile data, and the known data.

Figure 14:
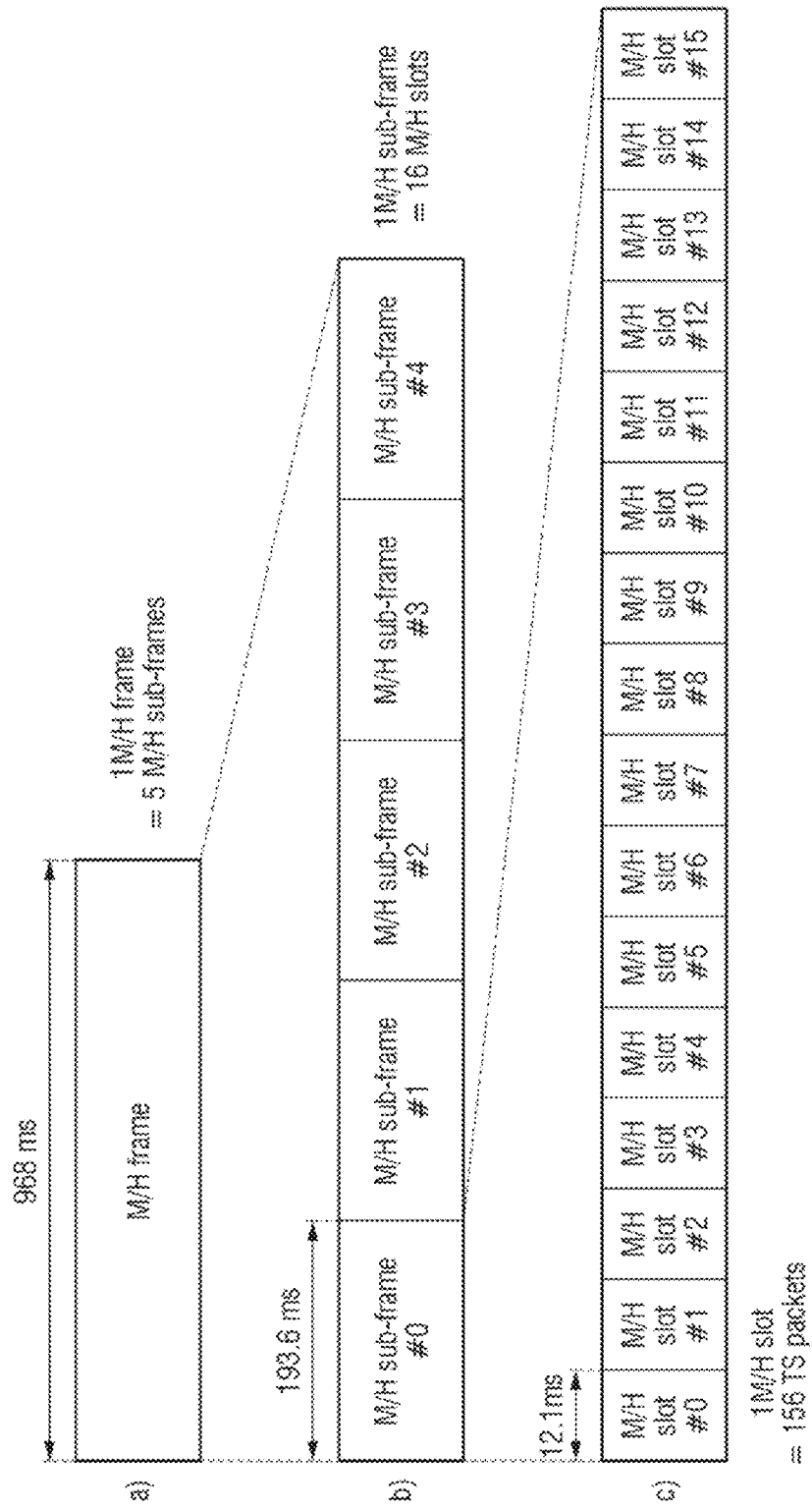
FIG. 14 is a diagram of a mobile data frame structure according to an exemplary embodiment.

FIG. 14 is a diagram of the unit structure of the mobile data frame of the transport stream, that is, the M/H frame, according to an exemplary embodiment. Referring to section (a) of FIG. 14, one M/H frame can have the size of 968 ms in total on the time basis, and can be divided into 5 sub-frames as shown in section (b) of FIG. 14. One sub-frame can have the time unit of 193.6 ms. As shown in section (c) of FIG. 14, each sub-frame can be divided into 16 slots. Each slot has the time unit of 12.1 ms and can include 156 transport stream packets in total. As described above, 38 packets of them are allocated to the normal data and the remaining 118 packets are allocated to the mobile data. That is, one M/H group includes 118 packets.

At this time, the data preprocessor 100 can place the mobile data and the known data also in the packets allocated to the normal data, to thus improve the transmission efficiency of the mobile data and the reception performance.

[Various Exemplary Embodiments of the Changed Transport Stream]

FIGS. 15 through 21 are diagrams of the transport stream according to various exemplary embodiments.

Figure 15:
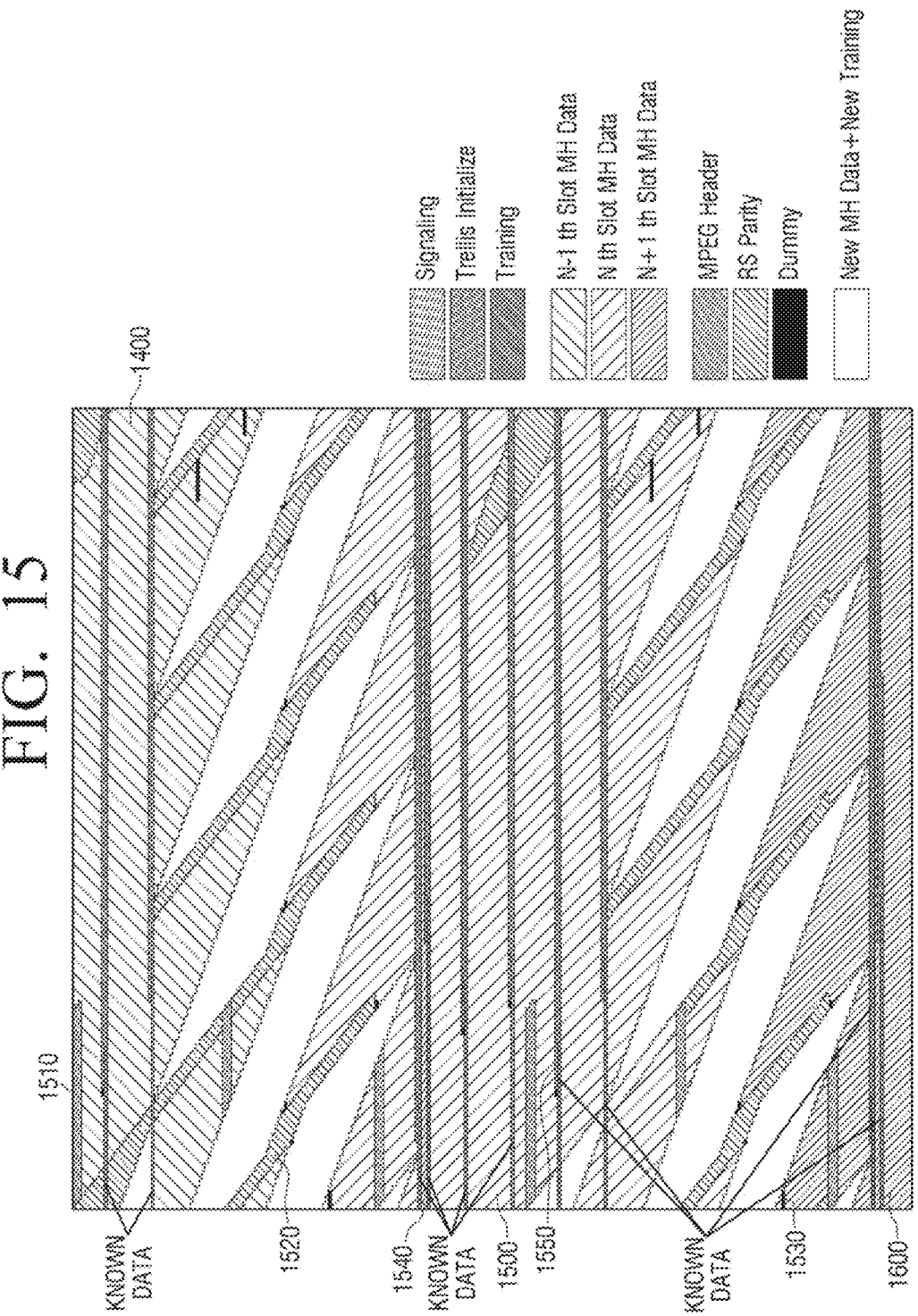
FIGS. 15 through 21 are diagrams of a stream construction according to various exemplary embodiments.

FIG. 15 depicts, as the modified structure most simplified, the stream structure interleaved with the mobile data placed in the related art packets allocated to the normal data, that is, in the second region. In the stream of FIG. 15, the known data can be placed in the second region together with the mobile data.

Accordingly, even the portion not used for the mobile data in the related art ATSC-MH standard, that is, 38 packets, can be used for the mobile data. Also, since the second region is used independently from the existing mobile data region (that is, the first region), one or more services can be provided additionally. When the new mobile data is to be used as the same service as the existing mobile data, data transmission efficiency can be further improved.

Meanwhile, when the new mobile data and the known data are transmitted as shown in FIG. 15, the presence and location of the new mobile data and the known data may be notified to the receiver using the signaling data or the field sync.

The mobile data and the known data can be arranged by the data preprocessor 100. More specifically, the group formatter 130 of the data preprocessor 100 can arrange the mobile data and the known data also in the 38 packets.

In FIG. 15, the known data in the form of 6 long training sequences is placed in the body region where the existing mobile data are gathered. Also, for the sake of error robustness of the signaling data, the signaling data is interposed between the first and the second long training sequences. By contrast, in the packets allocated to the normal data, the known data may be not only arranged as the long training sequence type but also distributed.

In FIG. 15, the hatching area 1510 indicates an MPEG header portion, the hatching area 1520 indicates an RS parity region, the hatching area 1530 indicates a dummy region, the hatching area 1540 indicates the signaling data, and the hatching area 1550 indicates initialization data. Referring to FIG. 15, the initialization data precedes the known data. The reference numeral 1400 indicates (N−1)-th slot M/H data, the reference numeral 1550 indicates N-th slot M/H data, and the reference numeral 1600 indicates (N+1)-th slot M/H data.

Figure 16:
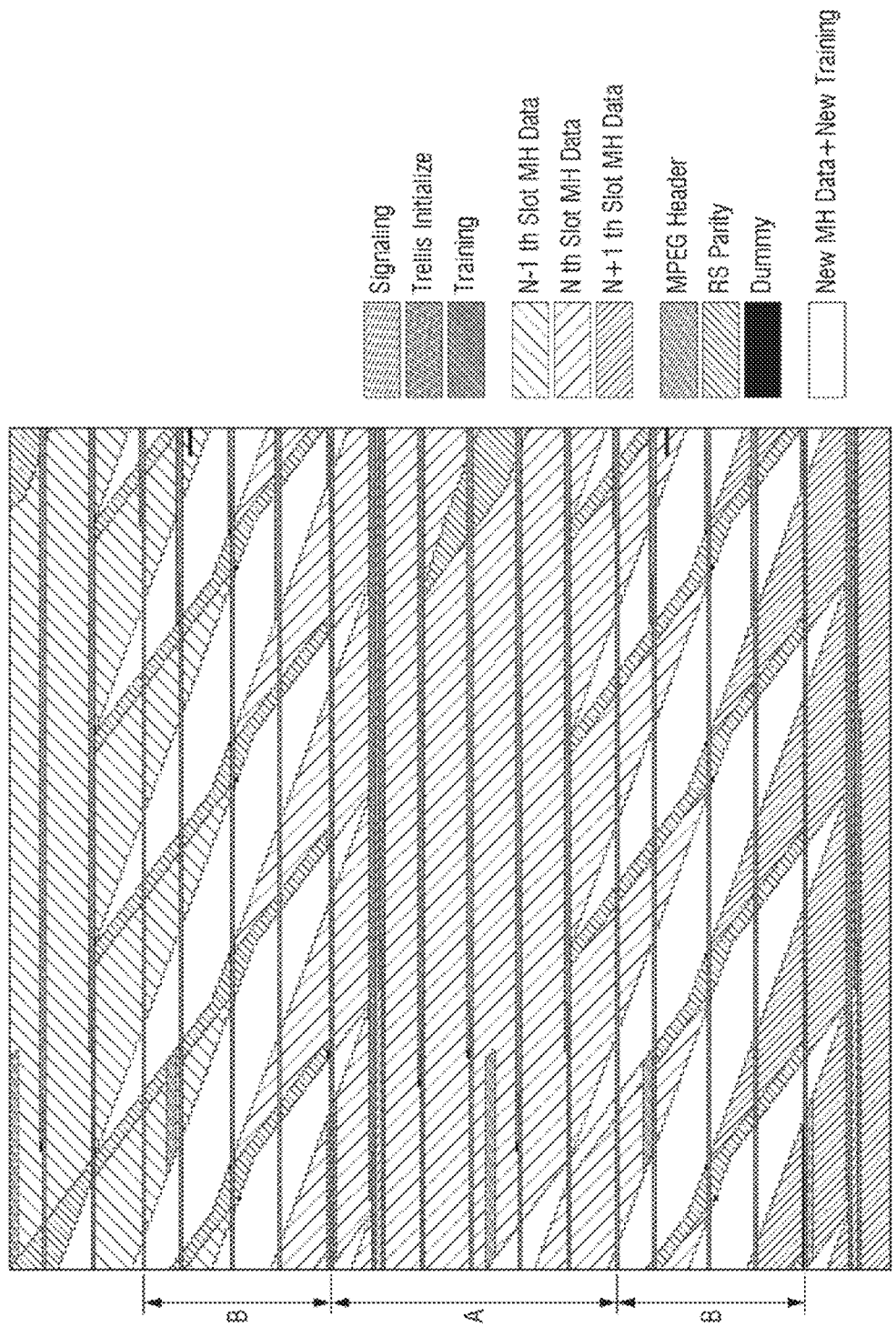

FIG. 16 depicts the structure of the transport stream for transmitting the mobile data and the known data using part of the first region allocated to the existing mobile data together with the packets allocated to the normal data, that is, the second region.

Referring to FIG. 16, in the region A, that is, the body region where the existing mobile data is gathered, the known data is arranged in the form of 6 long training sequences. Also, the known data is arranged in the form of the long training sequences also in the region B. To arrange the known data as the long training sequences in the regions, both the 38 packet region and at least some of 118 packets allocated to the existing mobile data include the known data. New mobile data is placed in the remaining region of the 38 packets not including the known data. Accordingly, error correction performance of the region B can be improved.

Meanwhile, as the known data is newly added to part of the region for the existing mobile data, it is possible to add information relating to the new known data location to the existing (i.e., related art) signaling data or to process the header of the existing mobile packet into which the new known data is inserted into a format unrecognizable by the related art mobile data receiver, for example, into a null packet format, for the sake of the compatibility with the existing mobile data receiver. Hence, the existing mobile data receiver does not malfunction because it does not recognize the newly added known data at all.

Figure 17:

FIG. 17 depicts the stream construction in which at least one of the mobile data and the known data is placed even in a location such as the MPEG header, the RS parity, at least part of the dummy, and existing M/H data. In this case, a plurality of new mobile data can be placed according to the location.

That is, compared to FIG. 15, FIG. 17 shows that new mobile data and new known data are formed in the MPEG header, the RS parity, and part of the dummy. The mobile data inserted to those portions and the mobile data inserted into the normal data packet may be different or the same data.

Furthermore, the new mobile data may be arranged throughout the whole existing mobile data region.

The stream as constructed in FIG. 17 can further enhance the transmission efficiency of the mobile data and the known data, as compared to FIGS. 15 and 16. In particular, a plurality of mobile data services can be provided.

The stream as constructed in FIG. 17 can notify whether the new mobile data is included or not by including new signaling data to the new mobile data region using existing signaling data or field sync.

Figure 18:
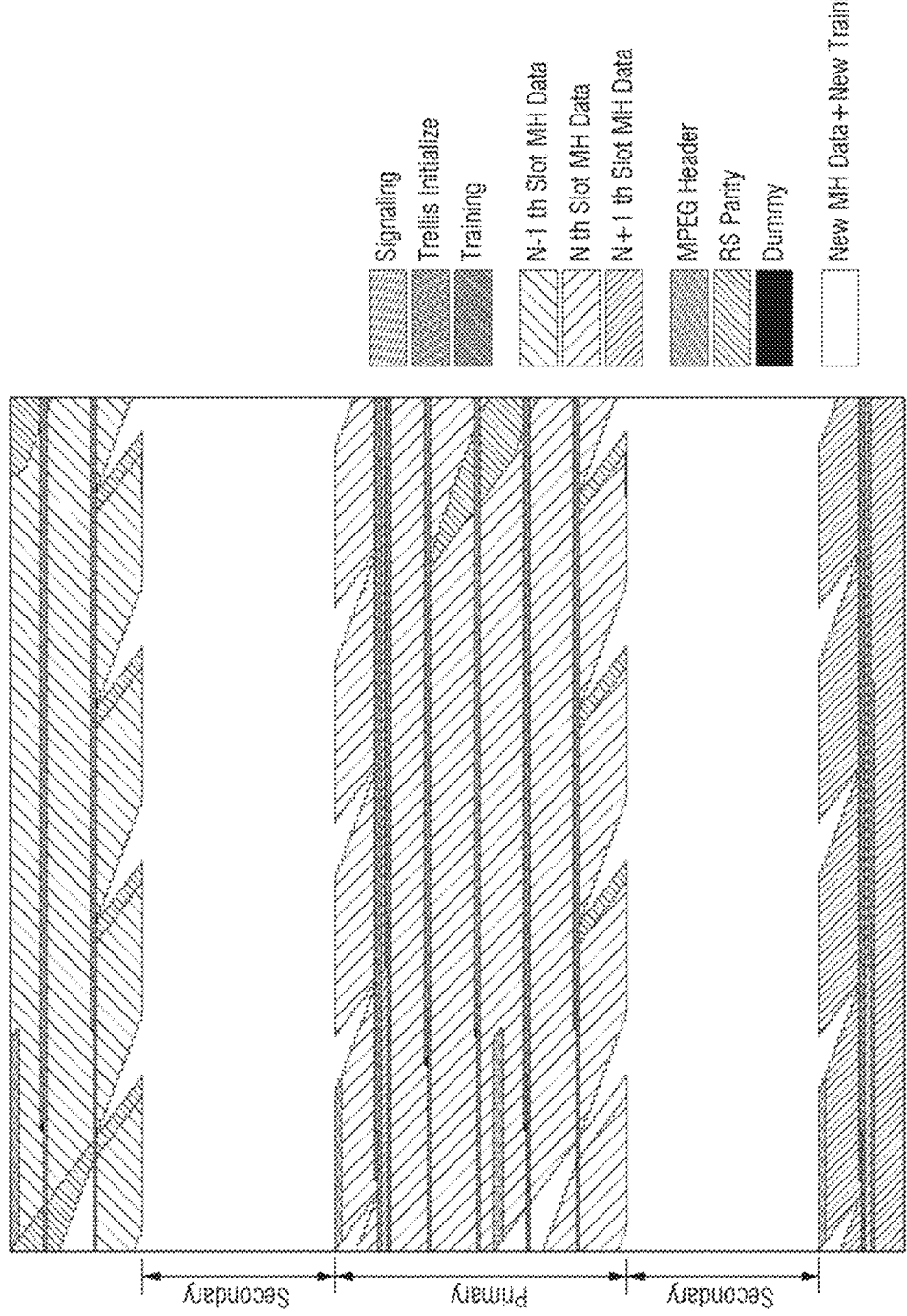

FIG. 18 depicts the stream which arranges the new mobile data and the known data in not only the second region but also the region B, that is, the first region corresponding to the secondary service portion.

As shown in FIG. 18, the entire stream is divided into a primary service region and a secondary service region. The primary service region can be referred to as a body region and the secondary service region can be referred to as a head/tail region. Since the head/tail region does not include the known data and includes data of different slots, its performance is lower than the body region. Accordingly, the known data can be arranged and used together with the new mobile data in this region. Herein, while the known data may be arranged in the form of, but not limited to, long training sequences like the body region, the known data may be distributed or arranged as a combination of the long training sequence and the distributed sequence.

Meanwhile, as the existing mobile data portion is used as the new mobile data region, the header of the packet including the new mobile data or the known data of the existing mobile data region can be generated in the format unrecognizable by the existing receiver, to thus maintain the compatibility with the receiver according to the related art ATSC-MH standard.

Alternatively, the existing signaling data or the new signaling data may notify this information.

Figure 19:
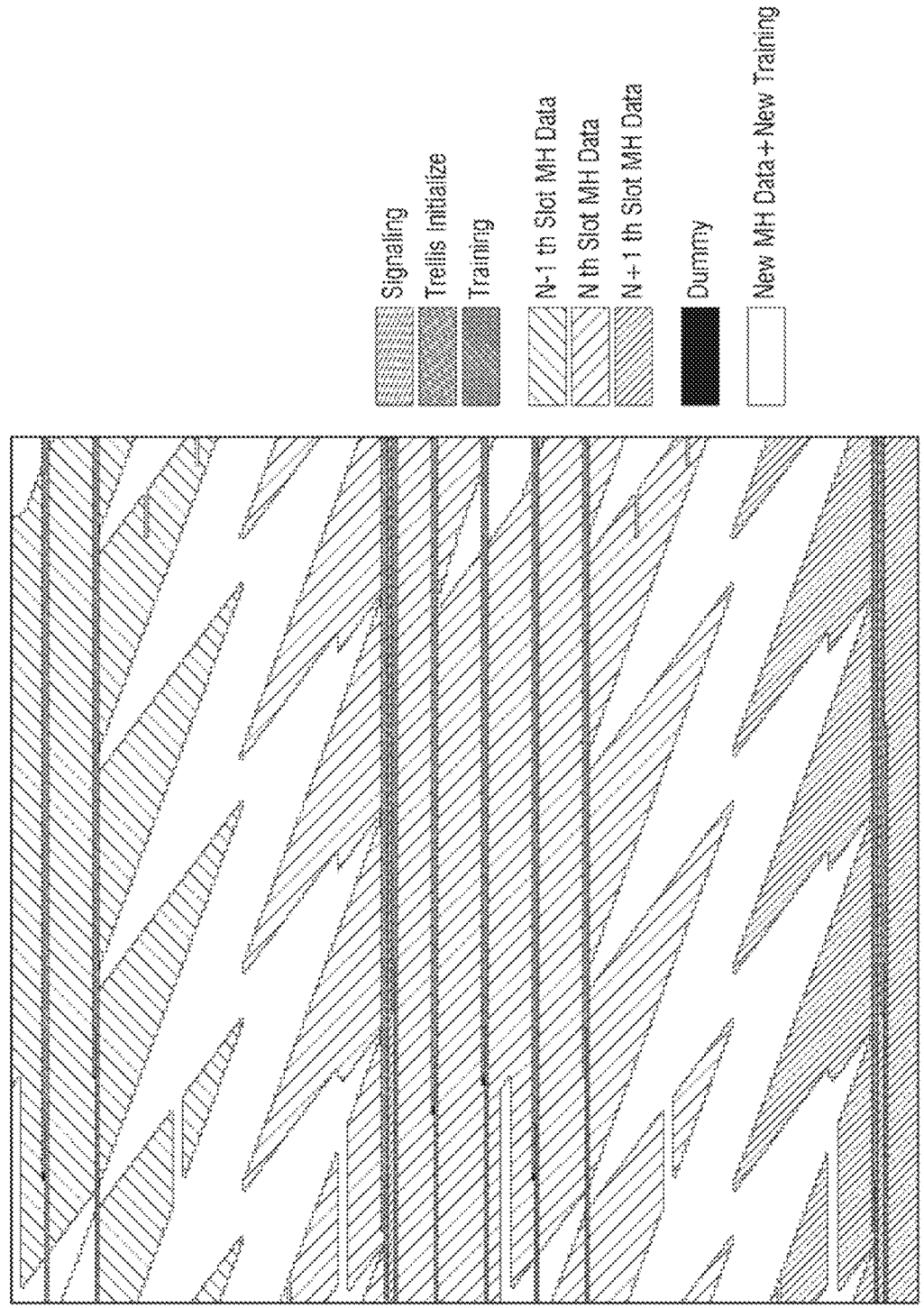

FIG. 19 depicts an example of the transport stream for transmitting new mobile data and known data using all of the related art normal data region, the MPEG header, the RS parity region, at least part of the dummy of the existing mobile data, and the existing mobile data region. FIG. 17 depicts the transmission of the new mobile data different from the new mobile data located in the normal data region using these regions, whereas FIG. 19 depicts the transmission of the new mobile data using all of the normal data region and the above-described regions.

Figure 20:
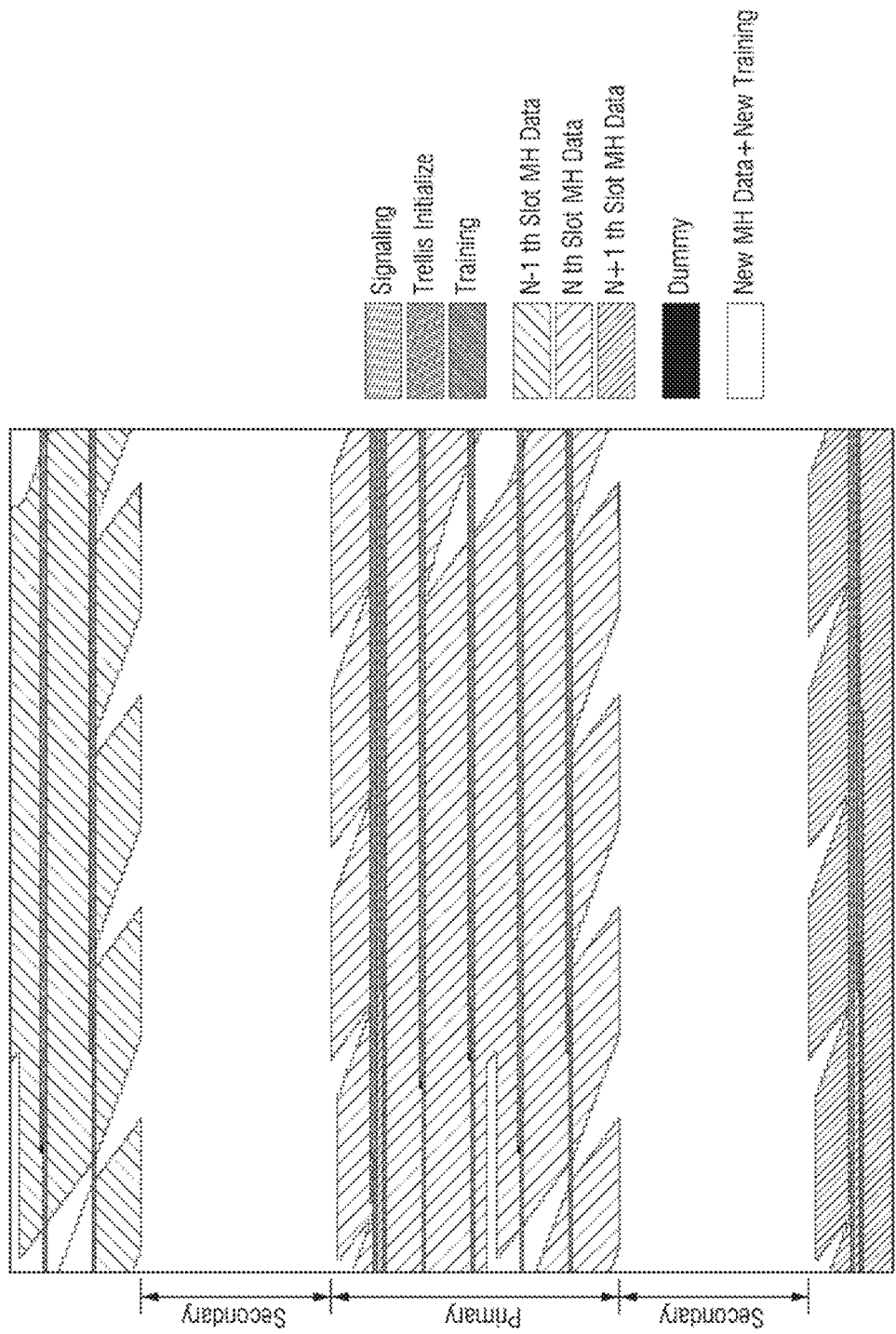

FIG. 20 depicts the transport stream for carrying new mobile data and known data using all of the entire region B, the normal data region, the MPEG header, the RS parity region, and at least part of the dummy of the existing mobile data.

As aforementioned, it is possible not to recognize the portion including the new mobile data and the known data for the sake of the compatibility with the existing receiver.

Figure 21:
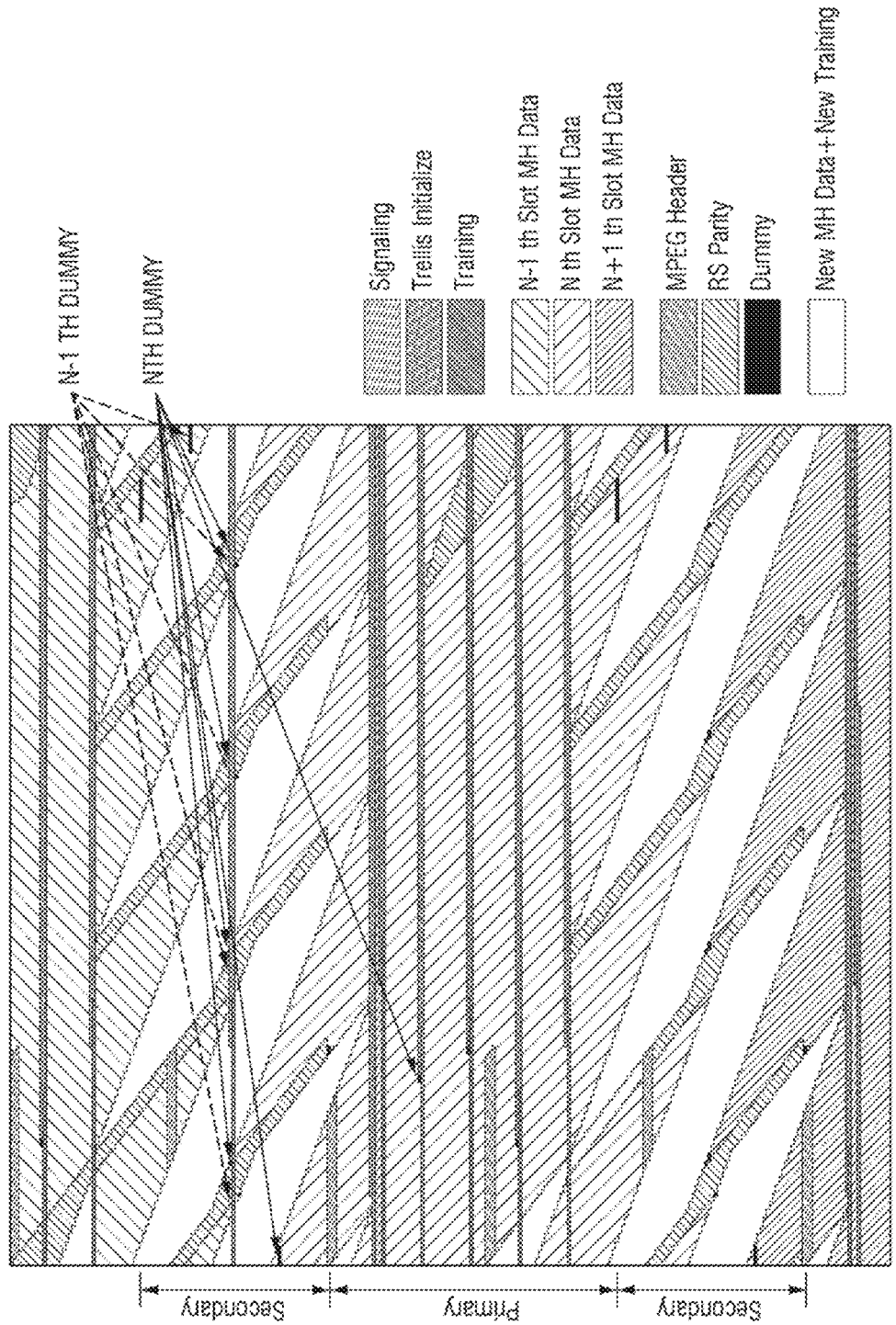

FIG. 21 depicts the transport stream when the dummy of the region used in the existing mobile data is replaced with the parity or the new mobile data region, and the mobile data and the known data are placed using the replaced dummy and the normal data region. Referring to FIG. 21, the dummy of the (N−1)-th slot and the dummy of N-th slot are shown.

As described above, FIGS. 15 through 21 depict the stream after interleaving. The data preprocessor 100 arranges the mobile data and the known data in appropriate locations so as to construct the stream of FIGS. 15 through 21 after interleaving.

More specifically, the data preprocessor 100 arranges the mobile data packets in the normal data region, that is, in the 38 packets in a certain pattern on the stream of section (a) of FIG. 1. In this case, the mobile data may be placed in the entire payload of the packet or in some region of the packet. Also, besides the normal data region, the mobile data can be placed in the region corresponding to the head or the tail of the existing mobile region after the interleaving.

Meanwhile, the known data can be arranged in each mobile data packet or in the normal data packet. In this case, the known data can be arranged continuously or intermittently in a vertical direction of FIG. 1A so that the known data after the interleaving is arranged as the long training sequence or similar long training sequence in a horizontal direction.

Also, besides the long training sequence, the known data can be distributed as stated earlier. Hereinafter, various examples of the arrangement of the known data are described.
[Arrangement of the Known Data]

As described above, the known data is placed in the adequate location by the group formatter 130 of the data preprocessor 100 and then interleaved by the interleaver 430 of the exciter 400 together with the stream. FIGS. 22 through 28 are diagrams of a known data arrangement method according to various exemplary embodiments.

Figure 22:
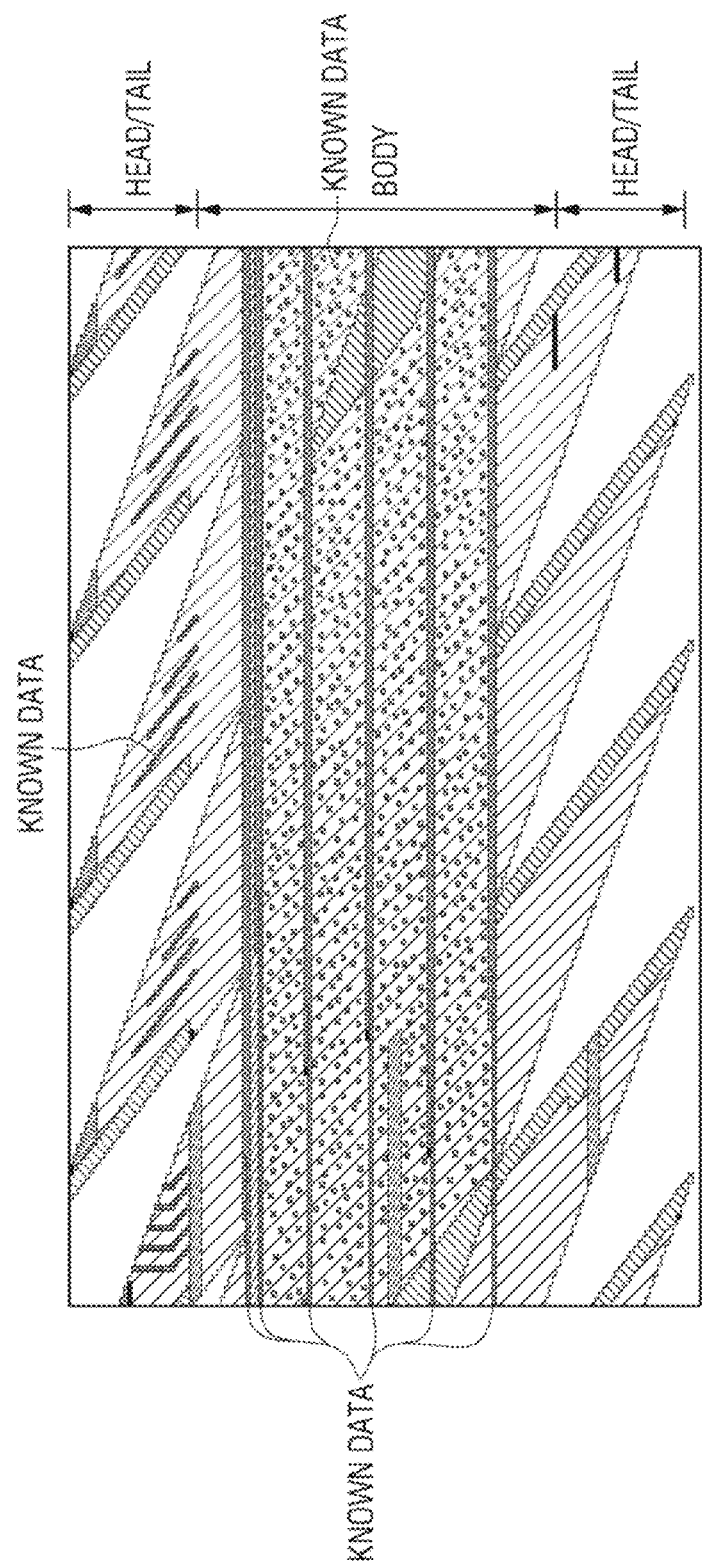
FIGS. 22 through 28 are diagrams of a known data insertion pattern according to various exemplary embodiments.

FIG. 22 depicts the distributed known data arranged with the existing long training sequence in the body region, and the additional arrangement of the known data in the conical part of the head/tail region, according to an exemplary embodiment. As such, by maintaining the related art known data and newly adding the known data, synchronization, channel estimation performance, and equalization performance of the receiver can be improved.

The arrangement of the known data of FIG. 22 is performed by the group formatter 130. The group formatter 130 can determine the insertion location of the known data by considering the interleaving rule of the interleaver 430. The interleaving rule can vary according to various exemplary embodiments. When knowing the interleaving rule, the group formatter 130 can properly determine the known data location. For example, when the known data of a certain size is inserted into part of the payload or a separate field every 4 packets, the known data distributed in a uniform pattern can be obtained through the interleaving.

Figure 23:
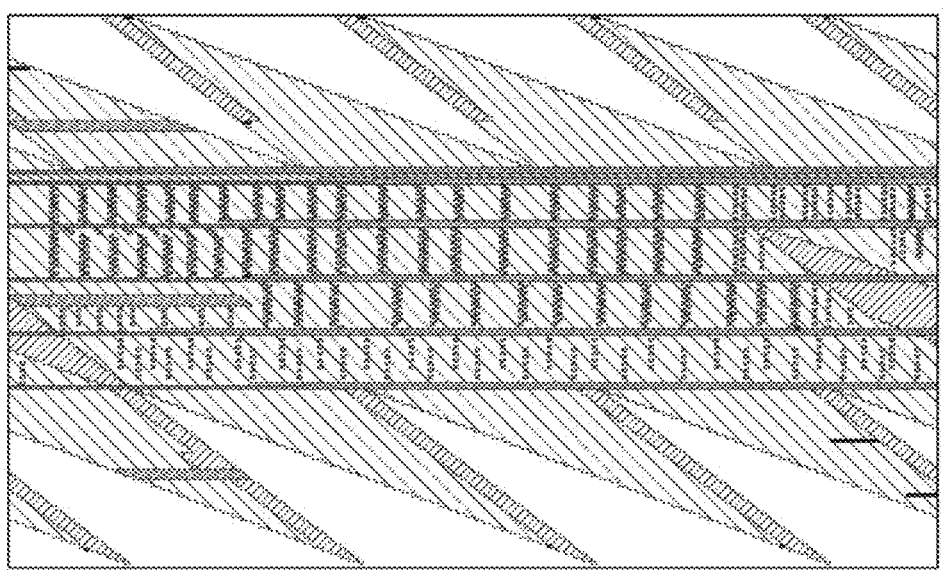

FIG. 23 depicts the stream according to another known data insertion method, according to an exemplary embodiment.

Referring to FIG. 23, the distributed known data of the conical region is not placed and the distributed known data is placed only in the body region together with a long training sequence.

Figure 24:
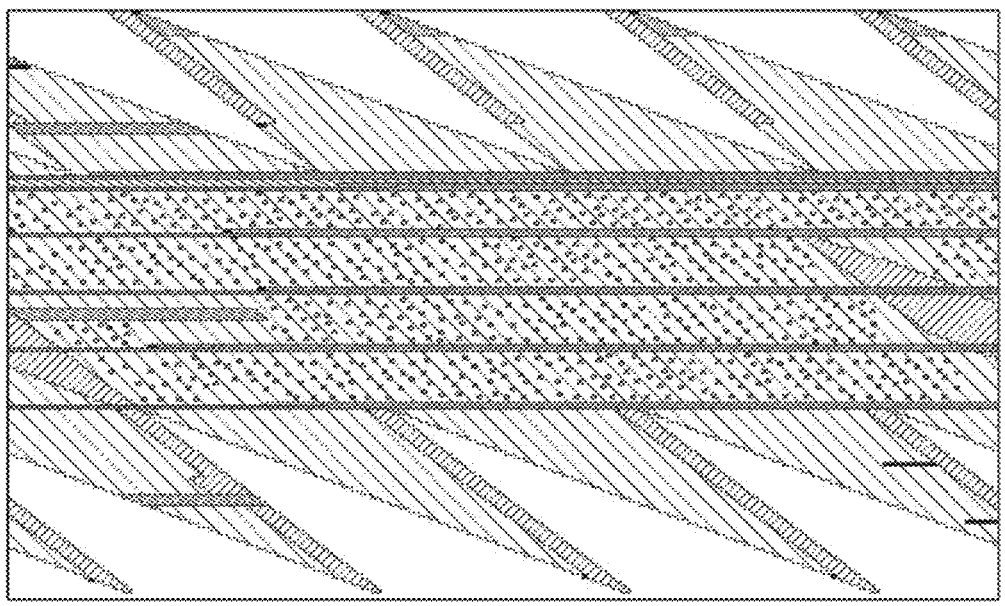

Next, FIG. 24 depicts the stream which reduces the length of the long training sequence, as compared to FIG. 23, and arranges the distributed known data as much as the reduced number, according to an exemplary embodiment. Accordingly, the data efficiency remains the same and Doppler tracking performance can be improved.

Figure 25:
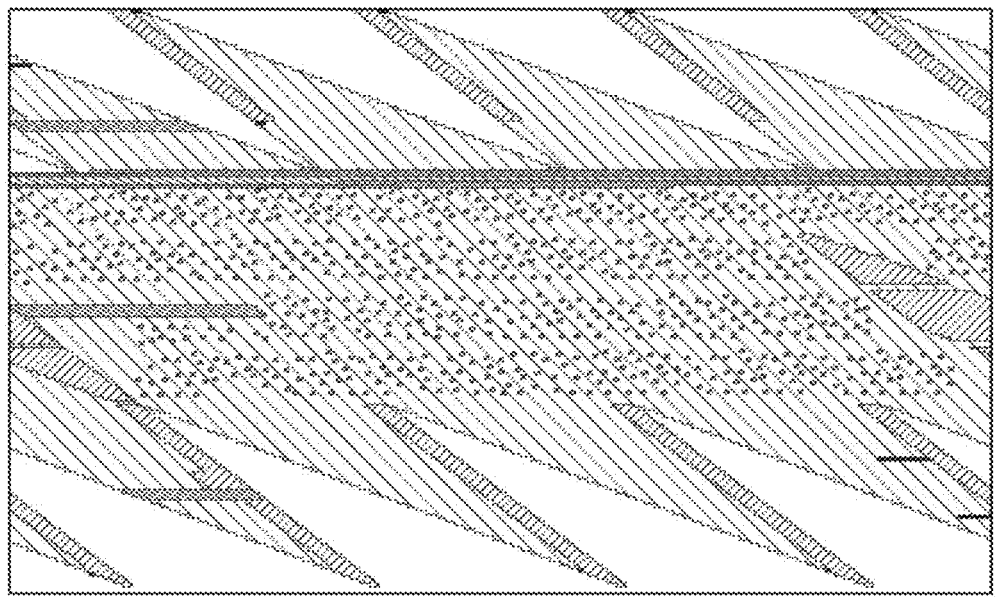

FIG. 25 depicts the stream according to yet another known data insertion method, according to an exemplary embodiment.

Referring to FIG. 25, the first sequence of the 6 long training sequences in the body region is maintained and the remaining sequences are replaced by the distributed known data. Hence, initial synchronization and channel estimation performance can be maintained according to the first long training sequence where the body region starts, and the Doppler tracking performance can be improved.

Figure 26:
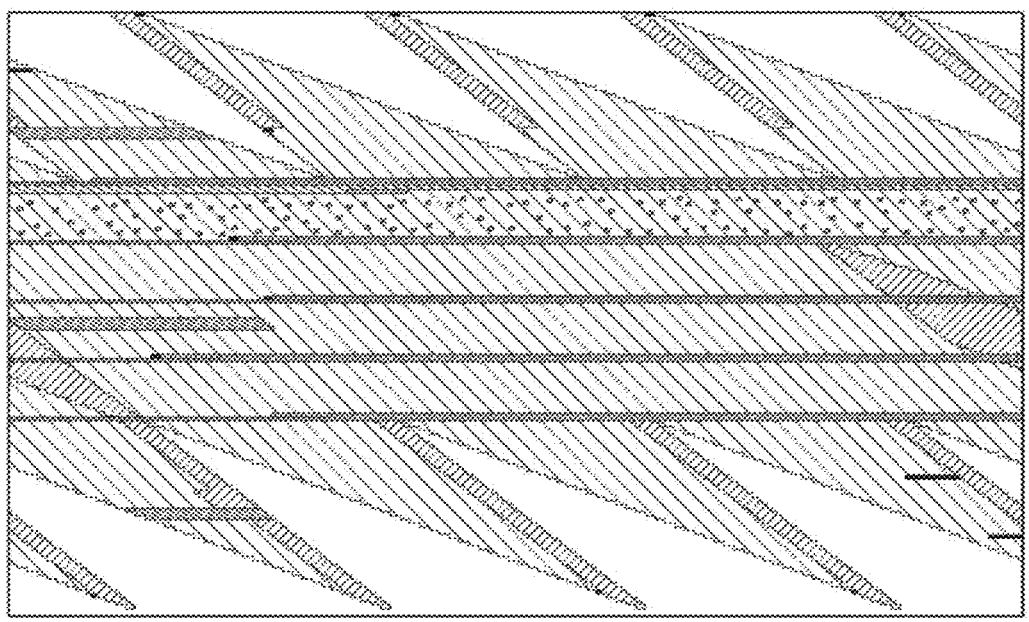

FIG. 26 depicts a stream according to still another known data insertion method, according to an exemplary embodiment. Referring to FIG. 26, the second sequence of the 6 long training sequences is replaced by distributed known data.

Figure 27:
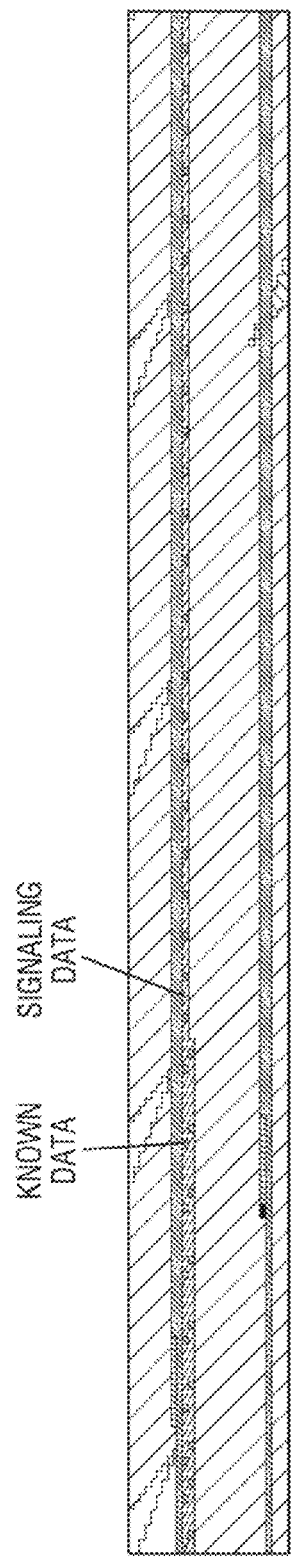

FIG. 27 depicts that the distributed known data replaced and the signaling data are alternately arranged in the stream of FIG. 26, according to an exemplary embodiment.

Figure 28:
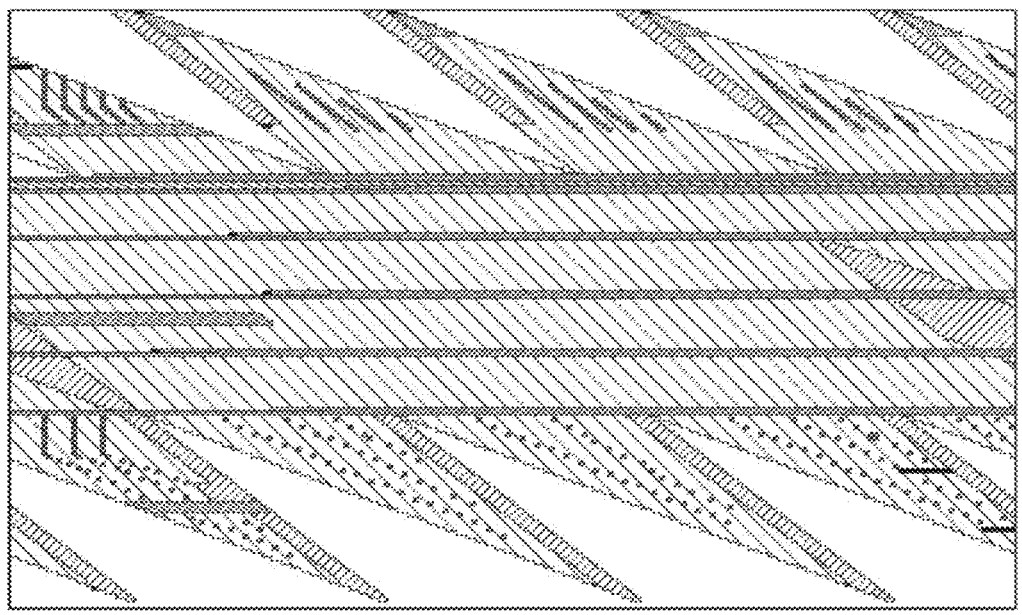

FIG. 28 depicts a stream which adds the distributed known data to not only the head region, but also the tail region, according to an exemplary embodiment.

As above, the known data can be arranged in various ways.

Meanwhile, when the mobile data is newly allocated to the packets allocated to the normal data, the allocation pattern can variously change. Hereinafter, the transport stream including the mobile data arranged in various manners according to a mode is explained.

[Arrangement of Mobile Data]

The data preprocessor 100 checks the setting status of the frame mode. The frame mode can vary. For example, a first frame mode can utilize the packets allocated to the normal data as the normal data and utilize only the packets allocated to the existing mobile data as the mobile data, and a second frame mode can utilize even at least part of the packets allocated to the normal data as the mobile data. Such a frame mode can be arbitrarily set by considering an intention of a digital broadcast transmission provider and a transmission and reception environment.

When determining the first frame mode which arranges the normal data in all of the packets allocated to the normal data, the data preprocessor 100 places the mobile data only in the packets allocated to the mobile data in the same way as in the related art ATSC-MH standard.

By contrast, when determining that the second frame mode is set, the data preprocessor 100 re-determines the setting status of the mode. The mode determines the pattern and the number of the packets for arranging the mobile data in the packets allocated to the normal data, that is, in the second region. Various modes can be provided according to various exemplary embodiments.

More specifically, the mode can be set to one of a mode which arranges the mobile data in some of the packets allocated to the normal data, a mode which arranges the mobile data in all of the packets allocated to the normal data, and an incompatible mode which arranges the mobile data in all of the packets allocated to the normal data and arranges the mobile data in the RS parity region and the header region provided for the compatibility with the receiver for receiving the normal data. In this case, the mode which arranges the mobile data only in some of the packets can be differently set to a mode for using the data region of some packets, that is, the entire payload region as the mobile data, or a mode for using only part of the payload region as the mobile data.

Specifically, when 38 packets correspond to the second region allocated to the normal data, the mode may be:

1) a first mode for arranging the new mobile data in 11 packets of the 38 packets allocated to the normal data, 2) a second mode for arranging the new mobile data in 20 packets of the 38 packets allocated to the normal data, 3) a third mode for arranging the new mobile data in 29 packets of the 38 packets allocated to the normal data, 4) a fourth mode for arranging the new mobile data in all of the 38 packets allocated to the normal data, and 5) a fifth mode for arranging the new mobile data in all of the 38 packets allocated to the normal data and in the regions corresponding to the MPEG header and the parity among the region allocated to the existing mobile data.

As above, the fifth mode can be referred to as an incompatible mode and the first through fourth modes can be referred to as compatible modes. A type of the compatible mode and the number of packets in each mode can vary.

Figure 29:
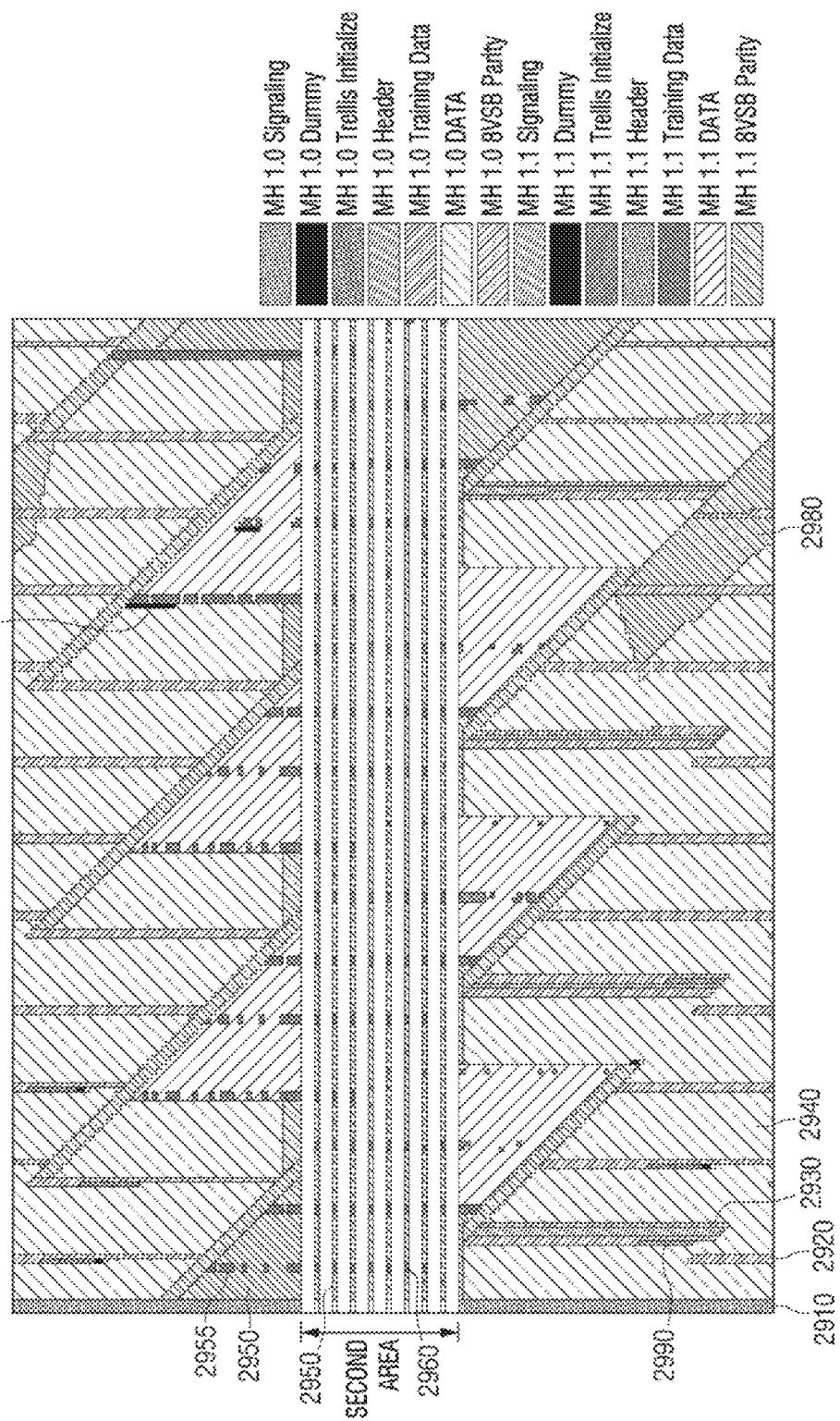
FIG. 29 is a diagram of a mobile data arrangement pattern in a normal data region according to a first mode, according to an exemplary embodiment.

FIG. 29 depicts a stream when the group formatter 130 arranges the mobile data and the known data according to the first mode in an exemplary embodiment where the new mobile data is transmitted using the second region and the head/tail region.

Referring to FIG. 29, new mobile data 2950 and known data 2960 are placed in the second region in a certain pattern, and new mobile data and known data are placed in a portion 2950 corresponding to the head/tail region 2950 besides the second region.

Also, an MPEG header 2910, known data 2920, signaling data 2930, existing mobile data 2940, and a dummy 2970 are arranged vertically in the stream. In this arrangement, when the normal data fills the empty space in the second region and then the encoding and interleaving are applied, the stream of FIG. 30 is generated.

Figure 30:
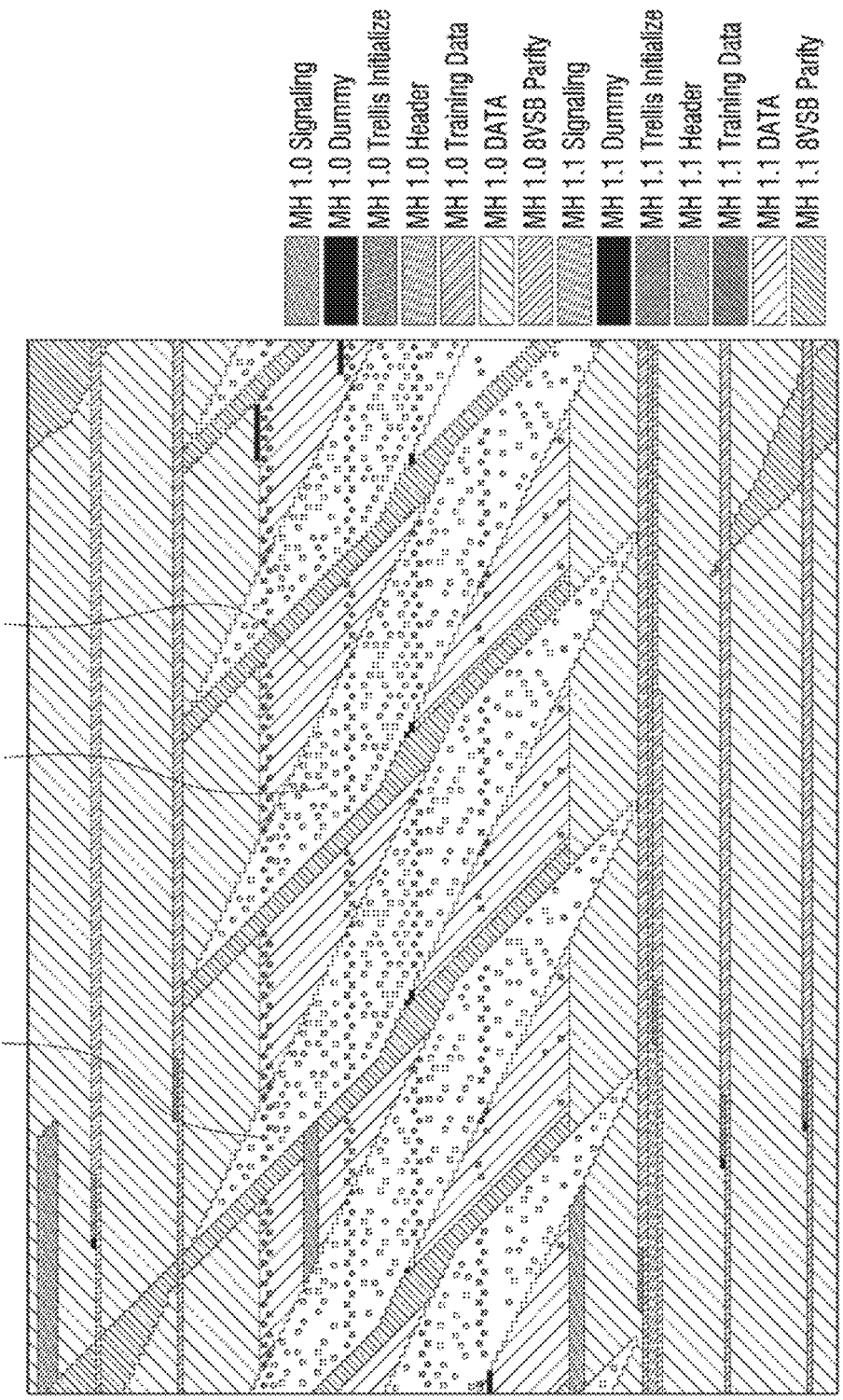
FIG. 30 is a diagram of the interleaved stream of FIG. 29, according to an exemplary embodiment.

FIG. 30 depicts a stream after interleaving in the first mode, according to an exemplary embodiment.

Referring to FIG. 30, new mobile data 3010 and known data 3030 are placed in part of a packet region allocated to the normal data. In particular, the known data is arranged discontinuously in the second region, thus forming long training sequences similar to the long training sequences of the body region.

The mobile data 2950 placed in the portion corresponding to the head/tail region in FIG. 29, corresponds to the mobile data 3020 placed in the head/tail region of FIG. 30, and the known data 2955 placed together with the mobile data 2950 forms the known data 3030 of similar long training sequences together with the known data in the second region in FIG. 30.

Figure 31:
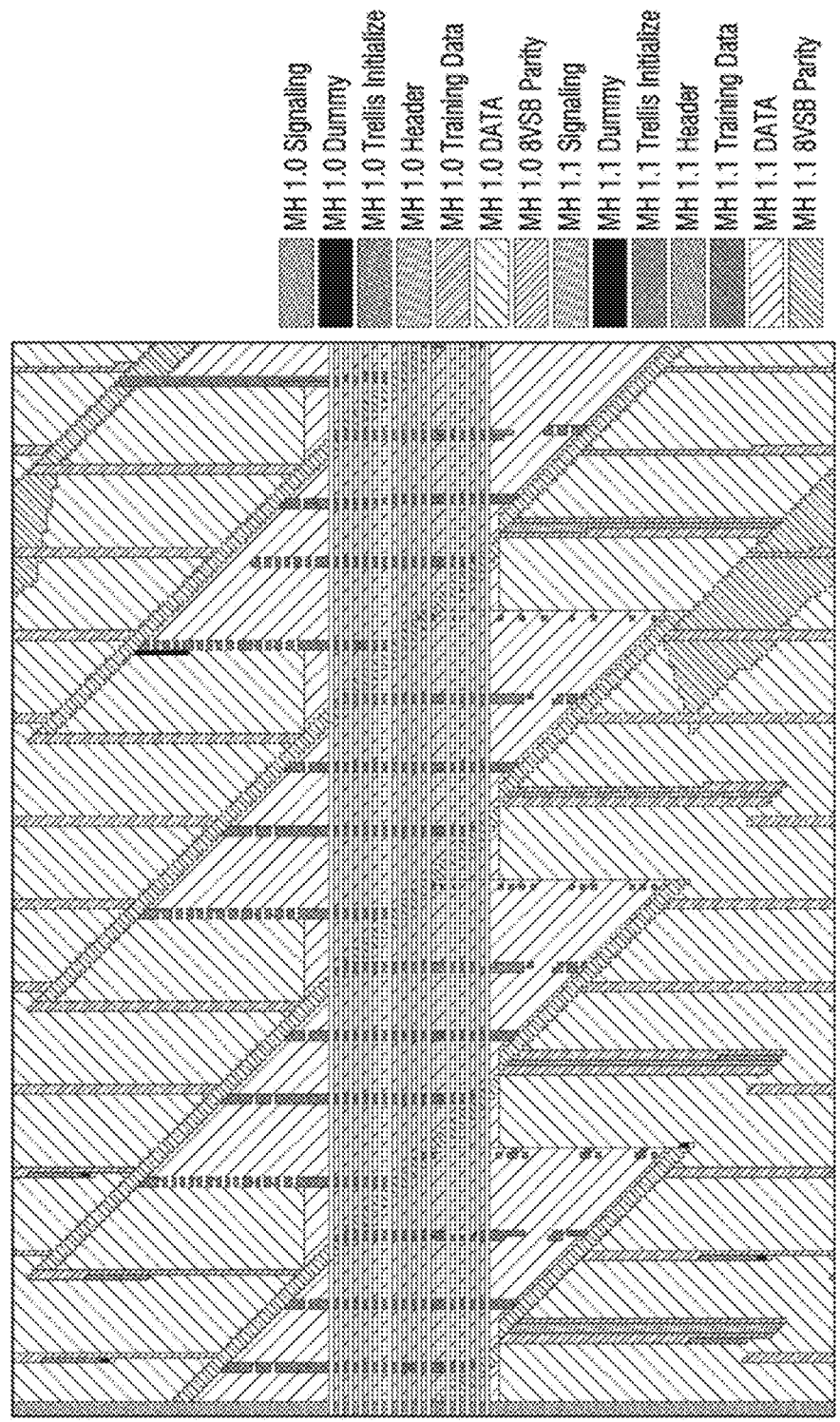
FIG. 31 is a diagram of a mobile data arrangement pattern in the normal data region according to a second mode, according to an exemplary embodiment.

FIG. 31 depicts a stream when the group formatter 130 places mobile data and known data according to the second mode in an exemplary embodiment where new mobile data is transmitted using the second region and the head/tail region.

In FIG. 31, the rate of the mobile data included in the second region is greater than FIG. 29. Compared to FIG. 29, the portion occupied by the mobile data and the known data is increased in FIG. 31.

Figure 32:
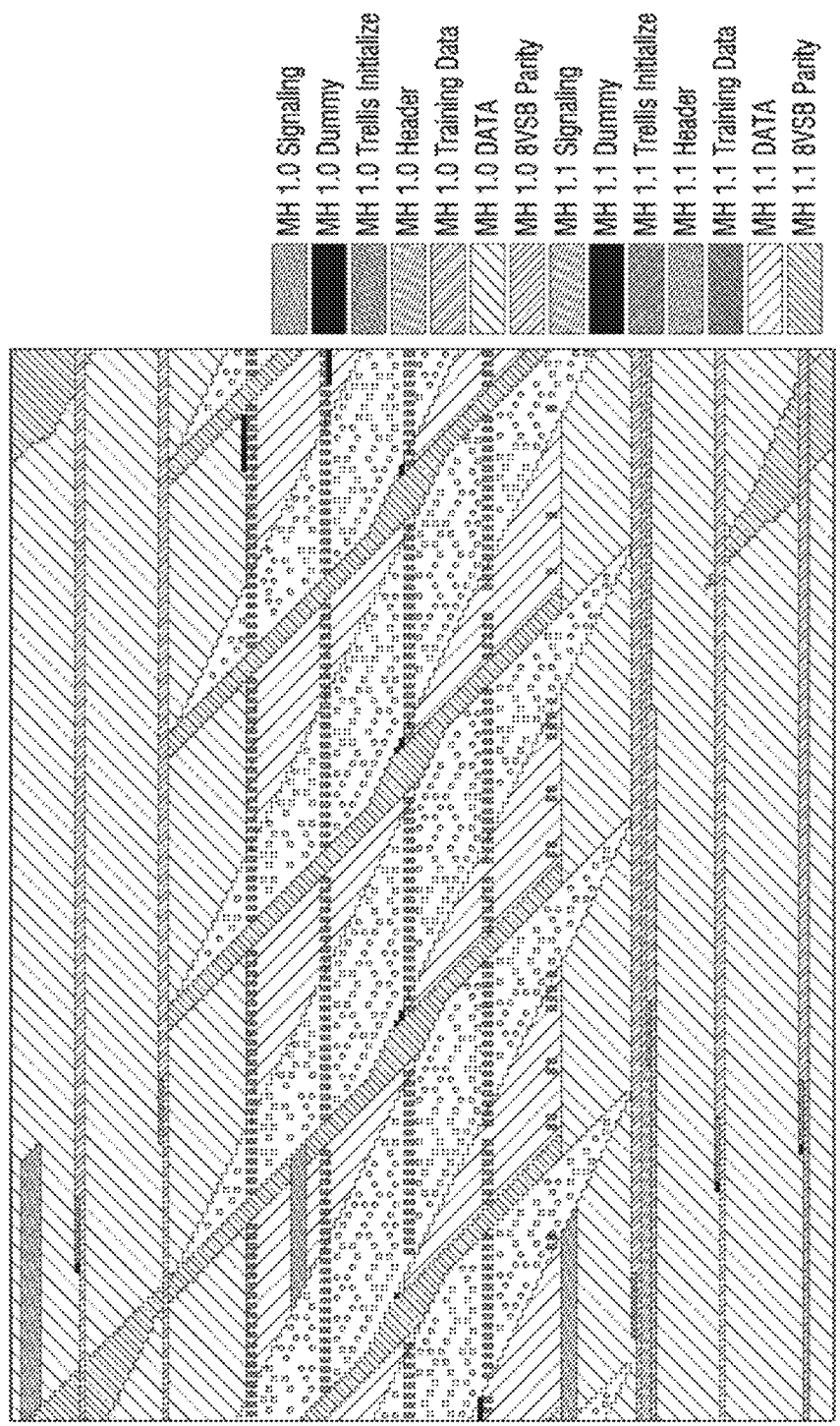
FIG. 32 is a diagram of the interleaved stream of FIG. 31, according to an exemplary embodiment.

FIG. 32 depicts the interleaved stream of FIG. 31, according to an exemplary embodiment. Referring to FIG. 32, the known data in the second region forms similar long training sequence more densely than the known data of the second region of FIG. 30.

Figure 33:
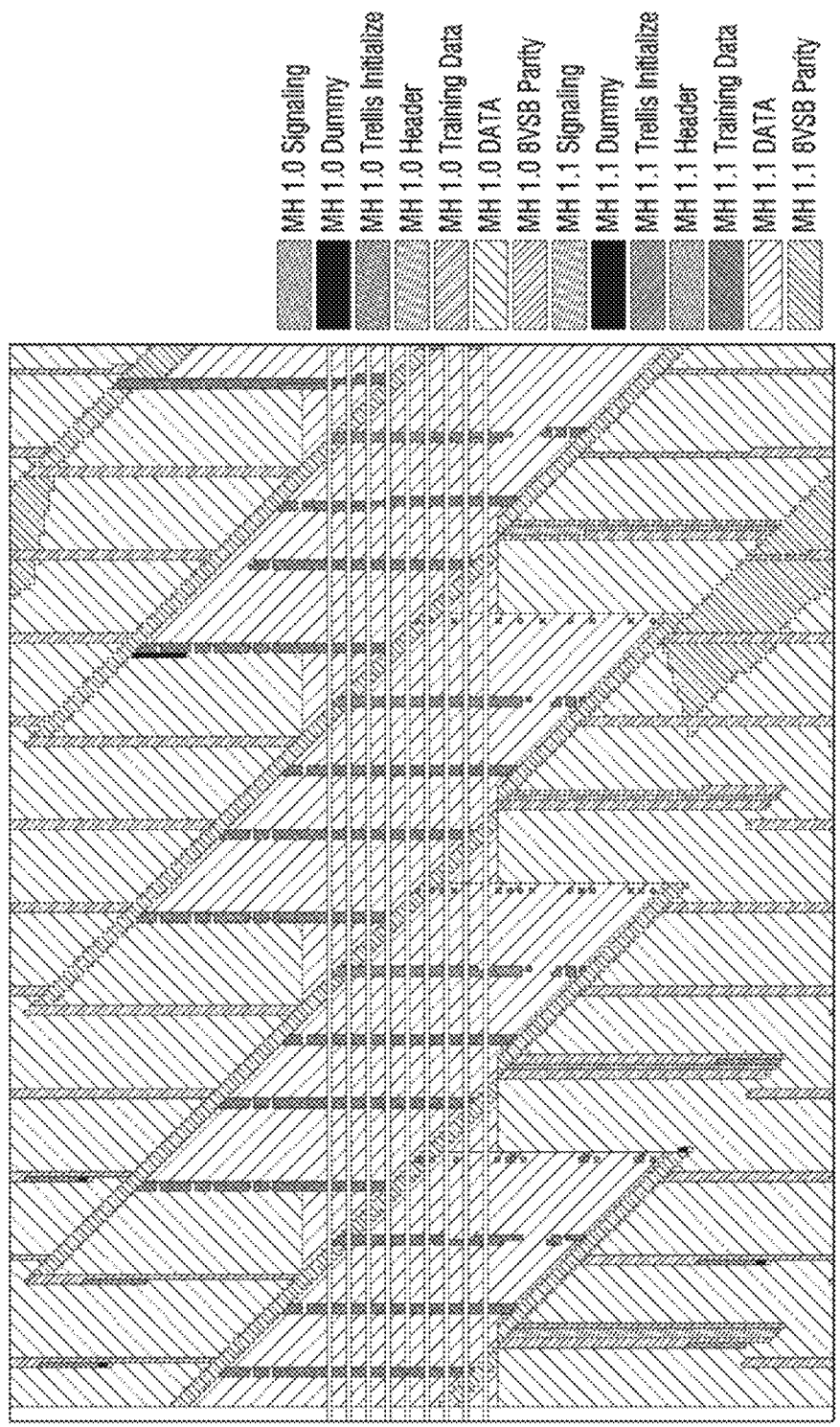
FIG. 33 is a diagram of a mobile data arrangement pattern in the normal data region according to a third mode, according to an exemplary embodiment.
Figure 34:
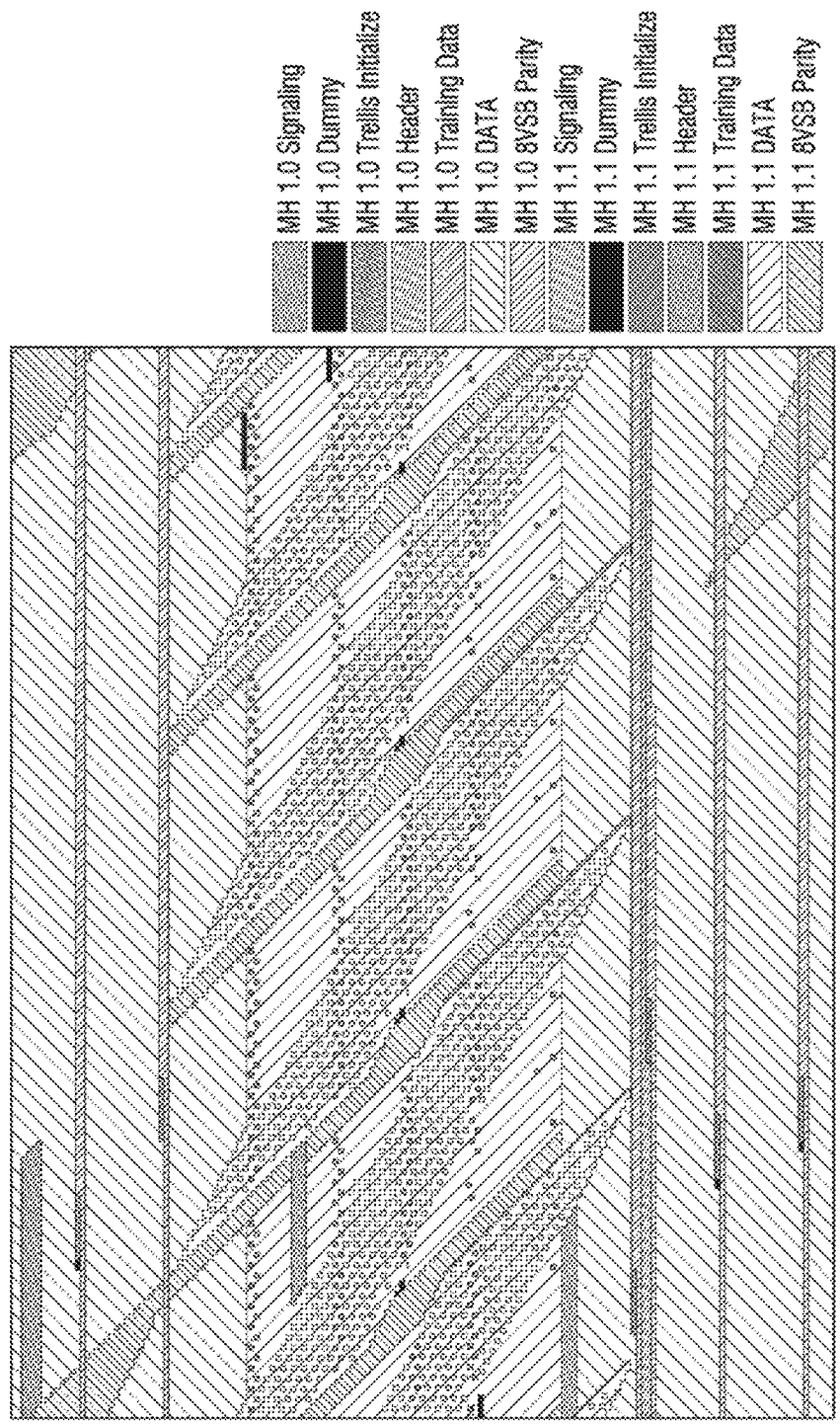
FIG. 34 is a diagram of the interleaved stream of FIG. 33, according to an exemplary embodiment.

FIG. 33 depicts a stream when the group formatter 130 places mobile data and known data according to the third mode in an exemplary embodiment where new mobile data is transmitted using the second region and the head/tail region. FIG. 34 depicts the interleaved stream of FIG. 33, according to an exemplary embodiment.

FIGS. 33 and 34 illustrate a denser arrangement of the mobile data and the known data than the first mode and the second mode.

Figure 35:
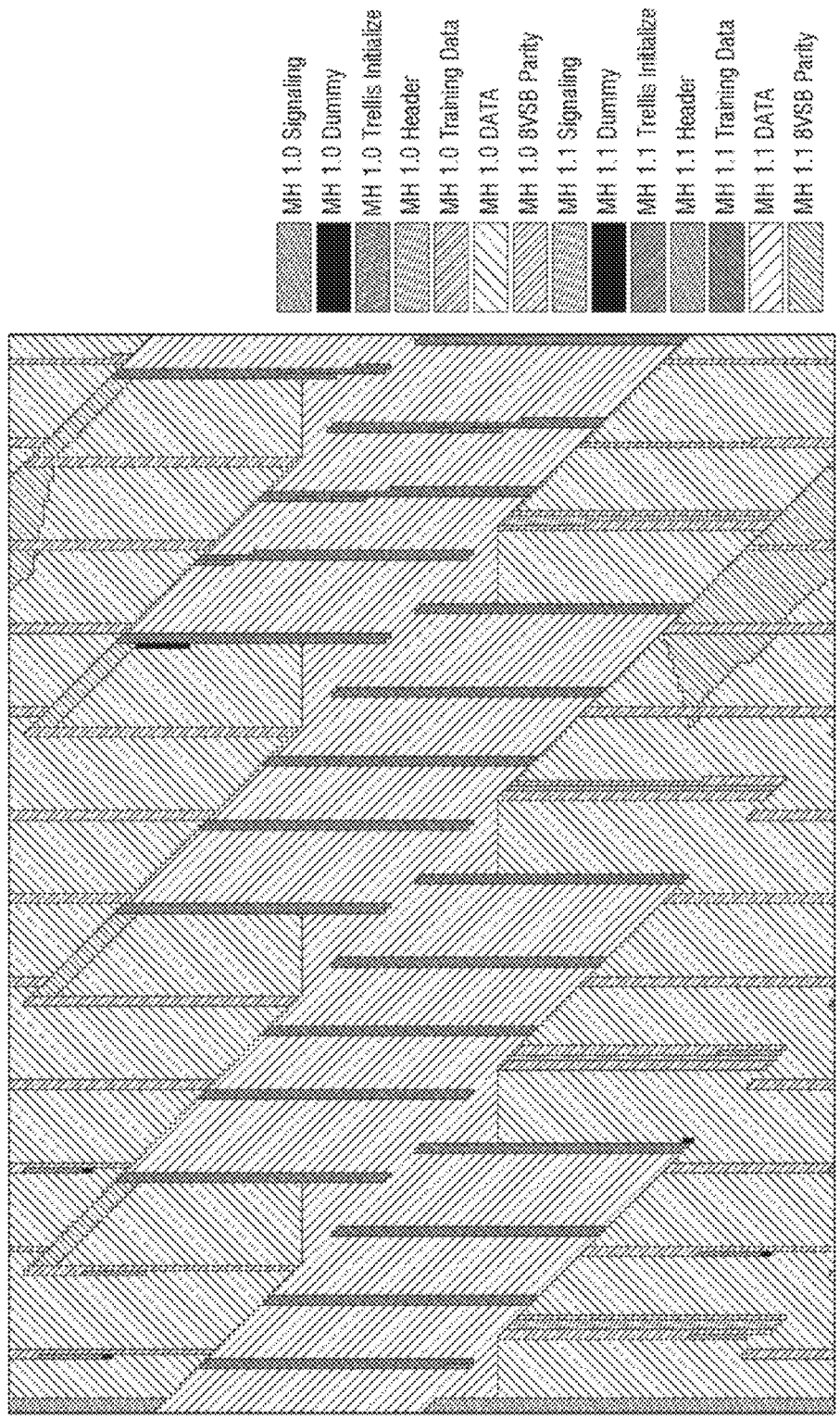
FIG. 35 is a diagram of a mobile data arrangement pattern in the normal data region according to a fourth mode, according to an exemplary embodiment.

FIG. 35 depicts a stream according to the fourth mode using the entire normal data region in an exemplary embodiment where all of the packets allocated to the normal data and the packet region allocated to the existing mobile data, which corresponds to the head/tail region, are usable.

Referring to FIG. 35, the known data is arranged in a vertical direction in the second region and its peripheral region, and the other region is filled with new mobile data.

Figure 36:
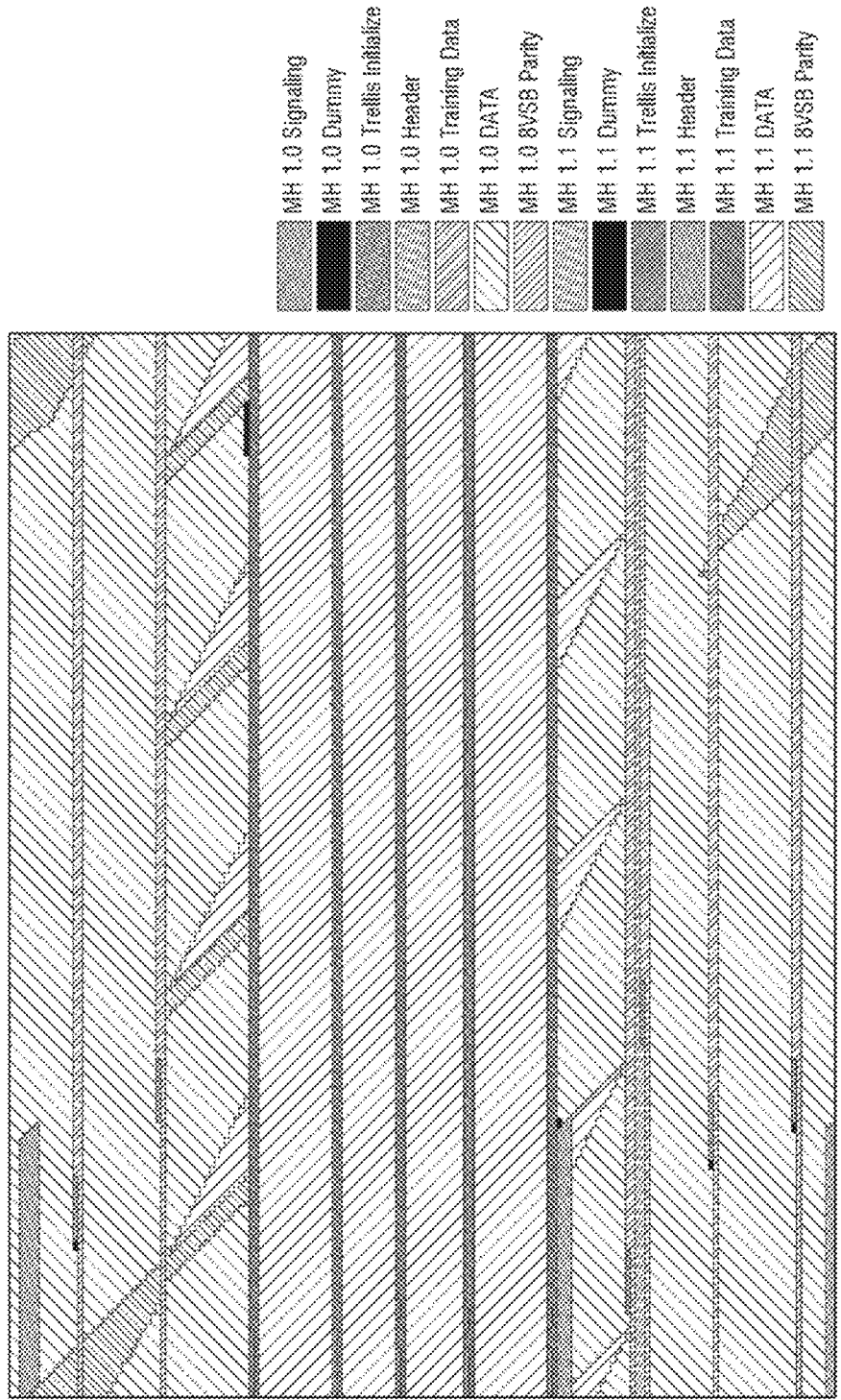
FIG. 36 is a diagram of the interleaved stream of FIG. 35, according to an exemplary embodiment.

FIG. 36 depicts the interleaved stream of FIG. 35. Referring to FIG. 36, the head/tail region and the entire normal data region are filled with the new mobile data and the known data, and in particular, the known data is arranged in the form of long training sequences.

In these regions, the known data may be repeatedly inserted little by little according to a plurality of pattern periods to become the distributed known data after interleaving.

Figure 37:
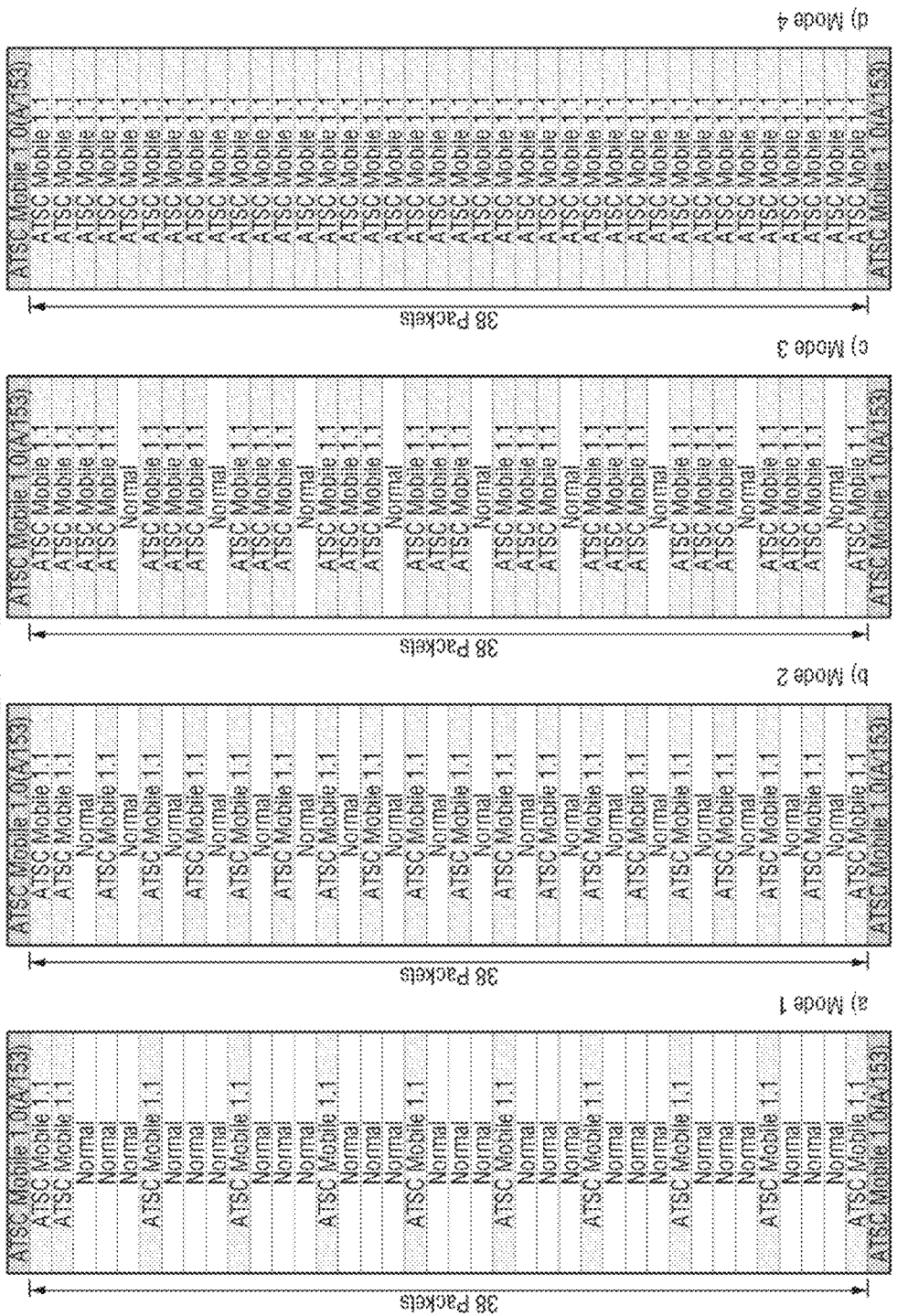
FIGS. 37 through 40 are diagrams of the mobile data arrangement pattern according to various modes of exemplary embodiments.

FIG. 37 is a diagram of a method for inserting the new mobile data into the second region, that is, into the packets (for example, 38 packets) allocated to the normal data in various modes, according to an exemplary embodiment. Hereinafter, to ease the understanding, the new mobile is referred to as ATSC mobile 1.1 data (or 1.1 version data), and the existing mobile data is referred to as ATSC mobile 1.0 data (or 1.0 version data).

a) In the first mode, the 1.1 version data can be placed in each of first and last packets, and one 1.1 packet and 3 normal data packets can be repeatedly inserted into the packets between the first and last packets. Accordingly, 11 packets in total can be used to transmit the 1.1 version data, that is, the new mobile data.

b) In the second mode, similarly, the 1.1 version data can be placed in each of the first and last packets, and one 1.1 packet and one normal data packet can be alternately placed in packets between the first and last packets repeatedly. Accordingly, 20 packets in total can be used to transmit the 1.1 version data, that is, the new mobile data.

c) In the third mode, similarly, the 1.1 version data can be placed in each of the first and last packets, and three 1.1 packets and one normal data packet can be repeatedly placed in the packets between them.

d) In the fourth mode, all of the packets corresponding to the second region can be used to transmit the 1.1 version data.

Herein, the fourth mode can be realized as the compatible mode which uses only the packets corresponding to the second region to transmit the 1.1 version data, or the incompatible mode which fills not only the packets corresponding to the second region, but also the MPEG header and the parity region provided for the compatibility with the normal data receiver with the 1.1 version data. Alternatively, the incompatible mode may be provided as a separate fifth mode.

The cases using ¼, 2/4, ¾, and 4/4 of all the packets of the second region to transmit the mobile data can correspond to the first through fourth modes respectively. However, in an exemplary case, the total number of the packets is 38, which is not a multiple of 4. Accordingly, the modes may be divided by fixing some packets for the purpose for transmitting the new mobile data or the normal data packet and classifying the remaining packets according to the above rate as shown in FIG. 37. That is, referring to sections (a), (b), and (c) of FIG. 37, among the 38 packets, 36 packets other than a preset number of packets, that is, 2 packets, can include 1.1 packets in the rates of ¼, 2/4, and ¾.

Figure 38:
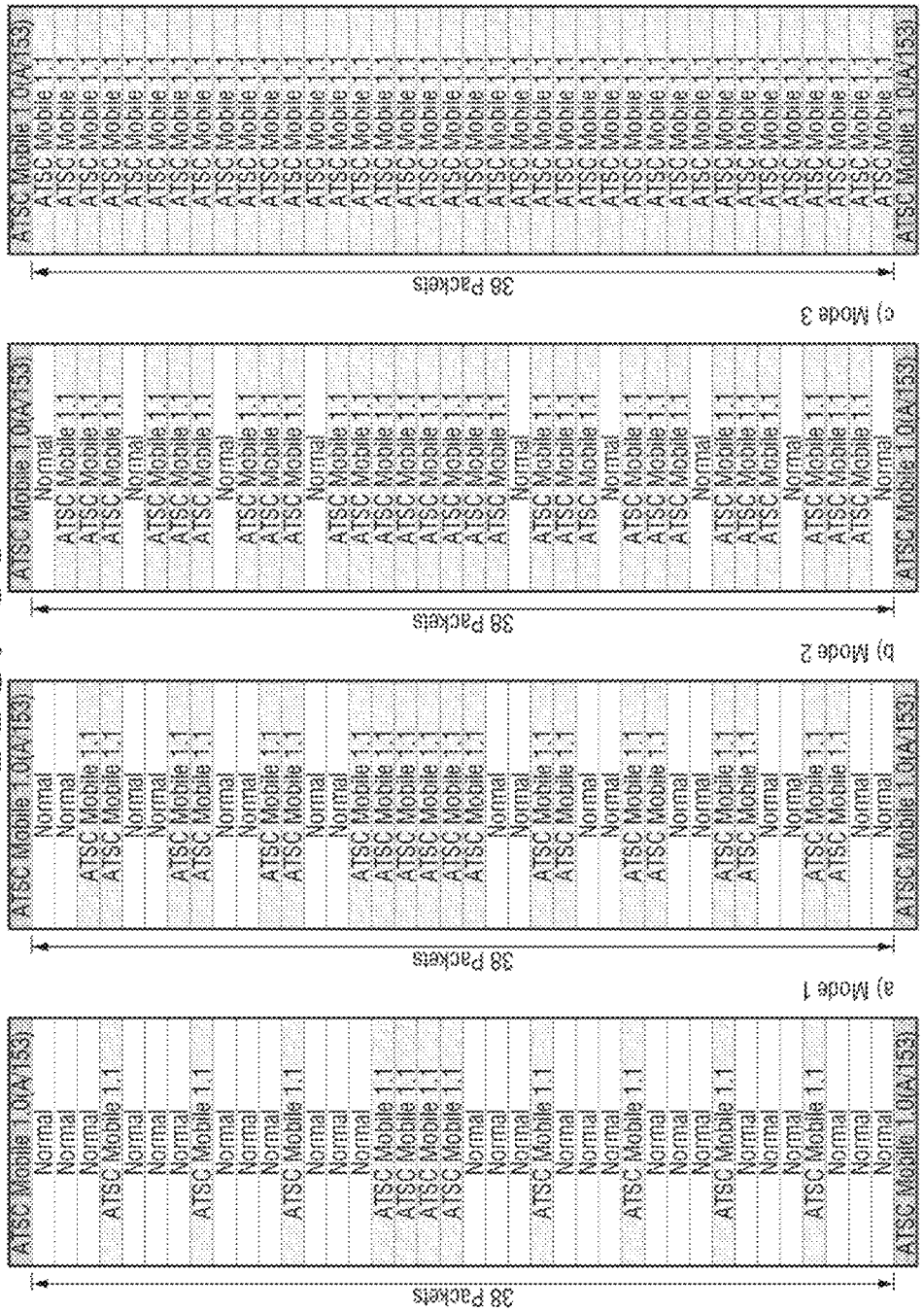

FIG. 38 is a diagram of a mobile data arrangement pattern in different modes.

Referring to FIG. 38, two 1.1 version data are placed in a center packet based on the location of the stream among the total packets in the second region, that is, 38 packets, and the 1.1 version data and the normal data are placed in the other packets according to a set rate in each mode.

That is, a) the first mode arranges the mobile data in packets other than the 2 center packets by repeating 3 normal data packets and one 1.1 version data packet in the upper portion and repeating one 1.1 version data packet and 3 normal data packets in the lower portion.

b) The second mode arranges the mobile data in packets other than the 2 center packets by repeating two normal data packets and two 1.1 version data packets in the upper portion and repeating two 1.1 version data packets and two normal data packets in the lower portion.

c) The third mode arranges the mobile data in packets other than the 2 center packets by repeating one normal data packet and three 1.1 version data packets in the upper portion and repeating three 1.1 version data packets and one normal data packet in the lower portion.

d) The fourth mode arranges all of the packets as the 1.1 version data, which is the same as the fourth mode of FIG. 37.

Figure 39:
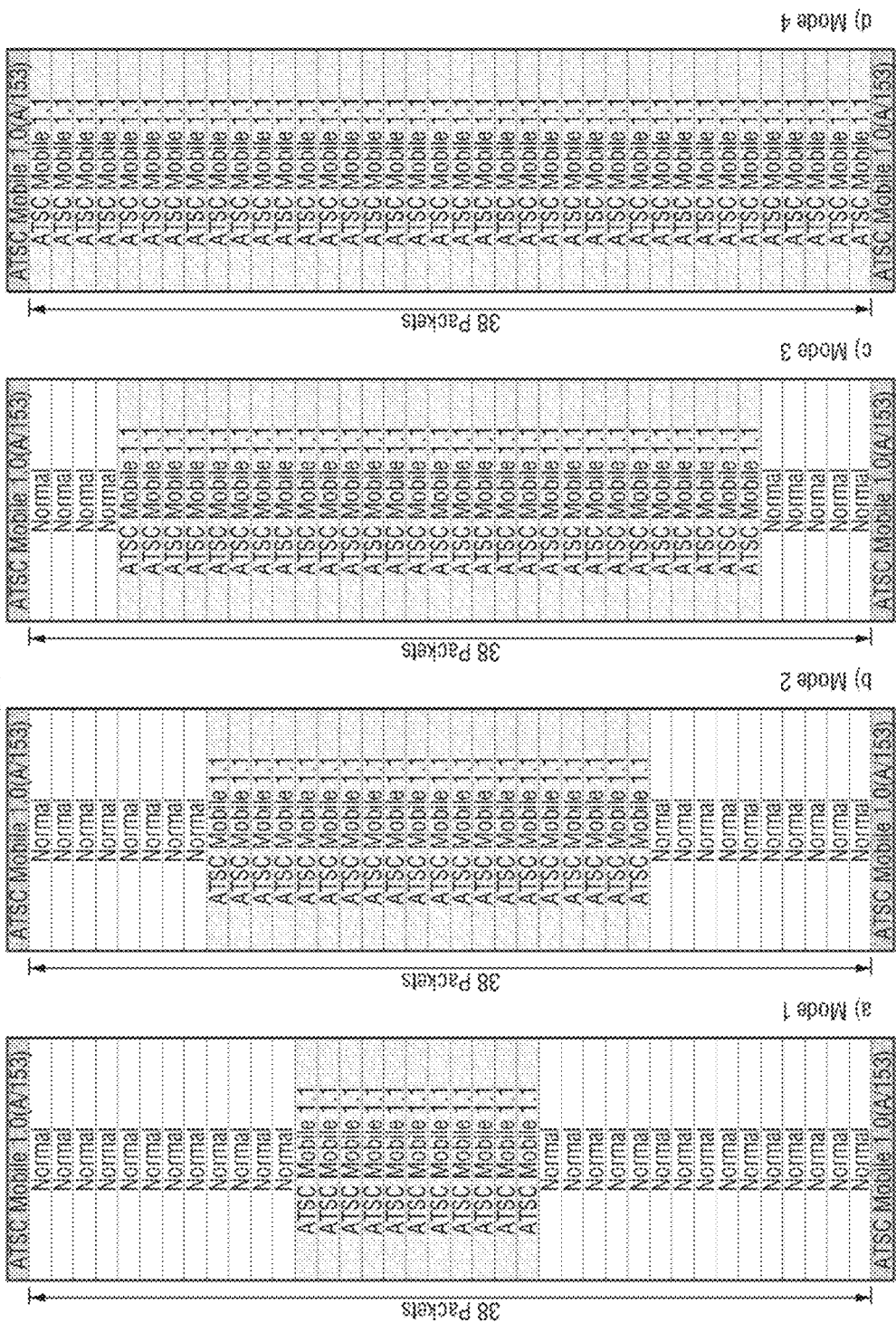

Next, FIG. 39 depicts a sequential arrangement of 1.1 version data from the center packet to the upper and lower packets based on the location on the stream.

That is, the first mode of section (a) of FIG. 39 sequentially arranges 11 packets upward and downward from the center of all of the packets of the second region.

The second mode of section (b) of FIG. 39 sequentially arranges 20 packets in total upward and downward from the center, and the third mode of section (c) of FIG. 39 sequentially arranges 30 packets in total upward and downward from the center. The fourth mode of section (d) of FIG. 39 fills all of the packets with the 1.1 version data.

Figure 40:
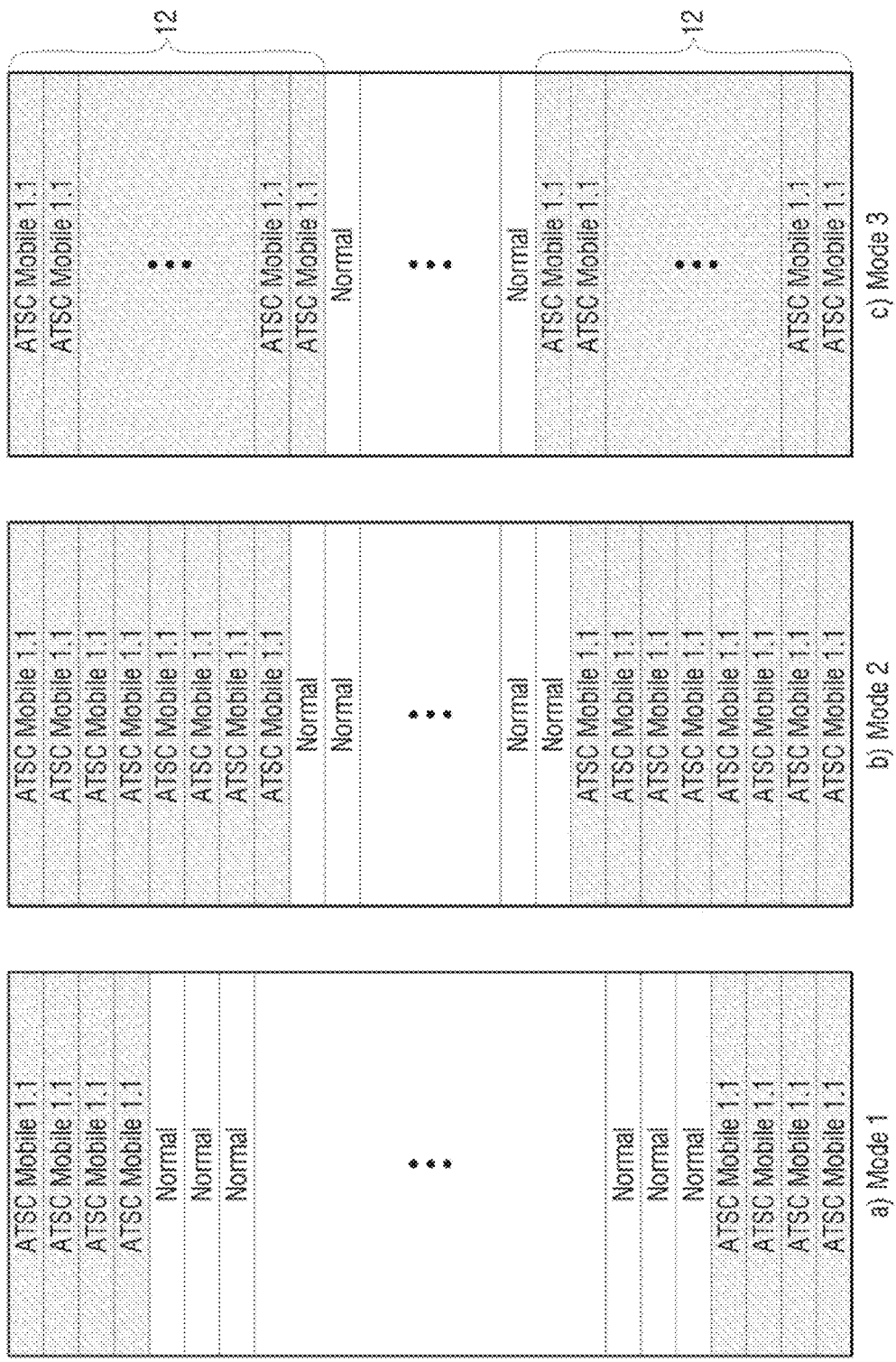

FIG. 40 depicts a stream, according to an exemplary embodiment, which sequentially stuffs the mobile data from top and bottom packets toward the center, as opposed to the exemplary embodiment illustrated in FIG. 39. In FIG. 40, the number of the new mobile data packets in the first through fourth modes is different from that in the above-described embodiments.

That is, the first mode of section (a) of FIG. 40 arranges four 1.1 version data packets downward from the top packet, and arranges four 1.1 version data packets upward from the bottom packet. In other words, eight 1.1 version data packets in total are placed.

Next, the second mode of section (b) of FIG. 40 arranges eight 1.1 version data packets downward from the top packet and eight 1.1 version data packet upward from the bottom packet. In other words, sixteen 1.1 version data packets in total are placed.

The third mode of section (c) of FIG. 40 arranges twelve 1.1 version data packets downward from the top packet and twelve 1.1 version data packets upward from the bottom packet. In other words, twenty four 1.1 version data packets in total are placed.

The remaining packets are filled with the normal data. The packet pattern in the fourth mode is the same as in FIGS. 37, 38, and 39, and thus omitted in FIG. 40.

While the insertion of the known data is not illustrated in FIGS. 37 through 40, the known data can be inserted to part of the same packet as the mobile data, part of a separate packet, or the whole payload region. The insertion method of the known data has been described and shall be omitted in FIGS. 37 through 40.

In the fifth mode, that is, in the incompatible mode, the new mobile data is additionally stuffed into the RS parity region and the header region within the existing mobile data region rather than the normal data region, which is not illustrated in FIGS. 37 through 40.

Although the above-stated fifth mode may be provided as a new mode separately from the fourth mode, four modes in total may be realized by including the fourth mode or the fifth mode to the first through third modes.

That is, FIGS. 37 through 40 illustrate the method for inserting the new mobile data into the second region, that is, into the packets allocated to the normal data (for example, 38 packets) in various modes. The method for arranging the new mobile data in the packets allocated to the normal data according to a preset mode in FIGS. 37 through 40 can differ like the first through fourth modes as described above. Herein, the fourth mode may be a mode for stuffing all of the 38 packets with the new mobile data, or a mode for stuffing not only the 38 packets, but also the RS parity region and the header region with the new mobile data. Alternatively, as mentioned above, the mode may include all of the first through fifth modes.

Meanwhile, when a mode for determining how many packets of the 38 packets the new mobile data is allocated to and how to construct the blocks in the M/H group is, for example, a scalable mode, a) a scalable mode 00, b) a scalable mode 01, c) a scalable mode 10, and d) a scalable mode 11 can be defined using a 2-bit signaling field in FIG. 37. Herein, even when all of the 38 packets are allocated to the new mobile data as in of FIG. 37D, 118 packets which are the existing mobile data region and the 38 packets to which the new mobile data is allocated can form one M/H group.

In this case, two scalable modes can be defined according to how to construct the block in this group. For example, provided that the whole transmission data rate of 19.4 Mbps is allocated to the mobile data or not, M/H groups of different block constructions can be generated even when all of the 38 packets in one slot are allocated to the mobile data as shown in FIG. 37.

When the whole existing transmission data rate of 19.4 Mbps is allocated to the mobile data, the normal data rate is 0 Mbps and a broadcast provider provides the service by considering only the receiver for receiving the mobile data without considering the receiver for receiving the normal data. In this case, the region including the placeholder for the MPEG header and the RS parity, which is put aside for the compatibility with the existing receiver for receiving the normal data, is defined as a region for the mobile data, and thus the transmission capacity of the mobile data can be increased up to 21.5 Mbps or so.

In order to allocate the whole existing transmission data rate of 19.4 Mbps to the mobile data, 156 packets of all of the M/H slots building the M/H frame are to be allocated to the mobile data, which implies that all of the 16 slots in each M/H sub-frame are set to the scalable mode 11. In this case, all of the 38 packets being the normal data region are stuffed with the mobile data, and a block SB5 corresponding to the region including the placeholder for the MPEG header and the RS parity existing in the body region can be derived. When the 16 slots in the M/H sub-frame are set to the scalable mode 11 and the RS frame mode is 00 (single frame mode), the block SB5 does not exist separately and the placeholder corresponding to the SB5 is absorbed to the M/H blocks B4, B5, B6, and B7. When all of the 16 slots in the M/H sub-frame are set to the scalable mode 11 and the RS frame mode is 01 (dual frame mode), the placeholder located in the SB5 forms the block SB5. Besides the body region, the placeholder region for the RS parity in the head/tail is stuffed with the mobile data and absorbed into a block including a segment of the placeholder for the RS parity. The placeholder located in corresponding segments of the M/H blocks B8 and B9 is absorbed into the SB1. The placeholder located in the first 14 segments of the M/H block B10 is absorbed into SB2. The placeholder located in the last 14 segments of the M/H block B1 of the following slot is absorbed into SB3. The placeholder located in corresponding segments of the M/H blocks B2 and B3 of the following slot is absorbed into SB4. As shown in FIG. 20, there is no region for the MPEG header and the RS parity in the group format after interleaving.

Meanwhile, when the whole existing transmission data rate of 19.4 Mbps is not allocated to the mobile data, the normal data rate is not 0 Mbps and the broadcast provider provides the service by considering both the normal data receiver and the mobile data receiver. In this case, in order to maintain the compatibility with the existing normal data receiver, the MPEG header and the RS parity cannot be re-defined as the mobile data but are to be transmitted as they are. That is, when only some of the 38 packets are stuffed with the new mobile data as in the above-stated compatible mode, or all of the 38 packets are stuffed with the new mobile data, the MPEG header and the RS parity region are not stuffed with the new mobile data. Accordingly, even when all of the 38 packets being the normal data region in a certain slot are filled up with the mobile data, the block SB5 corresponding to the region including the MPEG header and the RS parity in the body region cannot be derived.

Figure 56:
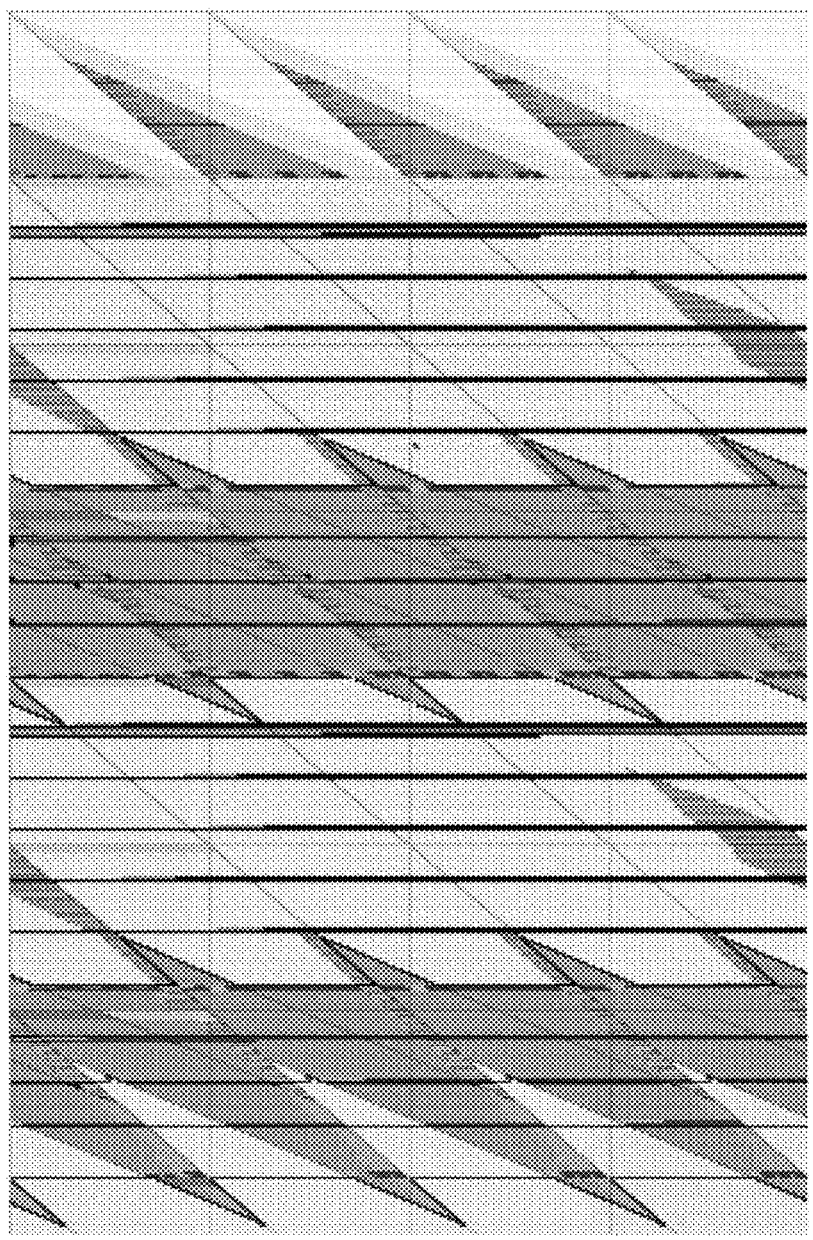
FIG. 56 is the stream structure after the interleaving in Scalable Mode 11a, according to an exemplary embodiment.
Figure 57:
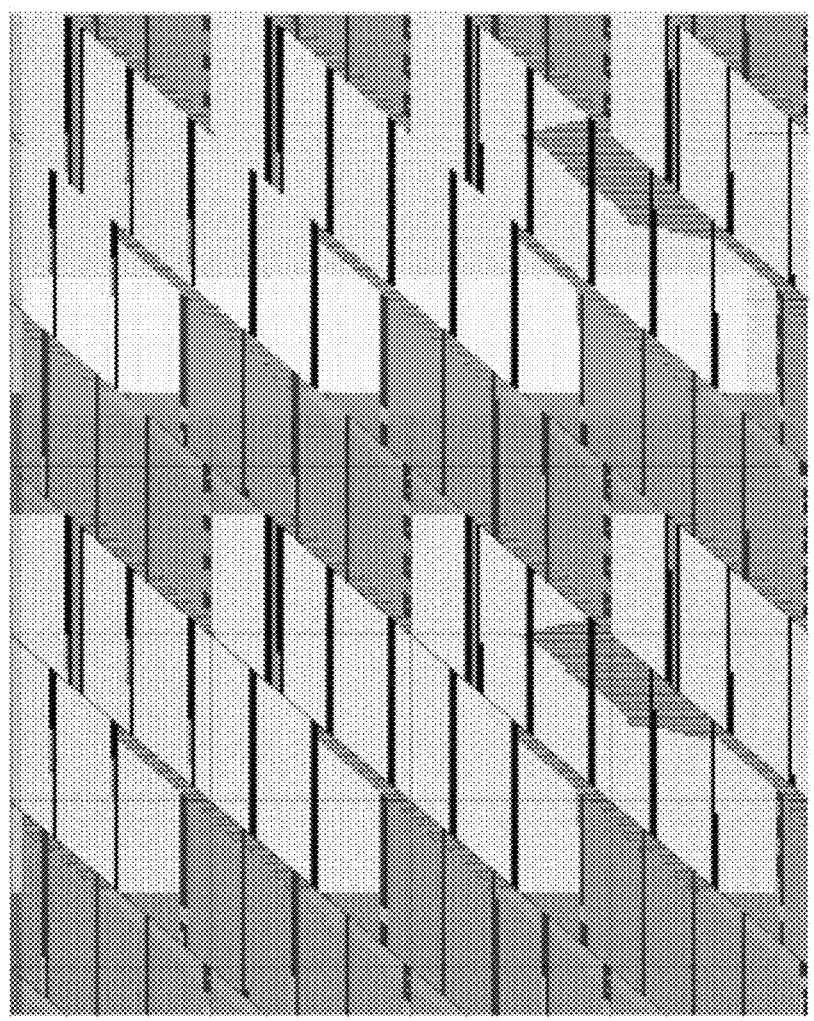
FIG. 57 is the stream structure before the interleaving in the Scalable Mode 11a, according to an exemplary embodiment.

FIG. 57 depicts a packet-based group format before interleaving in consideration of the compatibility when the 38 packets being the normal data region are filled up with the mobile data. All of the 38 packets are allocated to the mobile data as shown in FIGS. 37 through 40D, but the region including the MPEG header and the RS parity is maintained in a segment-based group format after interleaving and the block SB5 is not derived as shown in FIG. 56. This group format can be defined as a group format corresponding to the fourth mode or the scalable mode 11. Alternatively, the fourth mode which stuffs only the 38 packets with the new mobile data by considering the compatibility may be referred to as a scalable mode 11a.

Meanwhile, when the scalable mode 11 being the incompatible mode is used, the scalable mode 11 cannot be used together with the slot filled with the new mobile data in a different mode. That is, all of the slots, that is, all of the 0-th through fifteenth slots should be filled with the new mobile data according to the scalable mode 11. By contrast, the slots may be used in combination in the first through fourth modes.

As such, the normal data region of each slot can be stuffed with the mobile data in various manners. Hence, the type of the slot can vary according to the frame mode and the setting status of the mode.

When the four modes are provided as mentioned above, each slot including the mobile data according to the first through fourth modes can be referred to as first through fourth type slots.

The digital broadcast transmitter can generate the same type of slot in every slot. Conversely, the stream may be generated to repeat different types of slots based on a certain number of slots.

That is, as shown in FIG. 41, the data preprocessor 100 can arrange the mobile data such that one first type slot and three 0-th type slots are repeatedly arranged. The 0-th type slot can indicate a slot which allocates the normal data to the packets allocated to the normal data as original.

Such a slot type can be defined using a specific portion of the existing signaling data, for example, TPC or FIC.

Meanwhile, when the frame mode is set to 1, the mode can be set to one of a plurality of modes such as first through fourth modes as described above. Herein, the fourth mode may be the above-described scalable mode 11 or the scalable mode 11a. Alternatively, the mode may be one of the five modes including the scalable modes 11 and 11a. Further, the mode may be divided into at least one compatible mode and the incompatible mode, that is, the scalable mode 11.

When the modes include the first through the fourth modes, for example, slots corresponding to the respective modes can be referred to as 1-1, 1-2, 1-3, and 1-4 type slots.

That is, the 1-1 type slot indicates a slot in which the 38 packets are allocated in the first mode, the 1-2 type slot indicates a slot in which the 38 slots are allocated in the second mode, the 1-3 type slot indicates a slot in which the 38 packets are allocated in the third mode, and the 1-4 type slot indicates a slot in which the 38 packets are allocated to the fourth mode.

Figure 42:
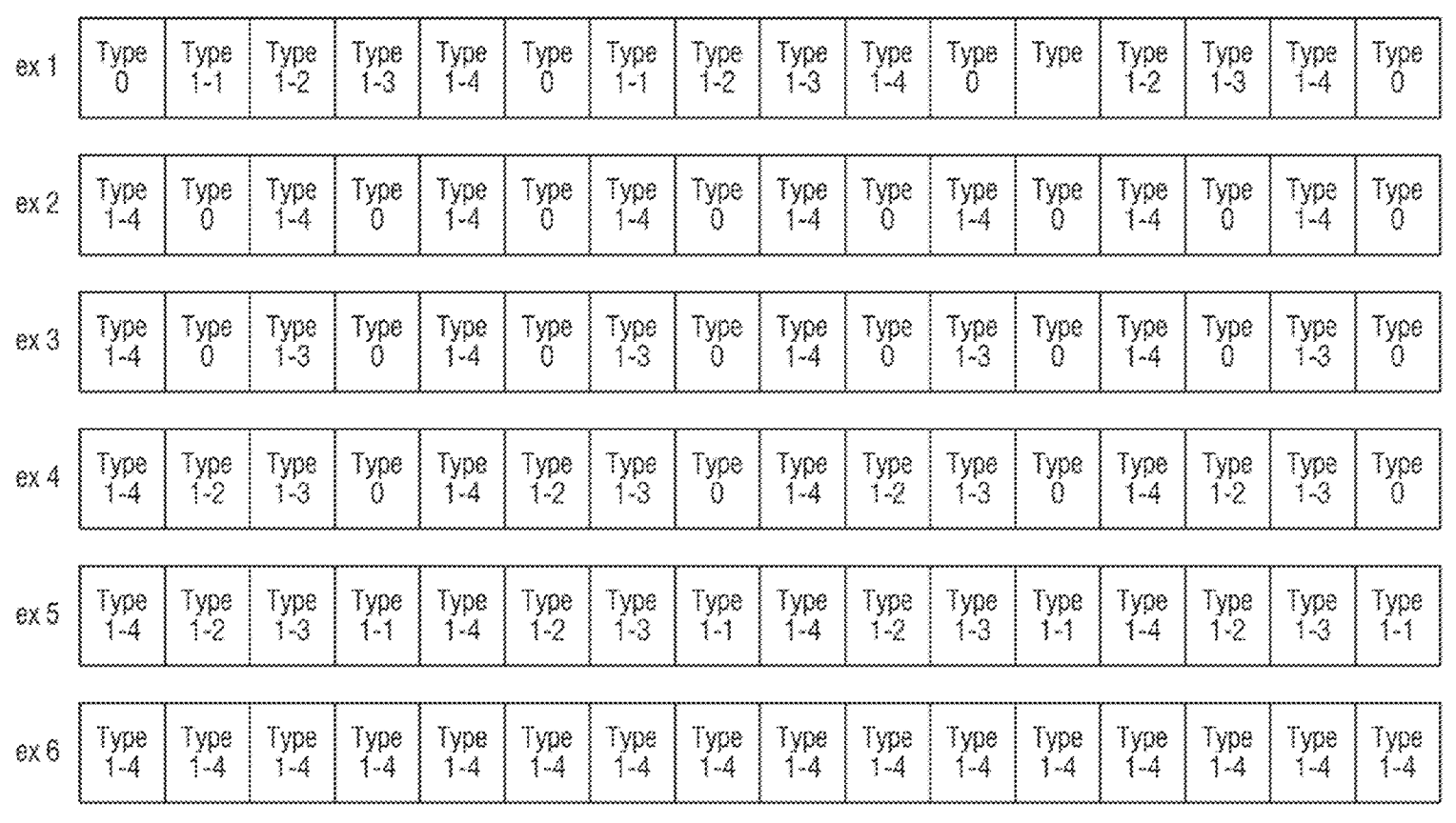

FIG. 42 depicts examples of a stream which repeatedly arranges diverse types of slots, according to an exemplary embodiment.

According to the first example of FIG. 42, the 0 type slot and the 1-1, 1-2, 1-3, 1-4 type slots are repeatedly arranged in sequence in the stream.

According to the second example of FIG. 42, the stream alternately arranges the 1-4 type slot and the 0 type slot. As described above, since the fourth mode is the mode which stuffs the entire normal data region with the mobile data, the second example signifies the alternate arrangement of the slot used for the mobile data and the slot used for the normal data in the entire normal data region.

Furthermore, diverse types of slots can be repeatedly arranged in various ways as shown in third, fourth and fifth examples. In particular, all of the slots may be combined into a single type slot to generate the stream as shown in the sixth example.

Figure 43:
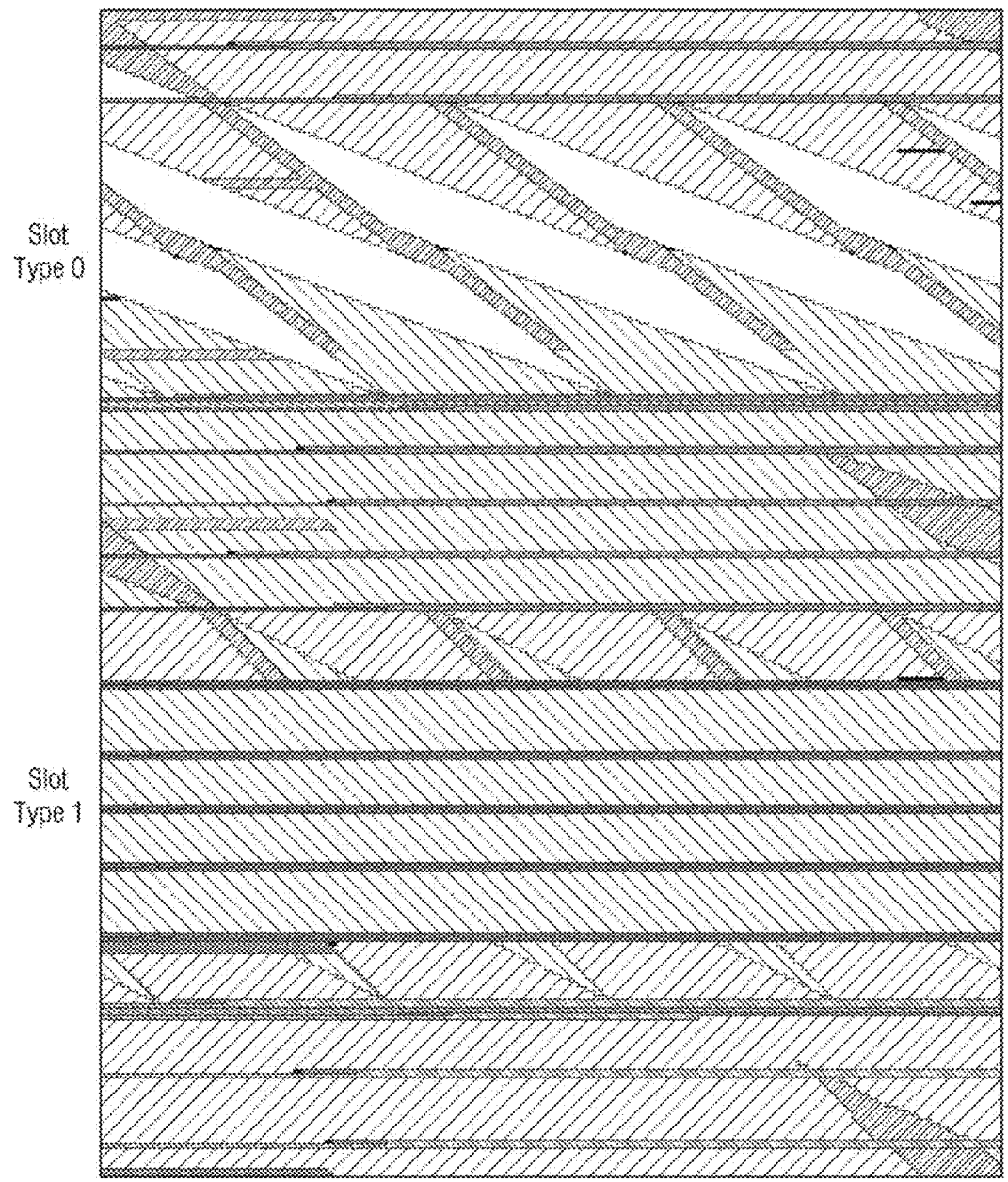

FIG. 43 depicts the stream according to the second example of FIG. 42, according to an exemplary embodiment. Referring to FIG. 43, while the normal data region is used for the normal data in the 0 type slot, the entire normal data region is used for the mobile data in the 1 type slot and simultaneously the known data is placed in the form of the long training sequences. As such, the slot type can vary.

FIGS. 44 through 47 depict streams to explain a block allocation method in the first through fourth modes, according to one or more exemplary embodiments. As described above, the first region and the second region each can be divided into a plurality of blocks.

The data preprocessor 100 can perform the block coding based on the single block or based on the multiple blocks combined according to a preset block mode.

Figure 44:
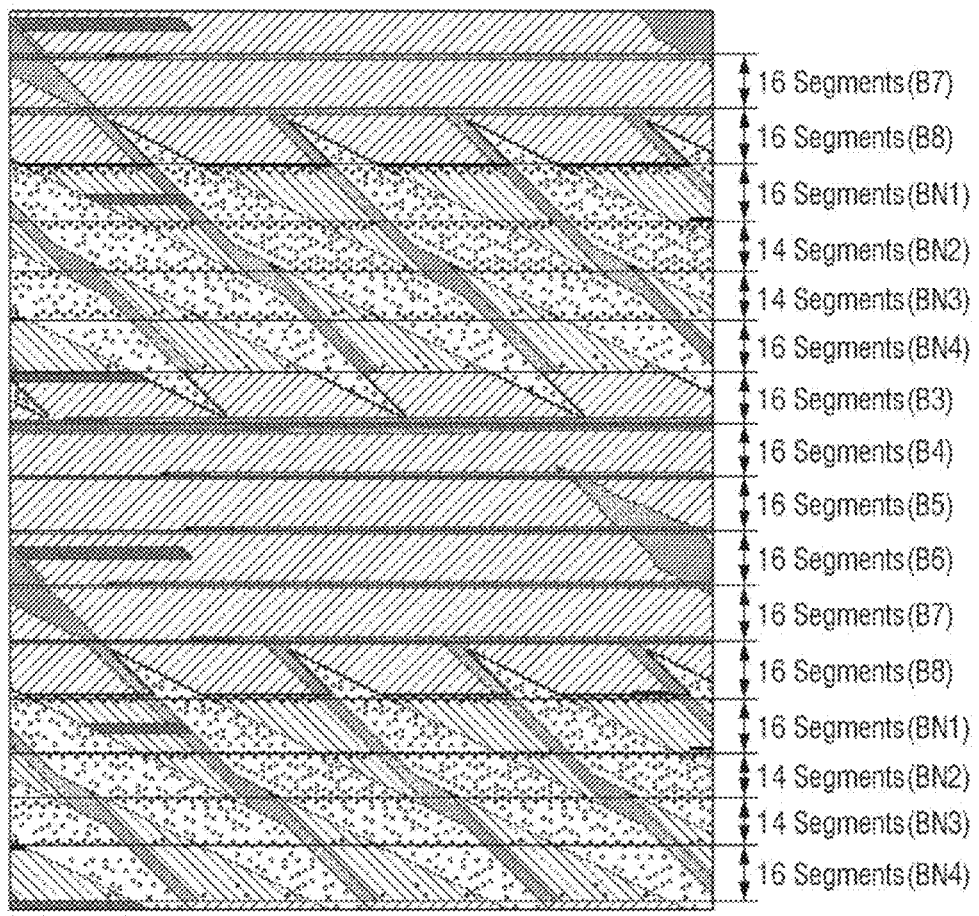
FIGS. 44 through 47 are diagrams of a block allocation method according to various exemplary embodiments.

FIG. 44 depicts the block division in the first mode. Referring to FIG. 44, the body region is divided into B3-B8 and the head/tail region is divided into BN1-BN4.

Figure 45:
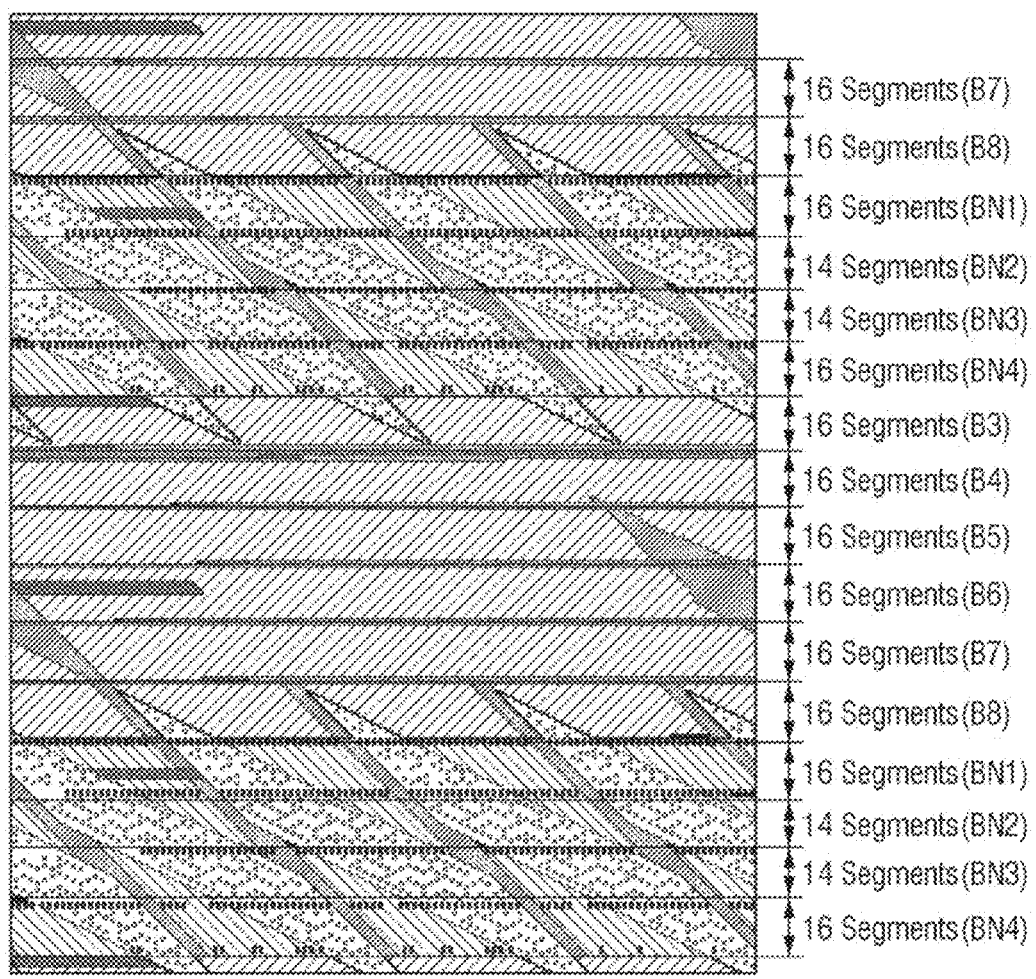
Figure 46:
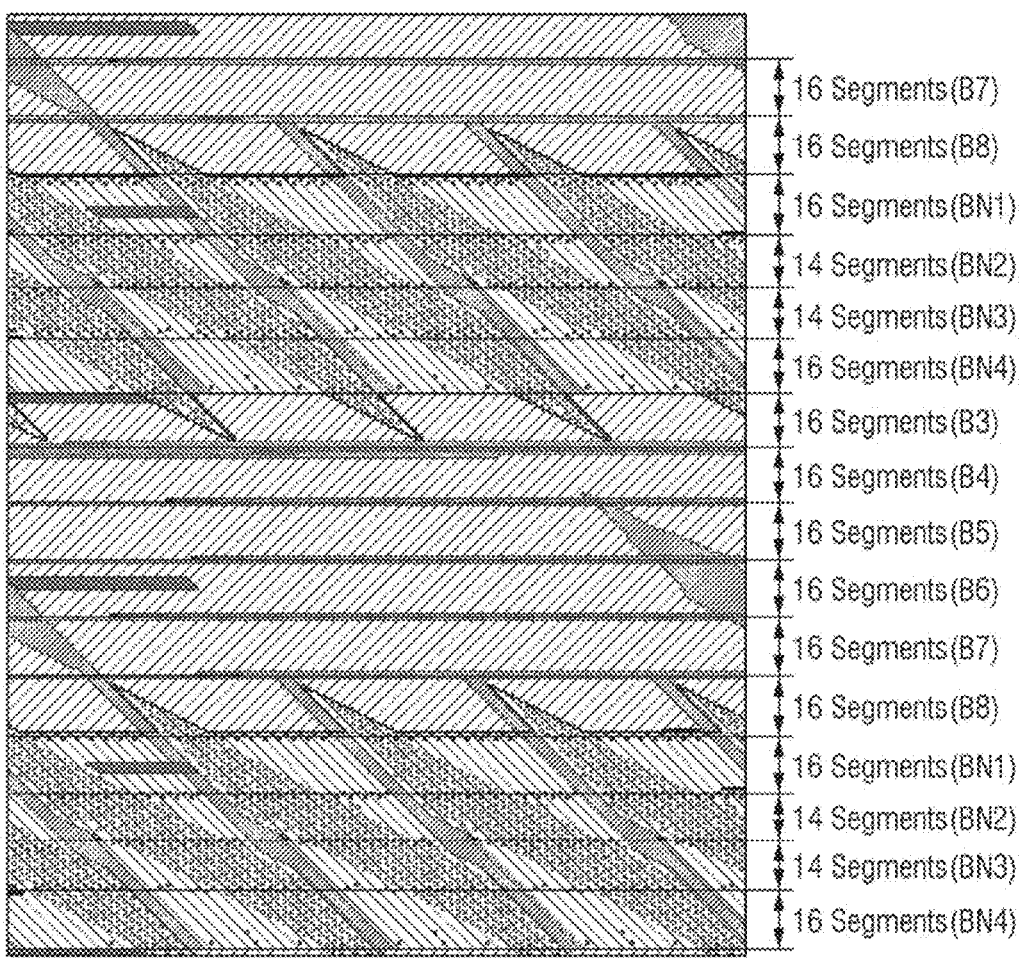

FIGS. 45 and 46 depict the block division in the second mode and the third mode. Similarly to FIG. 44, the body region and the head/tail region each are divided into a plurality of blocks.

Figure 47:
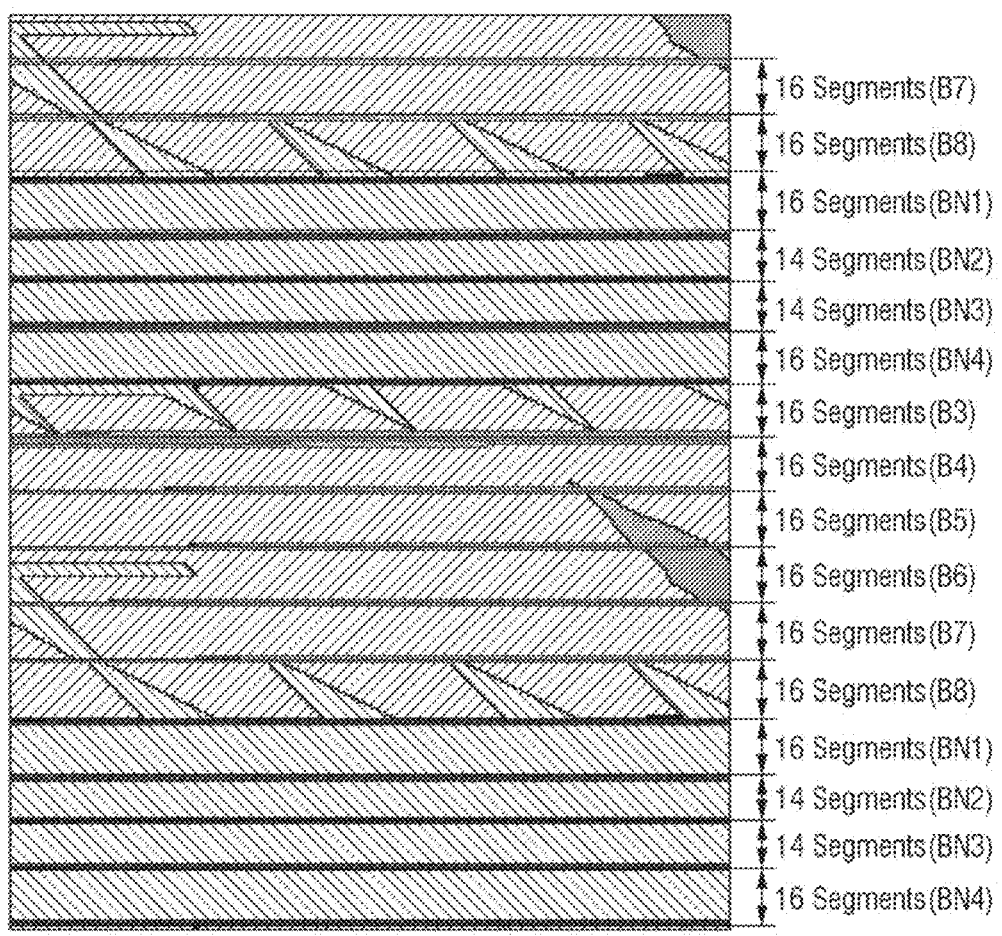

Meanwhile, FIG. 47 depicts the block division in the fourth mode which fills up the head/tail region with the mobile data. As the normal data region is filled up with the mobile data, the MPEG header of the body region and the parity portion of the normal data are unnecessary and thus they are defined as BN5 in FIG. 47. The portion BN5 is stuffed with the new mobile data in the incompatible mode and used as the header and the parity in the compatible mode. Unlike FIGS. 44 through 46, the head/tail region is divided into BN1-BN5 in FIG. 47.

As explained above, the block processor 120 of the data preprocessor 100 converts and processes the RS frame on the block basis. That is, as shown in FIG. 7, the block processor 120 includes the first converter 121. The first converter 121 combines the mobile data of the RS frame according to a preset block mode and thus outputs the Serially Concatenated Convolutional Code (SCCC) block.

The block mode can be set variously.

For example, when the block mode is set to 0, the respective blocks, that is, BN1, BN2, BN3, BN4, and BN5, are output as a single SCCC block and become the SCCC coding unit.

By contrast, when the block is set to 1, the blocks are combined to form the SCCC block. More specifically, BN1+BN3=SCBN1, BN2+BN4=SCBN2, and BN5 solely becomes SCBN3.

Meanwhile, aside from the mobile data placed in the second region, the existing mobile data placed in the first region can be combined into one or multiple block(s) and block-coded according to the block mode. This operation is the same as in the related art ATSC-MH standard and its detailed description is omitted.

Information relating to the block mode can be recorded in the existing signaling data or contained in the region in the new signaling data, and then notified to the receiver. The receiver can recover the original stream by identifying and adequately decoding the notified block mode information.

Meanwhile, the RS frame can be generated by combining the data to be block-coded as stated above. That is, the frame encoder 110 of the data preprocessor 100 generates the RS frame by appropriately combining the frame portions so that the block processor 120 can perform the adequate block-coding.

More specifically, an RS frame 0 can be generated by combining SCBN1 and SCBN2, and an RS frame 1 can be generated by combining SCBN3 and SCBN4.

Alternatively, the RS frame 0 can be generated by combining SCBN1, SCBN2, SCBN3, and SCBN4, and the RS frame 1 can be generated with SCBN 5.

Alternatively, SCBN1+SCBN2+SCBN3+SCBN4+SCBN5 may generate one RS frame.

Otherwise, the RS frame may be generated by combining the block corresponding to the existing mobile data and the newly added blocks SCBN1 through SCBN5.

Figure 48:
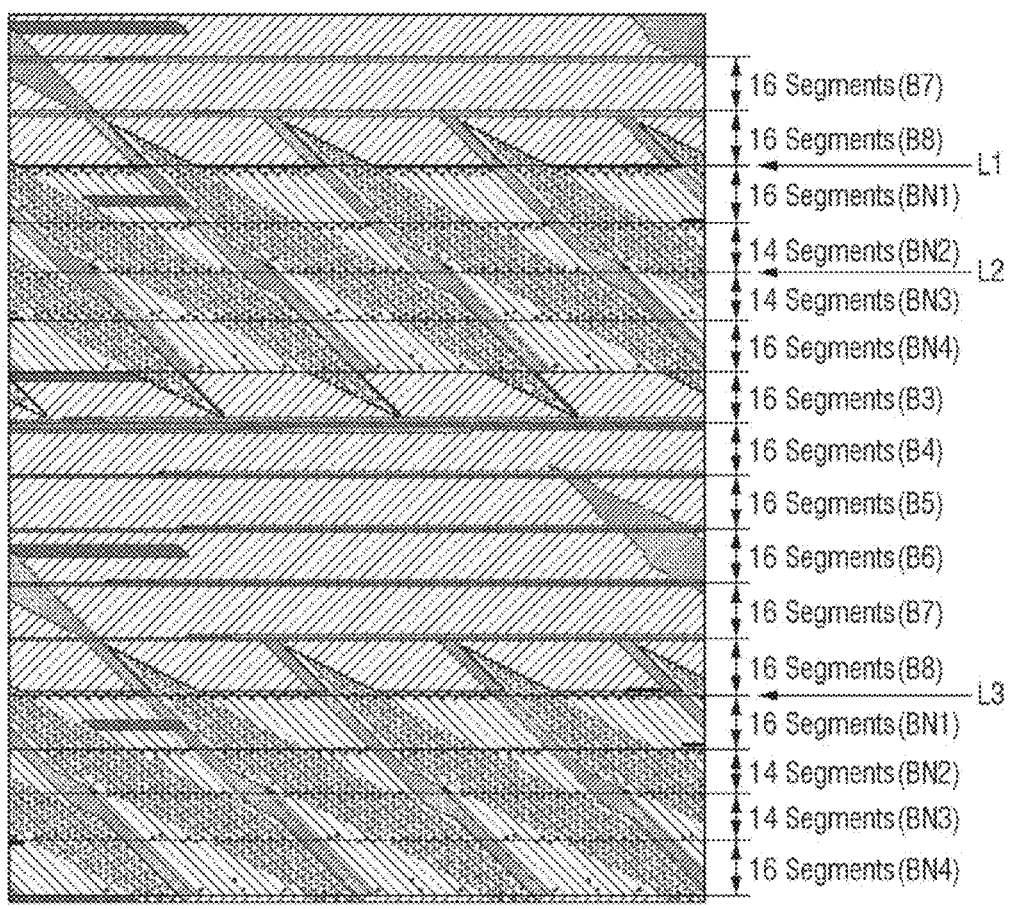
FIG. 48 is a diagram of various exemplary embodiments for defining a start point of an RS frame.

FIG. 48 illustrates various methods for defining the start point of the RS frame, according to one or more exemplary embodiments. Referring to FIG. 48, the transport stream is divided into a plurality of blocks. In the related art ATSC-MH standard, the RS frame is divided between BN2 and BN3. However, as an exemplary embodiment inserts the mobile data and the known data into the normal data region, the start point of the RF frame can be differently defined.

For example, the RS frame can start based on a boundary between BN1 and B8, based on a boundary between BN2 and BN3 like the current reference point, or based on a boundary between B8 and BN1. The start point of the RS frame can be differently determined according the combination condition of the block coding.

Meanwhile, constitution information of the RS frame can be carried to the receiver by the region in the existing signaling data or the new signaling data.

As above, since the new mobile data and the known data are inserted into the region allocated to the original normal data and the region allocated to the existing mobile data, various information is provided to notify this information to the receiver. Such information may be transmitted using a reserved bit in a TPC region of the related art ATSC-MH standard or may be transmitted as new signaling data over a new signaling data region. Since the new signaling data region is to be located in the same location in every mode, it is placed in the head/tail region.

Figure 49:
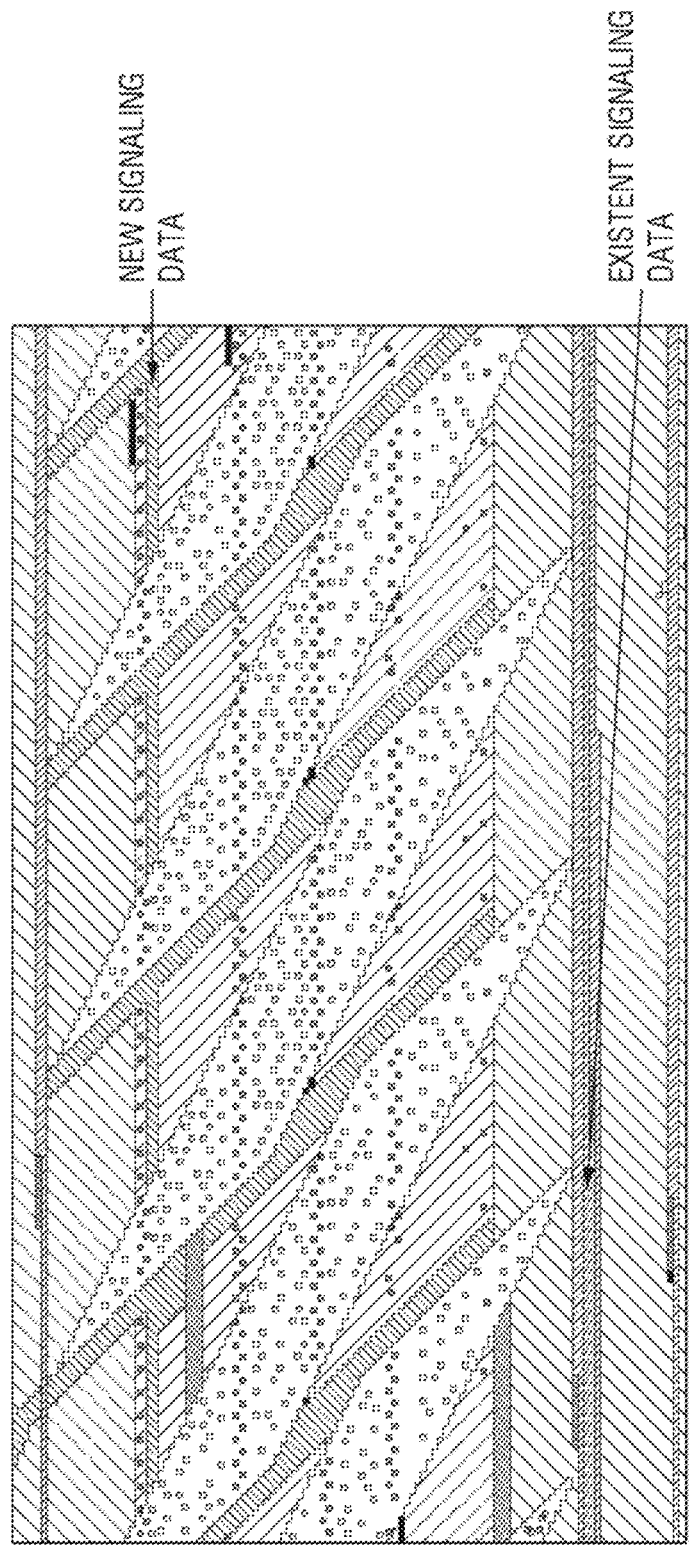
FIG. 49 is a diagram of a signaling data insertion location, according to an exemplary embodiment.

FIG. 49 depicts a stream indicating a related art signaling data location and the new signaling data location, according to an exemplary embodiment.

Referring to FIG. 49, the related art signaling data is located between the long training sequences of the body region, and the new signaling data is located in the head/tail region. The new signaling data encoded by the signaling encoder 150 is inserted by the group formatter 130 into a preset location as shown in FIG. 49.

Meanwhile, the signaling encoder 150 can enhance the performance by using a code different from the related art signaling encoder or by coding at a different code rate.

That is, a ⅛ PCCC code can be used in addition to the existing RS code, or the equivalent effect to the ⅛ rate PCCC code can be obtained by using a RS+¼ PCCC code and sending the same data twice.

Meanwhile, since the known data is contained in the transport stream as described above, the memory in the trellis encoder needs to be initialized before the known data is trellis-encoded.

When the long training sequences are provided as in the fourth mode, there is no problem because the corresponding sequence can be processed through the single initialization. However, when the known data is discontinuously arranged as in the other modes, it may be difficult to initialize multiple times. Also, when the memory is initialized to 0, it may be difficult to generate the symbol as in the fourth mode.

Based on this, a trellis encoder memory value (that is, a register value) of the fourth mode at the same location may be loaded directly to the trellis encoder without the trellis reset so as to generate the same symbol as much in the fourth mode as possible in the first through third modes. In doing so, memory storage values of the trellis encoder in the fourth mode can be recorded and stored in a table, and trellis-encoded with a location value corresponding to the stored table. Alternatively, a value obtained from the trellis encoder may be utilized by separately adding a trellis encoder operating in the fourth mode.

As above, the mobile data can be provided diversely by utilizing the normal data region and the existing mobile data region in the transport stream. Thus, compared to the related art ATSC standard, the stream more suitable for the mobile data transmission can be provided.

[Signaling]

As the new mobile data and the known data are added to the transport stream as described above, a technique for notifying the receiver is provided so as to process the data. The notification can be carried out in various fashions.

That is, firstly, the presence or absence of the new mobile data can be notified using a data field sync which is used to transmit the existing mobile data.

Figure 50:
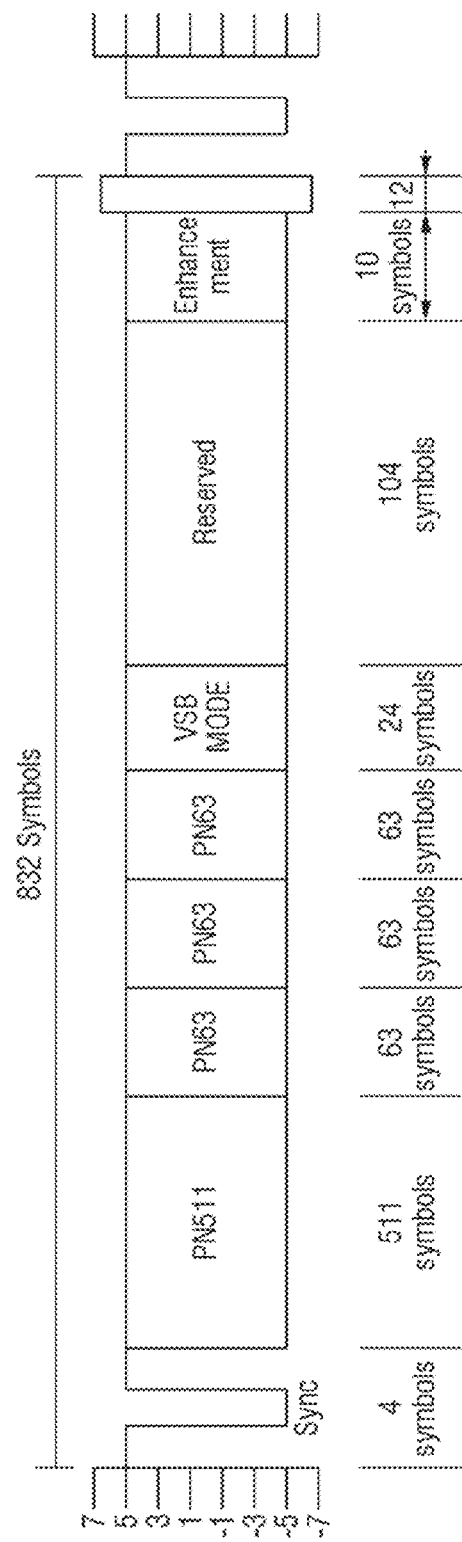
FIG. 50 is a diagram of data field sync construction for carrying the signaling data, according to an exemplary embodiment.

FIG. 50 depicts a data field sync construction according to an exemplary embodiment. Referring to FIG. 50, the data field sync includes 832 symbols in total, and 104 symbols of them correspond to a reserved area. 83 through 92 symbols, that is, 10 symbols in the reserved area, correspond to an enhancement region.

When only 1.0 version data is contained, the 85th symbol is set to +5 and the remaining symbols, that is, 83rd, 84th, and 86th through 92nd symbols are set to −5 in the odd data field. In the even data field, the symbol sign of the odd data field is reversed.

Meanwhile, when 1.1 version data is contained, the 85th and 86th symbols are set to +5 and the remaining symbols, that is, the 83rd, 84th, and 87th through 92nd symbols are set to −5 in the odd data field. The symbol sign of the odd data field in the even data field is reversed. That is, whether the 1.1 version data is included or not can be notified using the 86th symbol.

Meanwhile, whether the 1.1 version data is included may be notified using another symbol in the enhancement region. That is, whether the 1.1 version data is included can be notified by setting one or multiple symbols except for the 85th symbol to +5 or other value. For example, the 87th symbol can be used.

The data field sync can be generated by the controller of FIG. 3, the signaling encoder, or a field sync generator separately provided, provided to the sync MUX 470 of FIG. 4, and multiplexed to the stream by the sync MUX 470.

In a second method, the TPC can be used to notify the presence or absence of the 1.1 version data. The TPC includes syntax of the following table:

TABLE 1

| Syntax | No. of Bits | Format |
|---|---|---|
| TPC_data { sub-frame_number slot_number | 34743322222 | uimsbfuimsbf |
| parade_id starting_group_number | 222545215 | uimsbfuimsbf |
| number_of_groups_minus_1 | | uimsbfuimsbf |
| parade_repetition_cycle_minus_1 rs_frame_mode | | bslbfbslbfbslbf |
| rs_code_mode_primary rs_code_mode_secondary | | bslbfbslbfbslbf |
| sccc_block_mode sccc_outer_code_mode_a | | bslbfbslbfuims |
| sccc_outer_code_mode_b sccc_outer_code_mode_c | | bfuimsbfuims |
| sccc_outer_code_mode_d fic_version | | bfbslbfbslbf |
| parade_continuity_counter total_number_of_groups | | |
| reserved tpc_protocol_version} | | |

As shown in Table 1, TPC information includes a reserved area. Accordingly, one or multiple bits in the reserved area can be used to signal whether the packets allocated to the normal data, that is, the packets in the second region include the mobile data, its location, whether the new known data is added, and the location of the added known data.

Inserted information can be represented in the following table.

TABLE 2

| Necessary field | Bits (changeable) |
|---|---|
| 1.1 frame mode | 3 |
| 1.1 mobile mode | 2 |
| 1.1 SCCC block mode | 2 |
| 1.1 SCCCBM1 | 2 |
| 1.1 SCCCBM2 | 2 |
| 1.1 SCCCBM3 | 2 |
| 1.1 SCCCBM4 | 2 |
| 1.1 SCCCBM5 | 2 |

In Table 2, the 1.1 frame mode is information indicating whether the packet allocated to the normal data is used for the normal data or for new mobile data, that is, the 1.1 version data as stated earlier.

The 1.1 mobile mode is information indicating the pattern for arranging the mobile data to the packets allocated to the normal data. That is, one of the above first through fourth modes can be expressed by marking one of "00", "01", "10", and "11" using 2 bits. Hence, the stream can be arranged in various forms as shown in FIGS. 29, 31, 33, 35, 37, 38, 39, and 40, and the receiver can identify the mobile mode information and locate the mobile data.

A 1.1 SCCC block mode is information indicating the block mode of the 1.1 version data. 1.1 SCCCBM1 through SCCCBM5 are information indicating the coding unit of the 1.1 version data.

In addition to the information recorded in Table 2, various information can be further provided so that the receiver can properly detect and decode the new mobile data. If necessary, the number of bits allocated to the information may be changed. The location of each field can be arranged in a different order from table 2.

FIC information can provide notification as to whether the new mobile data is contained, to the digital broadcast receiver receiving the stream including the new mobile data.

That is, a 1.1 version receiver for receiving and processing the new mobile data should be able to process 1.0 service information and 1.1 service information at the same time. Conversely, a 1.0 version receiver should be able to ignore the 1.1 service information.

Accordingly, by changing the existing FIC segment syntax, a region for notifying the presence or absence of 1.1 version data can be secured.

The syntax of the existing FIC segment can be generated as the following table.

TABLE 3

| Syntax | No. of Bits | Format |
|---|---|---|
| FIC_segment_header( ) { FIC_segment_type reserved FIC_chunk_major_protocol_version current_next_indicator error_indicator FIC_segment_num FIC_last_segment_num } | 2 2 2 1 1 4 4 | uimsbf '11' uimsb fbslbfbslbfuims bfuimsbf |

The FIC segment of Table 3 can be modified to notify the presence or absence of 1.1 version data as follows.

TABLE 4

| Syntax | No. of Bits | Format |
|---|---|---|
| FIC_segment_header( ) { FIC_segment_type | 2 1 1 2 5 5 | uimsbfbslbfbslb fuimsbfuimsbfu |

TABLE 4-continued

| Syntax | No. of Bits | Format |
|---|---|---|
| current_next_indicator error_indicator FIC_chunk_major_protocol_version FIC_segment_num FIC_last_segment_num } | | imsbf |

Referring to Table 4, FIC_segment_num and FIC_last_segment_num are extended to 5 bits instead of the reserved area.

In Table 4, by adding 01 to the value of FIC_segement_type, the presence or absence of the 1.1 version data can be notified. That is, when FIC_segment_type is set to 01, the 1.1 version receiver can decode FIC information and process the 1.1 version data. In this case, the 1.0 version receiver cannot detect the FIC information. Conversely, when FIC_segement_type is set to 00 or null segment, the 1.0 version receiver decodes the FIC information and processes the existing mobile data.

Meanwhile, the presence or absence of the 1.1 version data can be notified using some area, for example, the reserved area while maintaining FIC chunk syntax without changing the original FIC syntax.

The FIC can include up to 16 bits when generating the maximum FIC chunk. By changing part of the syntax for constructing the FIC chunk, the status of the 1.1 version data can be notified.

More specifically, "MH 1.1 service_status" can be added to the reserved area of a service ensemble loop as shown in the following table.

TABLE 5

| Syntax | No. of Bits | Format |
|---|---|---|
| FIC_chunk_payload( ){ for(i=0; i<num_ensembles; i++){ ensemble_id reserved ensemble_protocol_version SLT_ensemble_indicator GAT_ensemble_indicator reserved MH_service_signaling_channel_version num_MH_services for (j=0; j<num_MH_services; j++){ MH_service_id MH1.1_service_status reserved multi_ensemble_service MH_service_status SP_indicator } } FIC_chunk_stuffing( )} | 8 3 5 1 1 1 5 8 1 6 2 1 2 21var | uimsbf '111' uim sbfbslbfbslbf '1' uimsbfuimsbfui msbfuimsbf '1'ui msbfuimsbfbslb f |

Referring to Table 5, MH 1.1_service_status can be displayed using 2 bits of the 3 bits in the reserved area. MH 1.1_service_status can be data indicating whether the stream includes the 1.1 version data.

Alternatively, in addition to MH 1.1_service_status, MH1.1_ensemble_indicator may be added. That is, the syntax of the FIC chunk can be generated as follows.

TABLE 6

| Syntax | No. of Bits | Format |
|---|---|---|
| FIC_chunk_payload( ){ for(i=0; i<num_ensembles; i++){ ensemble_id MH1.1_ensemble_indicator reserved ensemble_protocol_version SLT_ensemble_indicator GAT_ensemble_indicator reserved MH_service_signaling_channel_version num_MH_services for (j=0; j<num_MH_services; j++){ MH_service_id MH1.1_service_status_extension reserved multi_ensemble_service MH_service_status SP_indicator } } FIC_chunk_stuffing( )} | 8 1 2 5 1 1 1 5 8 1 6 2 2 21var | uimsbfbslbf '11' uimsbfbslbfbslb f '1'uimsbfuimsb fuimsbfuimsbf '1'uimsbfuimsbf bslbf |

Referring to Table 6, 1 bit of the 3 bits in the first reserved area is allocated to MH1.1_ensemble_indicator. MH1.1_ensemble_indicator denotes information relating to an ensemble which is a service unit of the 1.1 version data. In Table 6, MH1.1_service_status extension can be represented using 2 bits of the 3 bits of the second reserved area.

Alternatively, a 1.1 version service may be specified as 1.1 using a value allocated to a reserved area of 1.0 by changing an ensemble protocol version as shown in the following Table 7.

TABLE 7

| Syntax | No. of Bits | Format |
|---|---|---|
| FIC_chunk_payload( ){ for(i=0; i<num_ensembles; i++){ ensemble_id reserved ensemble_protocol_version SLT_ensemble_indicator GAT_ensemble_indicator reserved MH_service_signaling_channel_version num_MH_services for (j=0; j<num_MH_services; j++){ MH_service_id reserved multi_ensemble_service MH_service_status SP_indicator } } FIC_chunk_stuffing( )} | 8351115816322 1var | uimsbf'111'uim sbfbslbfbslbf'1' uimsbfuimsbfui msbf'111'uimsb fuimsbfbslbf |

Alternatively, the signaling data may be transmitted by changing the ensemble loop header extension length of the syntax field of the FIC chunk header, adding an ensemble extension to the syntax field of the FIC chunk payload, and adding MH1.1_service_status to service loop reserved 3 bits of the syntax of the FIC chunk payload as shown in the following Table 8.

TABLE 8

| Syntax | No. of Bits | Format |
|---|---|---|
| FIC_chunk_payload( ){ for(i=0; i<num_ensembles; i++){ ensemble_id reserved ensemble_protocol_version SLT_ensemble_indicator GAT_ensemble_indicator reserved MH_service_signaling_channel_version reserved ensemble extension num_MH_services for (j=0; j<num_MH_services; j++){ MH_service_id MH_service_status_extension reserved reserved multi_ensemble_service MH_service_status SP_indicator } } FIC_chunk_stuffing( )} | 8351115358162 13221var | uimsbf'111'uim sbfbslbfbslbf'1' uimsbfuimsbfui msbfuimsbf'111 'uimsbfuimsbfb slbf |

Alternatively, MH_service_loop_extension_length of the syntax field of the FIC chunk header may be changed and an information field of MH1.1_service status of the payload field of the FIC chunk may be added as shown in the following table.

TABLE 9

| Syntax | No. of Bits | Format |
|---|---|---|
| FIC_chunk_payload( ){ for(i=0; i<num_ensembles; i++){ ensemble_id reserved ensemble_protocol_version SLT_ensemble_indicator GAT_ensemble_indicator reserved MH_service_signaling_channel_version num_MH_services for (j=0; j<num_MH_services; j++){ MH_service_id reserved multi_ensemble_service MH_service_status SP_indicator reserved MH1.1_Detailed_service_Info } } FIC_chunk_stuffing( )} | 8351115816322 153var | uimsbf'111'uim sbfbslbfbslbf'1' uimsbfuimsbfui msbf'111'uimsb fuimsbfbslbfui msbfuimsbf |

As above, the signaling data can be provided to the receiver using various regions such as field sync, TPC information, and FIC information.

Meanwhile, the signaling data may be inserted into a region other than these regions. That is, the signaling data can be inserted into a packet payload portion of the existing data. In this case, the presence of the 1.1 version data or the location of the signaling data may be recorded using the FIC information as shown in Table 5, and signaling data for the 1.1 version may separately provided so that the 1.1 version receiver can detect and use the corresponding signaling data.

The signaling data may be generated and transmitted as a separate stream to the receiver using a channel separate from a stream transmission channel.

Also, in addition to the aforementioned various information, the signaling data can further include information for signaling at least one of the presence or absence of the existing or new mobile data, the location of the mobile data, the addition of the known data, the location of the added known data, the arrangement pattern of the mobile data and the known data, the block mode, and the coding unit.

Meanwhile, the digital broadcast transmitter using the signaling data can include a data preprocessor for arranging at least one of the mobile data and the known data in at least part of the normal data region among all the packets of the stream, and a MUX for generating the transport stream including the mobile data and the signaling data. A detailed structure of the data preprocessor can be implemented using one of the aforementioned exemplary embodiments or by omitting, adding, or modifying some components. In particular, the signaling data can be generated by the signaling encoder, the controller, or the field sync generator additionally equipped, and inserted into the transport stream by the MUX or the sync MUX. In this case, the signaling data can be implemented using the data field sync or the TPC or FIC information as stated above, as the information notifying at least one of the presence or absence and the arrangement pattern of the mobile data.

As described above, when the scalable mode 11a exists besides the scalable mode 11 exists, that is, when the first through fifth modes exist, a method for representing the mode in the signaling data can differ.

According to an exemplary embodiment, a signaling field name in a TPC field can be set to a scalable mode and two bits are allocated to define the four modes of FIGS. 37A through 40D, as 00, 01, 10 and 11. In this case, the fourth mode has the same bit value of 11 regardless of whether it is the compatible mode or the incompatible mode. However, since the MPEG header and the parity region may or may not be used in the two modes, the group format can differ.

A receiver checks not only the TPC of the slot including the M/H group of the M/H parade to receive but also TPCs of other slots. When the scalable mode of all of the slots is 11 and a Core Mobile Mode (CMM) slot does not exist, that is, when a normal data rate is 0 Mpbs, the receiver can determine and decode the bit value of 11 as the scalable mode 11.

By contrast, when the scalable mode of all of the slots is not 11 or the CMM slot exists, that is, when the normal data rate is not 0 Mbps, the receiver, which should consider the compatibility, can determine and decode the bit value of 11 as the scalable mode 11a.

According to another exemplary embodiment, the signaling field name in the TPC field may be set to the scalable mode and three bits may be allocated to this field. Accordingly, five group formats in total including the three group formats corresponding to of FIGS. 37A through 40C, that is, the first through third modes, and the two group formats corresponding to FIGS. 37 through 40D, that is, the fourth mode and the fifth mode, can be signaled.

That is, the above-described modes can include, 1) a first mode which arranges the new mobile data in 11 packets of the 38 packets allocated to the normal data, 2) a second mode which arranges the new mobile data in 20 packets of the 38 packet allocated to the normal data, 3) a third mode which arranges the new mobile data in 29 packets of the 38 packets allocated to the normal data, 4) a fourth mode which arranges the new mobile data in all of the 38 packets allocated to the normal data, and 5) a fifth mode which arranges the new mobile data in all of the 38 packets allocated to the normal data and also in the region corresponding to the MPEG header and the parity among the regions allocated to the existing mobile data.

The first mode can be defined as a scalable mode 000, the second mode can be defined as a scalable mode 001, and the third mode can be defined as a scalable mode 010. The fourth mode, that is, the mode for stuffing the 38 packets with the mobile data and considering the compatibility, can be defined as a scalable mode 011, and the fifth mode, that is, the mode for stuffing the 38 packets with the mobile data and not considering the compatibility, can be defined as a scalable mode 111.

Furthermore, in order to define an additional group format, a bit value of the scalable mode may be allocated or a signaling bit may be added.

The digital broadcast transmitter according to the various exemplary embodiments as described above, can arrange and transmit the existing mobile data, the new mobile data, and the normal data in the stream in various fashions according to the modes.

For example, in FIG. 4, the stream generator, that is, the group formatter 130 disposed in the data preprocessor 100 adds the known data, the signaling data, and the initialization data to the stream processed by the block processor 120 and formats the stream on the group basis.

Accordingly, when the packet formatter formats the packet, the MUX 200 performs the multiplexing. In this case, the MUX 200 also multiplexes the normal data processed by the normal processor 320 in the first through third modes. By contrast, in the fourth and fifth modes, the normal processor 320 does not output any normal data and the MUX 200 outputs the stream provided by the packet formatter 140 as it is.

[Digital Broadcast Receiver]

As stated above, the digital broadcast transmitter can transmit the new mobile data using part or all of the packets allocated to the normal data and part or all of the packets allocated to the existing mobile data in the existing stream.

The digital broadcast receiver receiving the stream can receive and process at least one of the existing mobile data, the normal data, and the new mobile data, depending on its version.

That is, upon receiving the various streams as mentioned above, the related art digital broadcast receiver for processing the normal data can identify the signaling data and thus detect and decode the normal data. As described above, when the stream is generated in the mode not including the normal data at all, the receiver for processing the normal data cannot provide the normal data service.

Meanwhile, when receiving the various streams as mentioned above, the digital broadcast receiver for the 1.0 version can identify the signaling data and thus detect and decode the existing mobile data. When the 1.1 version mobile data is located throughout the entire region, the 1.0 version digital broadcast receiver may not provide the mobile service either.

By contrast, a 1.1 version digital broadcast receiver can detect and process not only the 1.1 version data but also the 1.0 version data. In this case, when the receiver includes a decoding block for processing the normal data, it can support the normal data service.

Figure 51:
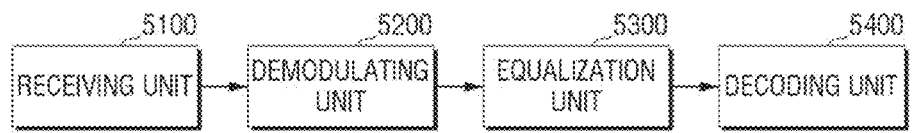
FIGS. 51 through 53 are diagrams of a digital broadcast receiver according to various exemplary embodiments.

FIG. 51 is a block diagram of a digital broadcast receiver according to an exemplary embodiment. While the digital broadcast receiver may have a construction in which components corresponding to the various digital broadcast transmitter components of FIGS. 2 through 4 are arranged reversely, only some components are illustrated in FIG. 51 to ease the understanding.

That is, referring to FIG. 51, the digital broadcast receiver includes a receiver 5100, a demodulator 5200, an equalizer 5300, and a decoder 5400.

The receiver 5100 receives the transport stream transmitted from the digital broadcast transmitter via an antenna or a cable.

The demodulator 5200 demodulates the transport stream received via the receiver 5100. A frequency and a clock signal of the signal received through the receiver 5100 are synchronized with the digital broadcast transmitter as passing through the demodulator 5200.

The equalizer 5300 equalizes the demodulated transport stream.

The demodulator 5200 and the equalizer 5300 can more rapidly carry out synchronization and equalization using the known data contained in the transport stream, in particular, the known data which is added together with the new mobile data.

The decoder 5400 detects and decodes the mobile data in the equalized transport stream.

The insertion location and the size of the mobile data and known data may be notified by the signaling data contained in the transport stream or the signaling data received over a separate channel.

The decoder 5400 can locate the mobile data suitable for the digital broadcast receiver using the signaling data, and detect and decode the mobile data at the detected location.

The construction of the decoder 5400 can vary according to various exemplary embodiments.

That is, the decoder 5400 can include two decoders including a trellis decoder and a convolution decoder. The two decoders can enhance the performance as exchanging their decoding reliability information with each other. The output of the convolution decoder can be identical to the input of the RS encoder of the transmitter.

Figure 52:
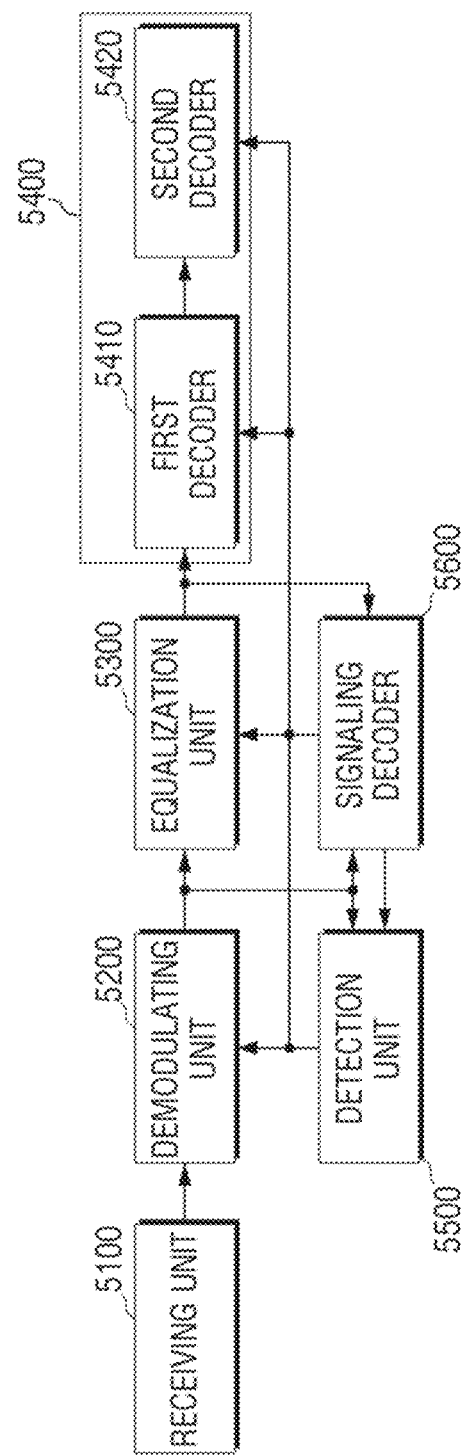

FIG. 52 is a detailed block diagram of the digital broadcast receiver according to an exemplary embodiment.

Referring to FIG. 52, the digital broadcast receiver can include the receiver 5100, the demodulator 5200, the equalizer 5300, the decoder 5400, a detector 5500, and a signaling decoder 5600.

Since the functions of the receiver 5100, the demodulator 5200, and the equalizer 5300 are the same as or similar to those in FIG. 51, their further explanations are omitted.

The decoder 5400 can include a first decoder 5410 and a second decoder 5420.

The first decoder 5410 decodes at least one of the existing mobile data and the new mobile data. The first decoder 5410 can perform the SCCC decoding on the block basis.

The second decoder 5420 RS-decodes the stream decoded by the first decoder 5410.

The first and second decoders 5410 and 5420 can process the mobile data using the output value of the signaling decoder 5600.

That is, the signaling decoder 5600 can detect and decode the signaling data in the stream. Specifically, the signaling decoder 5600 de-multiplexes the reserved area in the field sync data, or the TPC information region and the FIC information region from the transport stream. Hence, the signaling data can be recovered by convolutionally decoding, RS-decoding, and derandomizing the de-multiplexed portion. The recovered signaling data is provided to the components of the digital broadcast receiver, that is, to the demodulator 5200, the equalizer 5300, the decoder 5400, and the detector 5500. The signaling data can include information to be used by the components, that is, block mode information, mode information, known data insertion pattern information, and frame mode. The types and functions of such information have been explained earlier in detail, so their further explanations are not provided herein.

Furthermore, a variety of information such as a coding rate of the mobile data, a data rate, an inserting location, a type of the used error correction code, information of a primary service, information for supporting time slicing, a description of the mobile data, information relating to the mode information change, and information for supporting an Internet Protocol (IP) service may be provided to the receiver in the form of the signaling data or additional data.

Meanwhile, it is assumed in FIG. 52 that the signaling data is contained in the stream. However, when the signaling data signal is transmitted over a separate channel according to another exemplary embodiment, the signaling decoder 5600 may decode such a signaling data signal and provide the information.

The detector 5500 detects the known data in the stream using the known data insertion pattern information provided from the signaling decoder 5600. In this case, the known data added with the existing mobile data can be processed in addition to the known data added with the new mobile data.

Specifically, the known data can be inserted into at least one of the body region and the head/tail region of the mobile data in various locations and various patterns as shown in FIGS. 22 through 36. The insertion pattern information of the known data, that is, information of the location, the start point, and the length, can be included in the signaling data. The detector 5500 can detect the known data from an appropriate location according to the signaling data, and provide the detected known data to the demodulator 5200, the equalizer 5300, and the decoder 5400.

Figure 53:
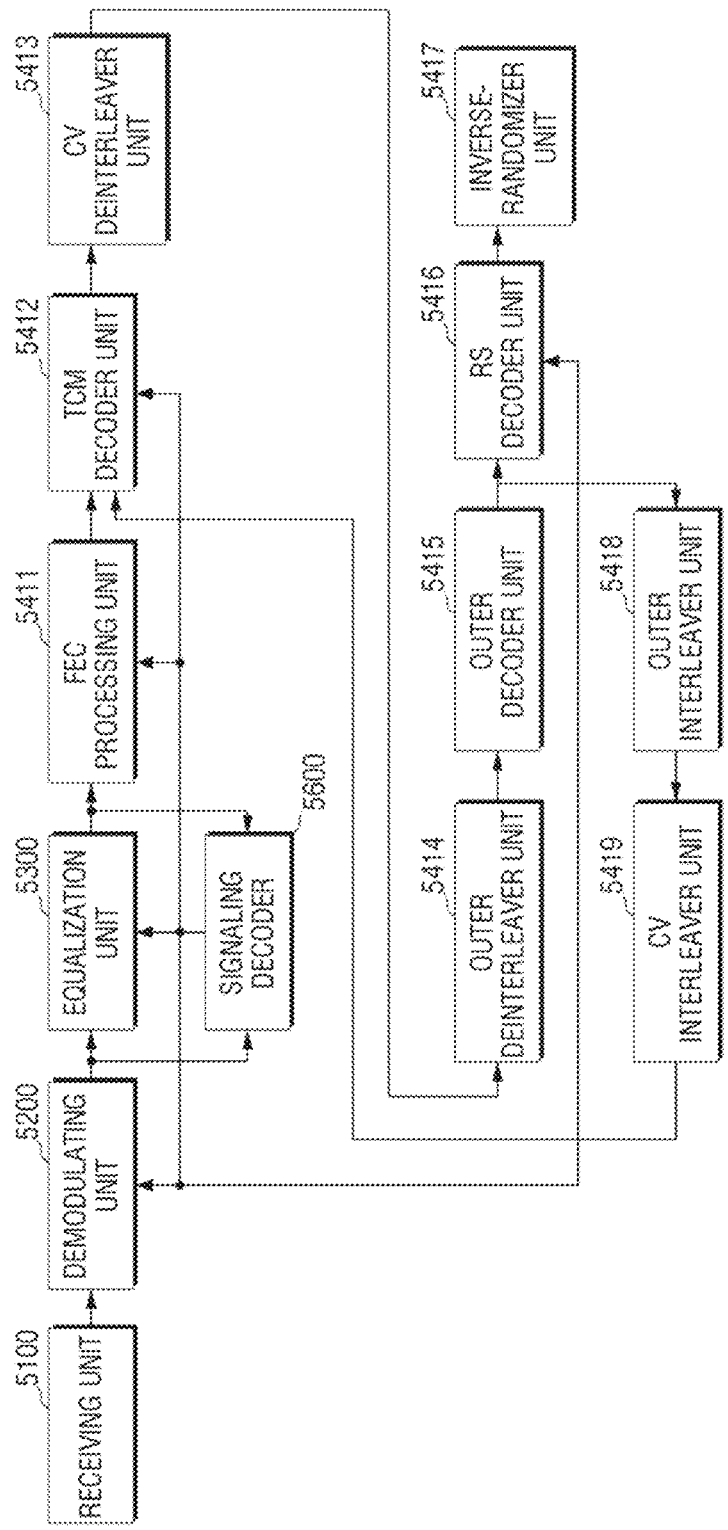

FIG. 53 is a detailed diagram of a digital broadcast receiver according to yet another exemplary embodiment.

Referring to FIG. 53, the digital broadcast receiver includes a receiver 5100, a demodulator 5200, an equalizer 5300, an FEC processor 5411, a TCM decoder 5412, a convolutional (CV) deinterleaver 5412, an outer deinterleaver 5414, an outer decoder 5415, an RS decoder 5416, a derandomizer 5417, an outer interleaver 5418, a CV interleaver 5419, and a signaling decoder 5600.

Since the receiver 5100, the demodulator 5200, the equalizer 5300, and the signaling decoder 5600 have been described in FIG. 52, their overlapping explanations are omitted herein. Unlike in FIG. 52, the detector 5500 is not depicted. That is, the components may directly detect the known data using the signaling data which is decoded by the signaling decoder 5600 as in the present exemplary embodiment.

The FEC processor 5411 may perform forward error correction for the transport stream equalized by the equalizer 5300. The FEC processor 5411 can detect the known data in the transport stream using the information of the known data location or insertion pattern among the information provided by the signaling decoder 5600, and use the known data for the forward error correction. Alternatively, an additional reference signal may not be used for the forward error correction according to the implementation.

Meanwhile, in FIG. 53, the components are arranged such that the mobile data is decoded after the FEC processing. That is, the FEC processing is applied to the entire transport stream. However, only the mobile data may be detected from the transport stream and then the FEC may be applied only to the mobile data.

The TCM decoder 5412 detects the mobile data from the transport stream output from the FEC processor 5411, and performs trellis decoding. In this case, when the FEC processor 5411 already detects the mobile data and performs the forward error correction for only the detected data, the TCM decoder 5412 may immediately trellis-decode the input data.

The CV deinterleaver 5413 convolutionally deinterleaves the trellis decoded data. As described above, since the construction of the digital broadcast receiver corresponds to the construction of the digital broadcast transmitter which generates and processes the transport stream, the CV deinterleaver 5413 may be unnecessary or may not be operated according to the structure of the transmitter.

The outer deinterleaver 5414 performs outer de-interleaving on the convolutionally deinterleaved data. Next, the outer decoder 5415 decodes to remove the parity added into the mobile data.

In some cases, the reception performance of the mobile data can be improved by repeating the operations from the TCM decoder 5412 to the outer decoder 5415 one or more times. For the repeated operations, the decoded data of the outer decoder 5415 can be input to the TCM decoder 5412 via the outer interleaver 5418 and the CV interleaver 5419. At this time, the CV interleaver 5419 may be unnecessary or may not be operated according to the structure of the transmitter.

As such, the trellis-decoded data is provided to the RS decoder 5416. The RS decoder 5416 can RS-decode the provided data, and the derandomizer 5417 can perform derandomizing. Thus, the stream of the mobile data, in particular, the newly defined 1.1 version mobile data, can be processed.

Meanwhile, as described above, when then digital broadcast receiver is for the 1.1 version, it can process 1.0 version data in addition to the 1.1 version data.

That is, at least one of the FEC processor 5411 and the TCM decoder 5412 can detect the entire mobile data except for the normal data, and process the detected data.

When the digital broadcast receiver is a common receiver, it may include all of a block for processing the normal data, a block for processing the 1.0 version data, and a block for processing the 1.1 version data. In this case, a plurality of processing paths is provided on the rear end of the equalizer 5300, each of the above blocks is disposed on each processing path, and at least one of the processing paths is selected under control of a controller separately equipped. Thus, the data proper for the transport stream can be included.

As described above, the transport stream can arrange the mobile data in a different pattern for each slot. That is, various slots can be repeatedly constructed according to a preset pattern, such as a first type slot including the normal data as it is, a second type slot including the new mobile data throughout the normal data region, a third type slot including the new mobile data in part of the normal data region, and a fourth type slot including the new mobile data throughout the normal data region and the existing mobile data region.

The signaling decoder 5600 decodes the signaling data and notifies each component of the frame mode information or the mode information. Therefore, each component, particularly, the FEC processor 5411 or the TCM decoder 5412, can detect and process the mobile data at the designated location for each slot.

Although the controller is omitted in FIGS. 51 through 53, a controller may be further provided to apply an adequate control signal to each block using the signaling data decoded by the signaling decoder 5600. Such a controller may control a tuning operation of the receiver 5100 according to a user's selection.

A 1.1 version receiver may selectively provide 1.0 version data or 1.1 version data according to the user's selection. When a plurality of 1.1 version data is provided, one of the services may be provided according to the user's selection.

In particular, at least one of the normal data, the existing mobile data, and the new mobile data can be arranged and transmitted in the stream as in the first through fourth modes (herein, all the first through fourth modes may be the compatible modes or only the fourth mode may be the incompatible mode) or the first through fifth modes.

In this case, the digital broadcast receiver can detect each data from an appropriate location according to the mode and decode the data by applying an appropriate decoding scheme.

More specifically, when the mode is represented with two bits and a TPC signaling field recorded as 00, 01, 10, or 11 is restored as described above, the digital broadcast receiver, upon confirming the value of 11 in the signaling data, checks the TPCs of not only the slot including the M/H group of the M/H parade to be received, but also other slots. Accordingly, when the mode information of every slot is 11 and the CMM slot does not exist, it is determined that the fourth mode is set to the incompatible mode. Hence, the digital broadcast receiver can decode the MPEG header and the parity region including the new mobile data, for example, the SB5 region, in the same manner as in the remaining body region stream. By contrast, when the scalable mode of every slot is not 11 or the CMM slot exists, it is determined that the set mode is the compatible mode, that is, the scalable mode 11a, and the MPEG header and the parity region, that is, the SB5 region, can be decoded in a different manner from the remaining body region stream, that is, in a decoding scheme corresponding to the coding scheme of the new mobile data. The TPC and the mode of each slot can be identified by the signaling decoder or a separate controller.

When the mode is represented with three bits and signaling bits such as 000, 001, 010, 011, and 111 are transmitted as described above, the digital broadcast receiver identifies the mode according to the bit value and performs the corresponding decoding.

The digital broadcast transmitter can generate and transmit a transport stream by combining the normal data, the existing mobile data, and the new mobile data.

Accordingly, the digital broadcast receiver receiving and processing the transport stream may be realized in various forms. That is, the digital broadcast receiver can be realized as a normal data receiver capable of processing only the normal data, an existing mobile data receiver capable of processing only the existing mobile data, a new mobile data receiver capable of processing only the new mobile data, and a common receiver capable of processing at least two of the data.

When the normal data receiver is realized, there is no data to be processed in the incompatible fourth mode or the incompatible fifth mode, unlike in the first through the compatible fourth modes. Accordingly, the digital broadcast receiver can ignore the transport stream which it cannot recognize and process.

By contrast, the existing mobile data receiver or the common receiver capable of processing both the existing mobile data and the normal data decodes the slot including only the normal packets or the normal data included in all of the 38 packets or part of the 38 packets in order to process the normal data, and detects and decodes the existing mobile data included in packets other than the 38 packets in order to process the existing mobile data. In particular, when the slot includes the new mobile data and the block mode is separate as described above, the primary ensemble portion is filled with the existing mobile data and the secondary ensemble portion is filled with the new mobile data so as to transmit both the existing mobile data and the new mobile data using one slot. Accordingly, when the mode is the scalable mode 11, the receiver decodes the remaining body region except for SB5 in order to process the existing mobile data. By contrast, when the mode is the scalable mode 11a, SB5 is not filled with the new mobile data and thus the entire body region is decoded in order to process the existing mobile data. Meanwhile, when the block mode is paired, all of the blocks are filled with only the 1.1 mobile data and thus the receiver ignores the corresponding slot in order to process the existing mobile data.

Likewise, the new mobile data receiver or the common receiver capable of processing the new mobile data and other data performs the decoding according to the block mode and the mode. That is, when the block mode is separate and the mode is the scalable mode 11, an independent block of the SB5 region and a block allocated the new mobile data are decoded in a decoding scheme corresponding to the coding scheme of the new mobile data. When the mode is the scalable mode 11a, the block allocated the new mobile data is decoded in a decoding scheme corresponding to the coding scheme of the new mobile data. By contrast, when the block mode is paired, all of the blocks can be decoded.

In FIGS. 51 through 53, the separately provided controller or the signaling decoder can identify the block mode and the mode and control the decoding as described above. In particular, when two bits of the signaling data indicate the mode and the bit value of 11 is transmitted, the controller or the signaling decoder can identify not only the TPC of the slot including the M/H group of the M/H parade to be received, but also the TPCs of the other slots. Accordingly, when the normal data rate is 0 Mbps, the bit value of 11 can be determined as the scalable mode 11 and decoded. By contrast, when the scalable mode of all of the slots is not 11 or when the CMM slot exists, that is, when the normal data rate is not 0 Mbps, the bit value of 11 can be determined as the scalable mode 11a and decoded.

Although the digital broadcast receiver of FIGS. 51 through 53 may be implemented using a set-top box or a TV, it is understood that the digital broadcast receiver may be implemented using various other devices, including, e.g., portable devices such as a personal computer, a personal digital assistant (PDA), a portable multiple media (e.g., an MP3 player), an electronic dictionary, a notebook computer, a tablet computer, a mobile phone, a digital camera, etc. Furthermore, although not depicted in FIGS. 51 through 53, it is understood that the receiver can include a component which appropriately scales or converts the decoded result data and outputs the data on a screen in the form of audio and video data.

Meanwhile, a stream generating method of the digital broadcast transmitter and a stream processing method of the digital broadcast receiver according to an exemplary embodiment can be explained using the aforementioned block diagrams and the stream diagrams.

That is, the stream generating method of the digital broadcast transmitter can largely include arranging the mobile data in at least part of the packets allocated to the normal data of all of the packets generating the stream, and generating the transport stream by inserting the normal data into the stream including the mobile data.

The arranging of the mobile data can be performed by the data preprocessor 100 illustrated in FIGS. 2 through 4.

The mobile data can be placed in various locations together with the normal data and the existing mobile data, or solely as in the aforementioned various exemplary embodiments. In other words, the mobile data and the known data can be placed in various fashions as shown in FIGS. 15 through 40.

The generating of the stream multiplexes the normal data processed apart from the mobile data with the mobile data, to generate the transport stream.

The generated transport stream passes through various processes such as RS encoding, interleaving, trellis encoding, sync multiplexing, and modulating, and then is transmitted to the receiver. The processing of the transport stream can be performed by various components of the digital broadcast transmitter depicted in FIG. 4.

The various exemplary embodiments of the stream generating method relate to the various operations of the aforementioned digital broadcast transmitter.

Meanwhile, the stream processing method of the digital broadcast receiver according an exemplary embodiment can include receiving the transport stream which is divided into the first region allocated to the existing mobile data and the second region allocated to the normal data, and arranges the mobile data separately from the existing mobile data in at least part of the second region, demodulating the received transport stream, equalizing the demodulated transport stream, and decoding at least one of the existing mobile data and the mobile data from the equalized transport stream.

The received transport stream in the present method can be generated and transmitted by the digital broadcast transmitter according to the aforementioned various exemplary embodiments. That is, the transport stream can place the mobile data in the various ways as shown in FIGS. 15 through 21 and 29 through 40. In addition, the known data can be also placed in the various ways as shown in FIGS. 22 through 28.

The various exemplary embodiments for the stream processing method relate to the various exemplary embodiments of the aforementioned digital broadcast receiver. Hence, the flowchart of the stream processing method is omitted.

Meanwhile, the examples of the various stream constructions as shown in FIGS. 15 through 40 as aforementioned are not limited to one constitution, but can be switched to different constitutions according to situations. That is, the data preprocessor 100 can arrange and block-code the mobile data and the known data by applying various frame modes, modes, and block modes, according to the control signal applied from the separately provided controller or the control signal input from the outside. Accordingly, a digital broadcast provider can provide the desired data, in particular, the mobile data in various sizes.

Also, the aforementioned new mobile data, that is, the 1.1 version data may be the same data as the existing mobile data, that is, the 1.0 version data, or different data input from another source. In addition, a plurality of 1.1 version data may be contained and transmitted in one slot. Hence, the user of the digital broadcast receiver is able to view his/her desired data of various types.

<Block Processing Method>

The above-described various exemplary embodiments can be modified in a variety of ways.

For example, the block processor 120 of FIG. 4 can perform the block coding by appropriately combining the existing mobile data, the normal data, the new mobile data, and the known data placed in the stream. Herein, the new mobile data and the known data can be placed in not only at least part of the normal data region allocated to the normal data, but also at least part of the existing mobile data region allocated to the existing mobile data. That is, the normal data, the new mobile data, and the existing mobile data may co-exist.

Figure 54:
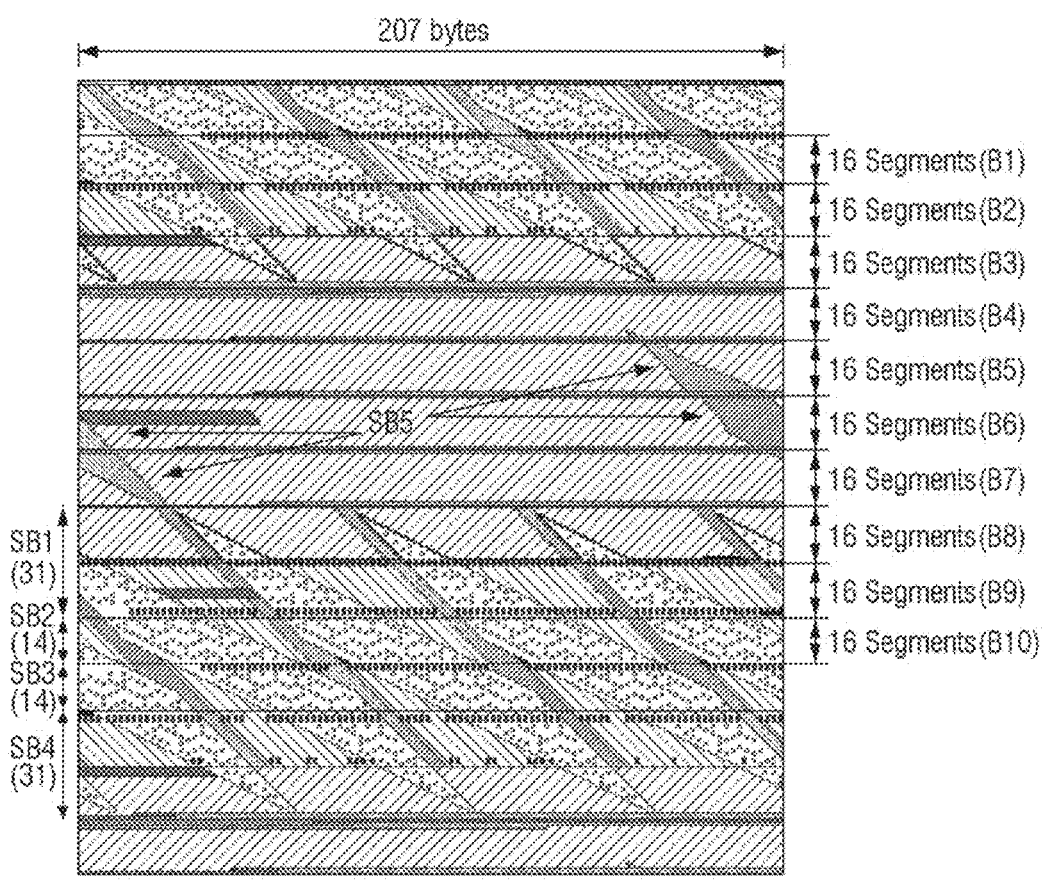
FIG. 54 is a stream format after the interleaving, according to an exemplary embodiment.

FIG. 54 illustrates an example of the stream format after interleaving, according to an exemplary embodiment. Referring to FIG. 54, a stream including a mobile data group includes 208 data segments. Initial five segments among the 208 data segments correspond to the RS parity data and thus are excluded from the mobile data group. Thus, the mobile data group of the 203 data segments in total is divided into 15 mobile data blocks. More specifically, the mobile data group includes blocks B1 through B10 and SB1 through SB5. Among them, the blocks B1 through B10 can correspond to the mobile data placed in the existing mobile data region as shown in FIG. 8. By contrast, the blocks SB1 through SB5 can correspond to the new mobile data allocated to the existing normal data region. SB5 includes an MPEG header and an RS parity for the sake of backward compatibility.

B1 through B10 each include 16 segments, SB1 and SB4 each can include 31 segments, and SB2 and SB3 each can include 14 segments.

These blocks, that is, B1 through B10 and SB1 through SB5 can be combined in various manners and block-coded.

That is, as described above, the block mode can be variously set, such as 00 or 01. The SCB blocks when the block mode is set to "00", and an SCCC Output Block Length (SOBL) and an SCCC Input Block Length (SIBL) of the SCB blocks are shown as follows.

TABLE 10

| SCCC Block | SOBL | SIBL ½ rate | SIBL ¼ rate |
|---|---|---|---|
| SCB1 (B1) | 528 | 264 | 132 |
| SCB2 (B2) | 1536 | 768 | 384 |
| SCB3 (B3) | 2376 | 1188 | 594 |
| SCB4 (B4) | 2388 | 1194 | 597 |
| SCB5 (B5) | 2772 | 1386 | 693 |
| SCB6 (B6) | 2472 | 1236 | 618 |
| SCB7 (B7) | 2772 | 1386 | 693 |
| SCB8 (B8) | 2508 | 1254 | 627 |
| SCB9 (B9) | 1416 | 708 | 354 |
| SCB10 (B10) | 480 | 240 | 120 |

Referring to Table 10, B1 through B10 become SCB1 through SCB10.

Meanwhile, the SCB blocks when the block mode is set to "01", and the SCCC Output Block Length (SOBL) and the SCCC Input Block Length (SIBL) of the SCB blocks are shown as follows.

TABLE 11

| SCCC Block | SOBL | SIBL ½ rate | SIBL ¼ rate |
|---|---|---|---|
| SCB1 (B1 + B6) | 3000 | 1500 | 750 |
| SCB2 (B2 + B7) | 4308 | 2154 | 1077 |
| SCB3 (B3 + B8) | 4884 | 2442 | 1221 |
| SCB4 (B4 + B9) | 3804 | 1902 | 951 |
| SCB5 (B5 + B10) | 3252 | 1626 | 813 |

Referring to Table 11, B1 and B6 are combined to generate one SCB1, B2 and B7, B3 and B8, B4 and B9, and B5 and B10 are combined to generate SCB2, SCB3, SCB4, and SCB5 respectively. Also, the input block length varies according to whether the rate is ½ or ¼.

As described above, the SCB blocks are generated by combining B1 through B10 when the new mobile data is not placed, that is, in the CMM mode operation.

In a Scalabale Full Channel Mobile Mode (SFCMM) in which the new mobile data is placed, the blocks can be differently combined to generate the SCB blocks. That is, the existing mobile data and the new mobile data can be combined so that the SCCC block coding can be achieved. Tables 12 and 13 below show examples of blocks being combined differently according to the RS frame mode and the slot mode.

TABLE 12

| | RS Frame Mode | | | |
|---|---|---|---|---|
| | 00 | | 01 | |
| | SCCC Block Mode | | | |
| | 00 | 01 | 00 | 01 |
| Description | Separate SCCC Block Mode | Paired SCCC Block Mode | Separate SCCC Block Mode | Paired SCCC Block Mode |
| SCB | SCB input, M/H Blocks | SCB input, M/H Blocks | SCB input, M/H Blocks | SCB input, M/H Blocks |
| SCB1 | B1 | B1 + B6 + SB3 | B1 | B1 + SB3 + B9 + SB1 |
| SCB2 | B2 | B2 + B7 + SB4 | B2 | B2 + SB4 + B10 + SB2 |
| SCB3 | B3 | B3 + B8 | B9 + SB1 | |
| SCB4 | B4 | B4 + B9 + SB1 | B10 + SB2 | |
| SCB5 | B5 | B5 + B10 + SB2 | SB3 | |
| SCB6 | B6 | | SB4 | |
| SCB7 | B7 | | | |
| SCB8 | B8 | | | |
| SCB9 | B9 + SB1 | | | |
| SCB10 | B10 + SB2 | | | |
| SCB11 | SB3 | | | |
| SCB12 | SB4 | | | |

In Table 12, the RS frame mode indicates information informing of whether one slot includes one ensemble (when the RS frame mode is 00) or whether one slot includes a plurality of ensembles such as a primary ensemble and a secondary ensemble (when the RS frame mode is 01). The SCCC block mode indicates information informing of whether the mode is to process an individual SCCC block or whether the mode is to process the SCCC block by combining a plurality of blocks, as in the above-described block mode.

Table 12 shows where the slot mode is 00. The slot mode is information indicating a basis for discriminating a start and an end of the slot. That is, the slot mode 00 implies that the portion including B1 through B10 and SB1 through SB5 for the same slot is classified as one slot, and the slot mode 01 implies that B1 and B2 are given to a previous slot and B1 and B2 of the following slot are included to the current slot so that the portion including 15 blocks in total is classified as one slot. The slot mode can be called diversely according to a version of a standard document. For example, it may be called a block extension mode. This will be explained in detail below.

Referring to Table 12, when the RS frame mode is 00 and the SCCC block mode is 00, B1 through B8 are used as SCB1 through SCB8 and B9 and SB1 are combined to generate SCB9. B10 and SB2 are combined to generate SCB10 and SB3 and SB4 are used as SCB11 and SCB12 respectively. By contrast, when the SCCC block mode is 01, B1, B6, and SB3 are combined and used as SCB1, B2+B7+SB4 are used as SCB2, and B3+B8, B4+B9+SB1, and B5+B10+SB2 are used as SCB3, SCB4, and SCB5 respectively.

By contrast, when the RS frame mode is 01 and the SCCC block mode is 00, B1, B2, B9+SB1, B10+SB2, SB3, and SB4 are used as SCB1 through SCB6 respectively. When the SCCC block mode is 01, B1+SB3+B9+SB1 is used as SCB1 and B2+SB4+B10+SB2 is used as SCB2.

Furthermore, when the slot mode is 01 and the new mobile data is arranged according to the first, second, and third modes as described above, SCCC blocks can be combined as listed in the following table.

TABLE 13

| | RS Frame Mode | | | |
| --- | --- | --- | --- | --- |
| | 00 | | 01 | |
| | SCCC Block Mode | | | |
| | 00 | 01 | 00 | 01 |
| Description | Separate SCCC Block Mode | Paired SCCC Block Mode | Separate SCCC Block Mode | Paired SCCC Block Mode |
| SCB | SCB input, M/H Blocks | SCB input, M/H Blocks | SCB input, M/H Blocks | SCB input, M/H Blocks |
| SCB1 | B1 + SB3 | B1 + B6 + SB3 | B1 + SB3 | B1 + SB3 + B9 + SB1 |
| SCB2 | B2 + SB4 | B2 + B7 + SB4 | B2 + SB4 | B2 + SB4 + B10 + SB2 |
| SCB3 | B3 | B3 + B8 | B9 + SB1 | |
| SCB4 | B4 | B4 + B9 + SB1 | B10 + SB2 | |
| SCB5 | B5 | B5 + B10 + SB2 | | |
| SCB6 | B6 | | | |
| SCB7 | B7 | | | |
| SCB8 | B8 | | | |
| SCB9 | B9 + SB1 | | | |
| SCB10 | B10 + SB2 | | | |

Referring to Table 13, according to the setting status such as RS frame mode and SCCC block mode, B1 through B10 and SB1 through SB5 can be combined in various ways.

When the slot mode is 01 and the new mobile data is placed in the entire normal data region according to the fourth mode as described above, the SCB blocks can be generated in various combinations as shown in the following table.

TABLE 14

| | RS Frame Mode | | | |
| --- | --- | --- | --- | --- |
| | 00 | | 01 | |
| | SCCC Block Mode | | | |
| | 00 | 01 | 00 | 01 |
| Description | Separate SCCC Block Mode | Paired SCCC Block Mode | Separate SCCC Block Mode | Paired SCCC Block Mode |
| SCB | SCB input, M/H Blocks | SCB input, M/H Blocks | SCB input, M/H Blocks | SCB input, M/H Blocks |
| SCB1 | B1 + SB3 | B1 + B6 + SB3 + SB5 | B1 + SB3 | B1 + SB3 + B9 + SB1 |
| SCB2 | B2 + SB4 | B2 + B7 + SB4 | B2 + SB4 | B2 + SB4 + B10 + SB2 |
| SCB3 | B3 | B3 + B8 | B9 + SB1 | |
| SCB4 | B4 | B4 + B9 + SB1 | B10 + SB2 | |

TABLE 14-continued

| | RS Frame Mode | | |
|---|---|---|---|
| | 00 | | 01 |
| | SCCC Block Mode | | |
| | 00 | 01 | 00 | 01 |
|---|---|---|---|---|
| SCB5 | B5 | | B5 + B10 + SB2 | |
| SCB6 | B6 + SB5 | | | |
| SCB7 | B7 | | | |
| SCB8 | B8 | | | |
| SCB9 | B9 + SB1 | | | |
| SCB10 | B10 + SB2 | | | |

As described above, the existing mobile data, the normal data, and the new mobile data can be classified into the blocks and the blocks can be combined variously according to the mode so as to generate the SCCC blocks. Hence, the generated SCCC blocks can be combined to construct the RS frame.

Such block combining and coding can be performed by the data preprocessor 100 described in the above exemplary embodiments. More specifically, the block processor 120 of the data preprocessor 100 can combine the blocks and perform the block-coding. The other processes than the combination have been described in the above exemplary embodiments and thus their redundant descriptions are omitted herein.

Meanwhile, the coding rate for coding the SCCC block, that is, an SCCC outer code rate may be differently determined according to an outer code mode, in detail, which is listed in the following table:

TABLE 15

| SCCC outer code mode | Description |
|---|---|
| 00 | The outer code rate of a SCCC Block is ½ rate |
| 01 | The outer code rate of a SCCC Block is ¼ rate |
| 10 | The outer code rate of a SCCC Block is ⅓ rate |
| 11 | Reserved |

As described in Table 15, the SCCC outer code mode can be variously set such as 00, 01, 10, and 11. As for 00, the SCCC block is coded at the code rate of ½. As for 01, the SCCC block is coded at the code rate of ¼. As for 10, the SCCC block is coded at the code rate of ⅓. The code rate can be changed variously according to the version of the standard. A newly added code rate can be assigned to the SCCC outer code mode 11. The matching relationship between the above-described SCCC outer code mode and the code rate may be changed. The data preprocessor 100 can code the SCC block by an appropriate code rate according to a setting status of the outer code mode. The setting status of the outer code mode can be notified by the controller 310 or other components or identified through a separate signaling channel. Meanwhile, the ⅓ code rate receives a 1-bit input and outputs 3 bits. An encoder can be configured diversely. For example, the encoder may be configured by combining the ½ code rate and the ¼ code rate or by puncturing an output of a 4-state convolution encoder.

[Block Extension Mode: BEM]

As described above, the coding method of the blocks existing in the slot differs according to the slot mode or the block extension mode. As described above, when the block extension mode is 00, a portion including B1 through B10 and SB1 through SB5 for the same slot is classified as one slot. When the block extension mode is 01, B1 and B2 are sent to the previous slot and a portion including B1 and B2 of the following slot in the current slot is classified as one slot.

The blocks of the slot can be classified into group regions. For example, four blocks B4 through B7 can be classified into a group region A, two blocks B3 and B8 can be classified into a group region B, two blocks B2 and B9 can be classified into a group region C, and two blocks B1 and B10 can be classified into a group region D. Also, four blocks SB1 through SB4 generated by interleaving the 38 packets which are the normal data region can be referred to as a group region E.

When the block extension mode of a certain slot is 01, the group regions A and B including blocks B3 through B8 can be defined as a primary ensemble. Blocks B1 and B2 are sent to the previous slot and the group regions C, D, and E including the blocks B9 and B10, the blocks SB1 through S4, and the blocks B1 and B2 of the following slot can be defined new secondary ensembles. The secondary ensemble can stuff the head/tail region with the long training data of the length corresponding to one data segment, similarly to the primary ensemble, and can improve the reception performance of the head/tail region up to an equal level of the reception performance of the body region.

When the block extension mode of the certain slot is 00, the primary ensemble is the same as the case of BEM 01 but the secondary ensemble is different. The secondary ensemble can be defined by including the blocks B1 and B2, the blocks B9 and B10, and the blocks SB1 to SB4 of the current slot. Unlike the primary ensemble, the secondary ensemble has a saw-like head/tail region and thus cannot stuff the head/tail region with the long training data. Therefore, the reception performance of the head/tail region is interior to that of the body region.

Figure 64:
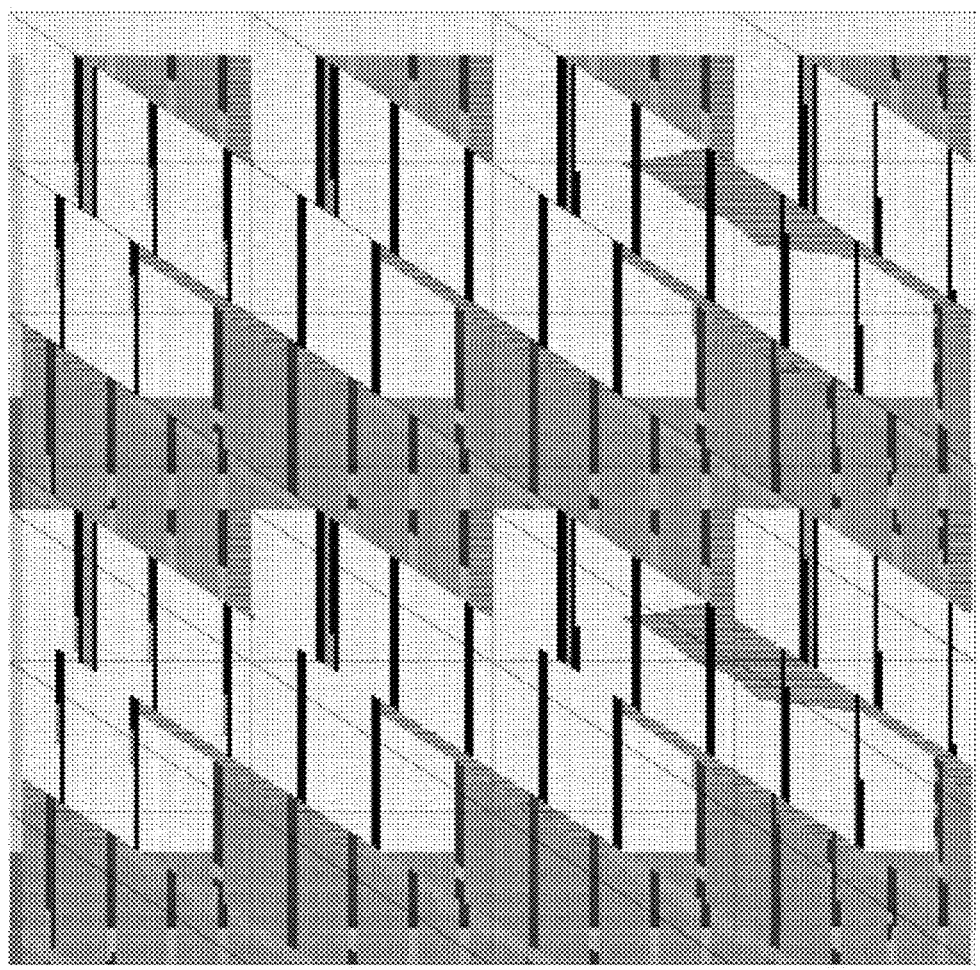
FIG. 64 is the stream structure before the interleaving in a block extension mode 00, according to an exemplary embodiment.
Figure 65:
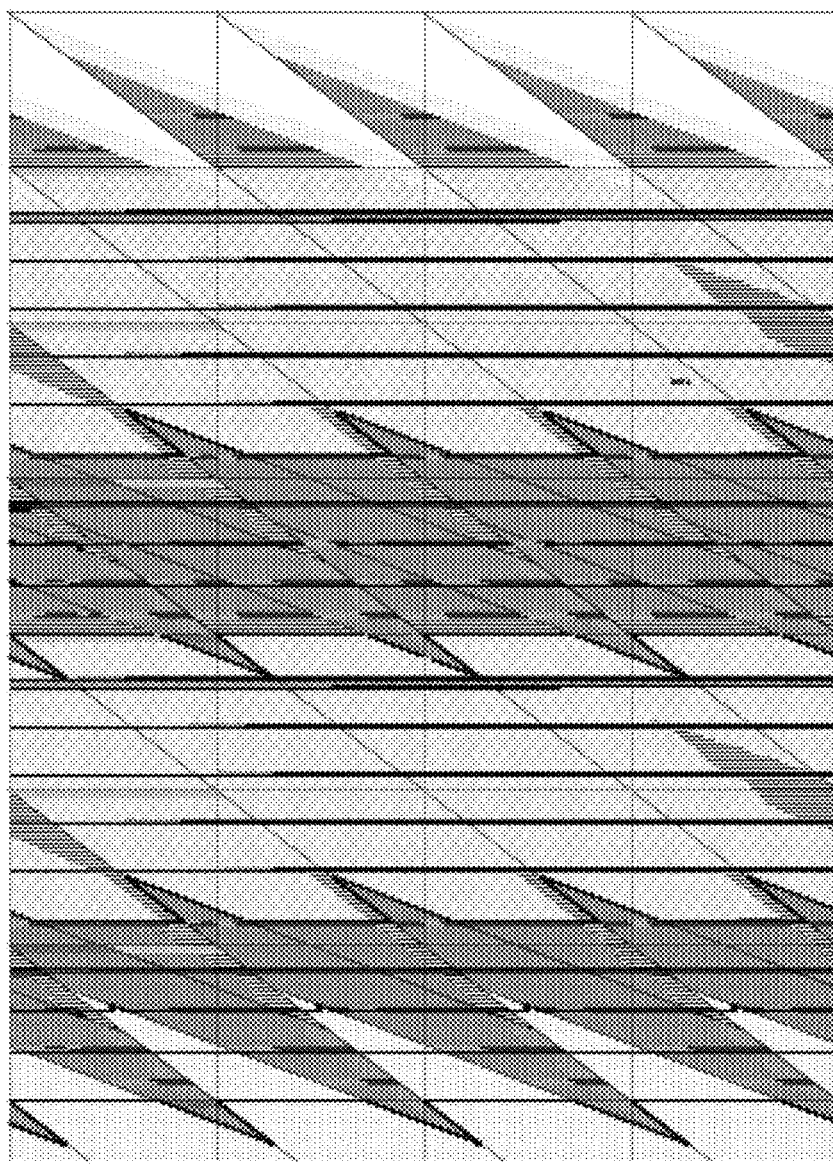
FIG. 65 is the stream structure after the interleaving in the block extension mode 00 according to an exemplary embodiment.

Meanwhile, when certain two slots are adjacent to each other as the BEM 00 mode, the long training data can fill an intersection portion of their saw-like head/tail regions. As shown in FIGS. 64 and 65, in the region where the two slots of the BEM 00 mode are adjacent and their saws are engaged, their segmented trainings are connected. As a result, the long training as long as one data segment can be generated. FIGS. 64 and 65 mark the trellis encoder initialization byte location and the known data (byte) location.

When an M/H frame is generated according to a service type, a slot (e.g., a Scalabale Full Channel Mobile Mode (SFCMM) slot) filled with the new mobile data can be arranged adjacent to a slot (SMM slot) filled with the existing mobile data or slots (full main slots) stuffing 156 packets with the normal data. At this time, when the BEM mode of the SFCMM slot is 00, the blocks can be combined smoothly even if the CMM slot or the full main slot is arranged as the adjacent slot. Among 16 slots in an M/H sub-frame, when a BEM 00 slot is arranged in Slot #0 and a CMM slot is arranged in Slot #1, a combination of the blocks B1 through B10 in the Slot #0 and the blocks SB1 through SB4 is block-coded. Likewise, in the Slot #1, a combination of the blocks B1 through B10 in the Slot #1 is block coded.

Meanwhile, when the BEM mode of the SFCMM slot is 01 and the CMM slot or the full main slot is arranged as the adjacent slot, an orphan region should be considered. The orphan region indicates a region which is difficult to use in any slot because a plurality of slots of different types is continuously arranged.

For example, among the 16 slots in the M/H sub-frame, provided that a BEM 01 slot is allocated to Slot #0 and the CMM slot is allocated to Slot #1, the blocks B1 and B2 in the Slot #0 are sent to a previous slot, and the blocks B3 through B10 and SB1 through SB4 and the blocks B1 and B2 of the following slot are incorporated and then block-coded. In other words, two slots filled with the mobile data 1.0 and the mobile data 1.1 which are incompatible with each other should avoid mutual interference according to the block coding scheme of the BEM 01.

Meanwhile, the slot with the BEM 00 and the slot with the BEM 01 can be set not to be combined together. By contrast, in the BEM 01, the CMM mode, BEM 01 mode, and full main mode slots can be combined and used together. In this case, a region which is difficult to use because of the mode difference is regarded and used as the orphan region.

[Orphan Region]

The orphan region for avoiding the interference of the two slots differs according to which type of slot the slot of BEM 01 is adjacent to and according to the order of adjacent slots.

First, when an (i)-th slot is the CMM slot and a following (i+1)-th slot is the BEM 01 slot, the blocks B1 and B2 existing in the head region of the BEM 01 slot are sent to the previous slot. However, since the CMM slot is not block-coded using the blocks B1 and B2 of the following slot, the block B1 and B2 region of the (i+1)-th slot remains without being allocated to any service. This region is defined as an orphan type 1. Likewise, when the (i)-th slot is the full main slot and the following (i+1)-th slot is the BEM 01 slot, the block B1 and B2 region of the (i+1)-th slot remains without being allocated to any service and thus the orphan type 1 can be generated.

Secondly, when the (i)-th slot is the BEM 01 slot and the following (i+1)-th slot is the CMM slot, the block-coding is performed using the blocks B1 and B2 of the following slot in the (i)-th BEM 01 slot and thus the blocks B1 and B2 are unavailable in the following slot. That is, since the following CMM slot is set to a dual frame mode, a service is allocated only to the primary ensemble and the secondary ensemble should be empty. At this time, in the secondary ensemble including the blocks B1 and B2 and B9 and B10, the blocks B1 and B2 are used by the previous (i)-th slot but the remaining block B9 and B10 region remains without being allocated to any service. This region is defined as an orphan type 2.

Lastly, when the (i)-th slot being the BEM 01 slot and the (i+1)-th slot being the full main slot are adjacent, an orphan type 3 is generated. When the slot BEM 01 uses the region corresponding to the blocks B1 and B2 from the following full main slot, the normal data cannot be transmitted over the highest 32 packets existing in the block B1 and B2 region of the 156 following slots. That is, part of the first 32 packets of the following slot, which corresponds to the block B1 and B2 region, is used in the slot BEM 01 being the (i)-th slot but the remaining region not corresponding to the block B1 and B2 region in the 32 packets remains without being allocated to any service. In the first 32 packets of the following slot, the remaining region not corresponding to the block B1 and B2 region is interleaved and then distributed in part of the group regions A and B in the group format. Thus, the orphan type 3 is generated in the body region of the following slot.

[Utilizing Orphan]

The orphan region can include the new mobile data, the training data, or the dummy byte. When the orphan region is stuffed with the new mobile data, presence or absence and a type of the corresponding data and signaling information for the receiver to recognize and to decode the data can be added.

When the orphan region is stuffed with the training data, the trellis encoder is initialized according to the training sequence and then the known byte is defined so that the receiver can recognize the training sequence.

Table 16 shows locations and usage of the orphan when BEM=01.

TABLE 16

| Slot(i) | Slot(i + 1) | Loss (bytes) | Orphan Location | Orphan Use |
|---|---|---|---|---|
| CMM | BEM = 01 | 1850 | Slot(i + 1) Head | Training (141/89) |
| BEM = 01 | CMM | 1570 | Slot(i + 1) Tail | Training (195/141) |
| Full Main | BEM = 01 | 1850 | Slot(i + 1) Head | Training (141/89) |
| BEM = 01 | Full Main | 3808 | Slot(i + 1) Part of Region A and B | Dummy |

Alternatively, when BEM=01, the orphan region can be generated as shown in Table 17.

TABLE 17

| Orphan Type | Slot(i) | Slot(i + 1) | Loss (bytes) | Orphan Region Location | Orphan Use (Known bytes/Initialization bytes) |
|---|---|---|---|---|---|
| type1 | CMM slot | SFCMM Slot with BEM = 01 | 1618 | Slot(i + 1) Head | Training (210/252) |
| type2 | SFCMM Slot with BEM = 01 | CMM slot | 1570 | Slot(i + 1) Tail | Training (195/141) |
| type1 | M/H Slot with only Main packets | SFCMM Slot with BEM = 01 | 1618 | Slot(i + 1) Head | Training (210/252) |
| type3 | SFCMM Slot with BEM = 01 | M/H Slot with only Main packets | 3808 | Slot(i + 1) Part of Regions A and B | Dummy |

As shown in the table, the orphan region can be formed in various locations and various sizes according to types of two consecutive slots. Also, the orphan region can be used for various purposes such as training data and dummy. Although Tables 16 and 17 do not show the mobile data being used in the orphan region, this case is possible.

Meanwhile, when the orphan region is used, a method for processing the stream of the digital broadcast transmitter can include a stream generating step for generating the stream in which a plurality of slots of different types including at least one of the existing mobile data, the normal data, and the new mobile data in different formats are consecutively arranged, and a transmitting step for encoding and interleaving the stream and outputting the transport stream. Herein, the transmitting step can be performed by the exciter 400 of the above-described digital broadcast transmitter.

Meanwhile, the stream generating step can arrange at least one of the new mobile data, the training data, and the dummy data in the orphan region to which data is not allocated due to the difference of the format between the consecutive slots. The usage of the orphan region has been described above.

The orphan region can be of diverse types as described above.

That is, when the CMM slot and the SFCMM slot of the block extension mode 01 are consecutively arranged or when the full main slot including only the normal data and the SFCMM slot of the block extension mode 01 are consecutively arranged, the first type orphan region can appear in a head portion of the SFCMM slot.

When the SFCMM slot of the block extension mode 01 and the CMM slot are consecutively arranged, the second type orphan can appear in a tail portion of the CMM slot.

When the SFCMM slot of the block extension mode 01 and the full main slot including only the normal data are consecutively arranged, the third type orphan region can appear in a body portion of the full main slot.

Herein, the CMM slot is the slot in which the existing mobile data is placed in the first region allocated for the existing mobile data and the normal data is placed in the second region allocated for the normal data, as described above.

The SFCMM slot is the slot in which the new mobile data is placed in at least part of the entire region including the first region and the second region according to the preset mode.

Figure 58:
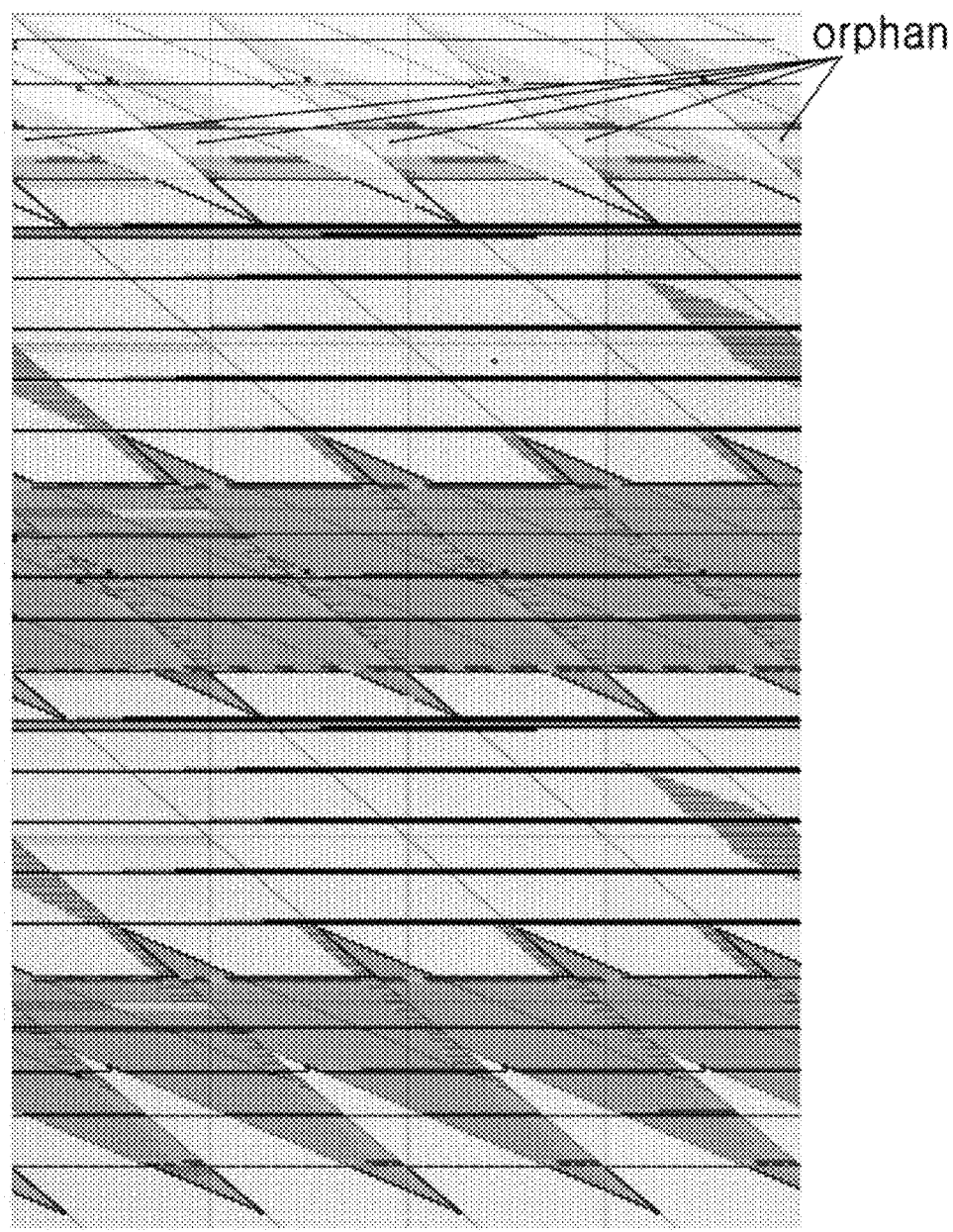
FIG. 58 is the stream structure indicating a first type orphan region after the interleaving, according to an exemplary embodiment.
Figure 59:
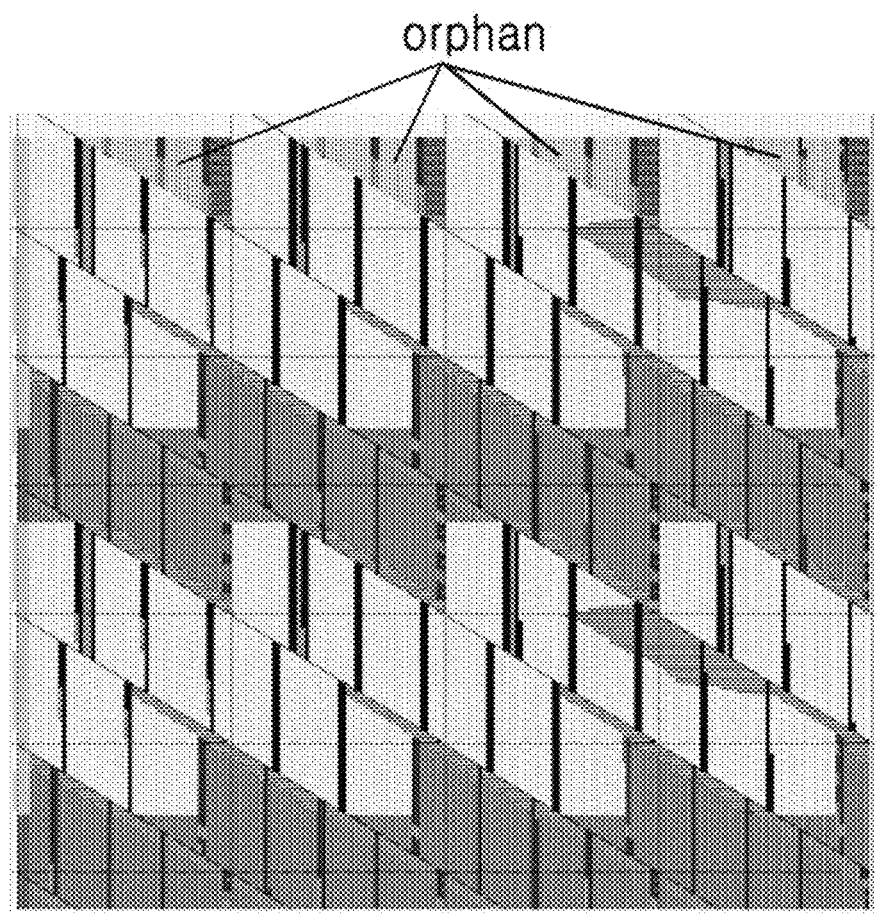
FIG. 59 is the stream structure indicating the first type orphan region before the interleaving, according to an exemplary embodiment.

FIG. 58 illustrates a stream structure showing the first type orphan region after interleaving according to an exemplary embodiment, and FIG. 59 illustrates a stream structure showing the first type orphan region before interleaving according to an exemplary embodiment.

Figure 60:
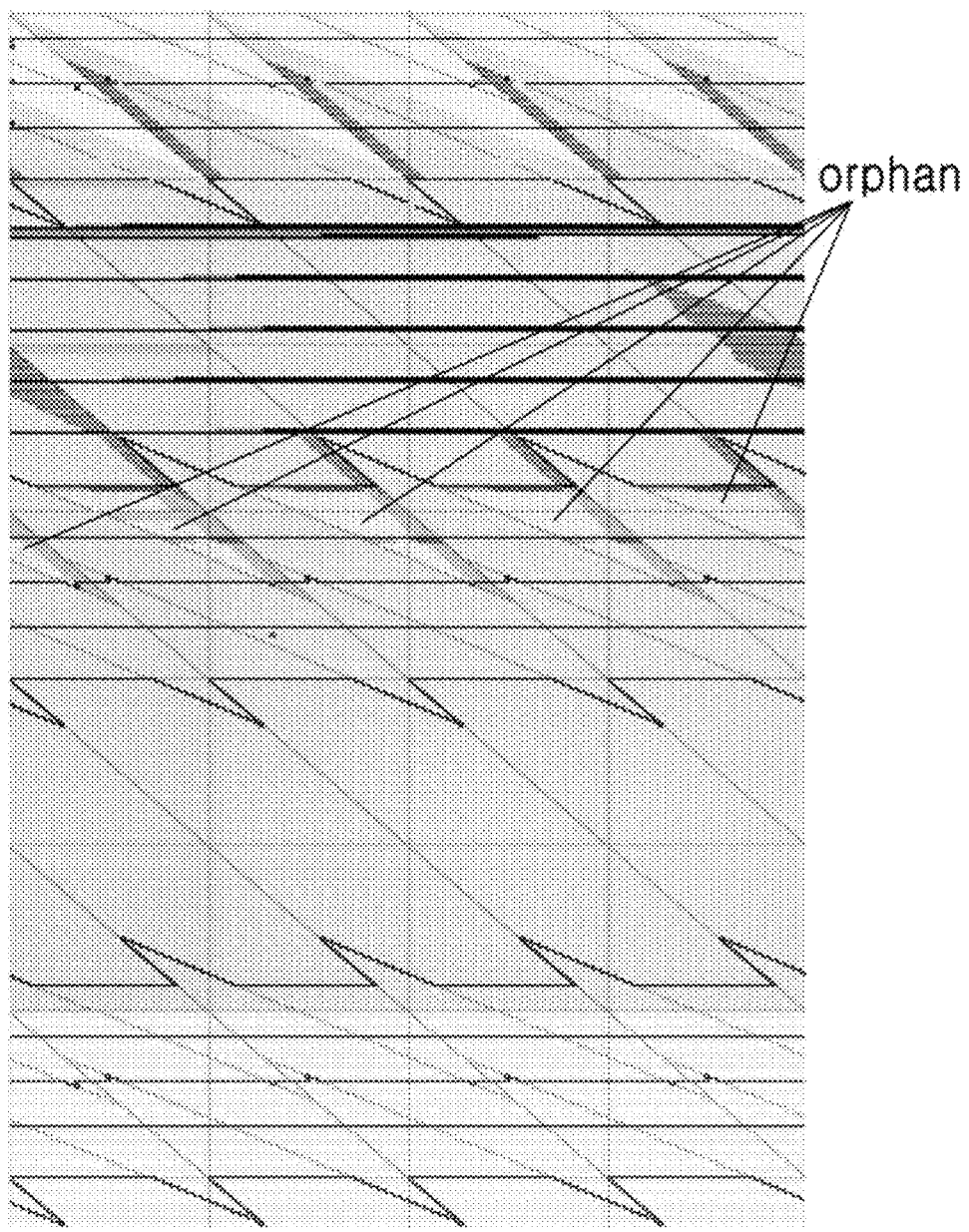
FIG. 60 is the stream structure indicating a second type orphan region after the interleaving, according to an exemplary embodiment.
Figure 61:
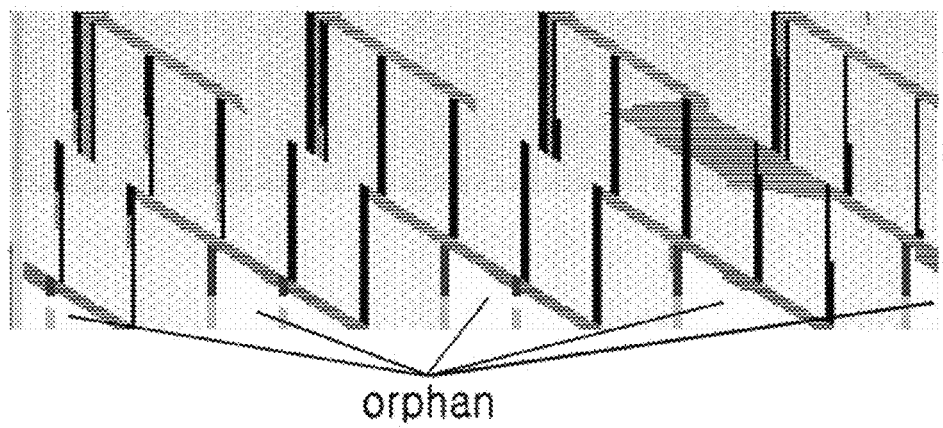
FIG. 61 is the stream structure indicating the second type orphan region before the interleaving, according to an exemplary embodiment.

FIG. 60 illustrates a stream structure showing the second type orphan region after interleaving according to an exemplary embodiment, and FIG. 61 illustrates a stream structure showing the second type orphan region before interleaving according to an exemplary embodiment.

Figure 62:
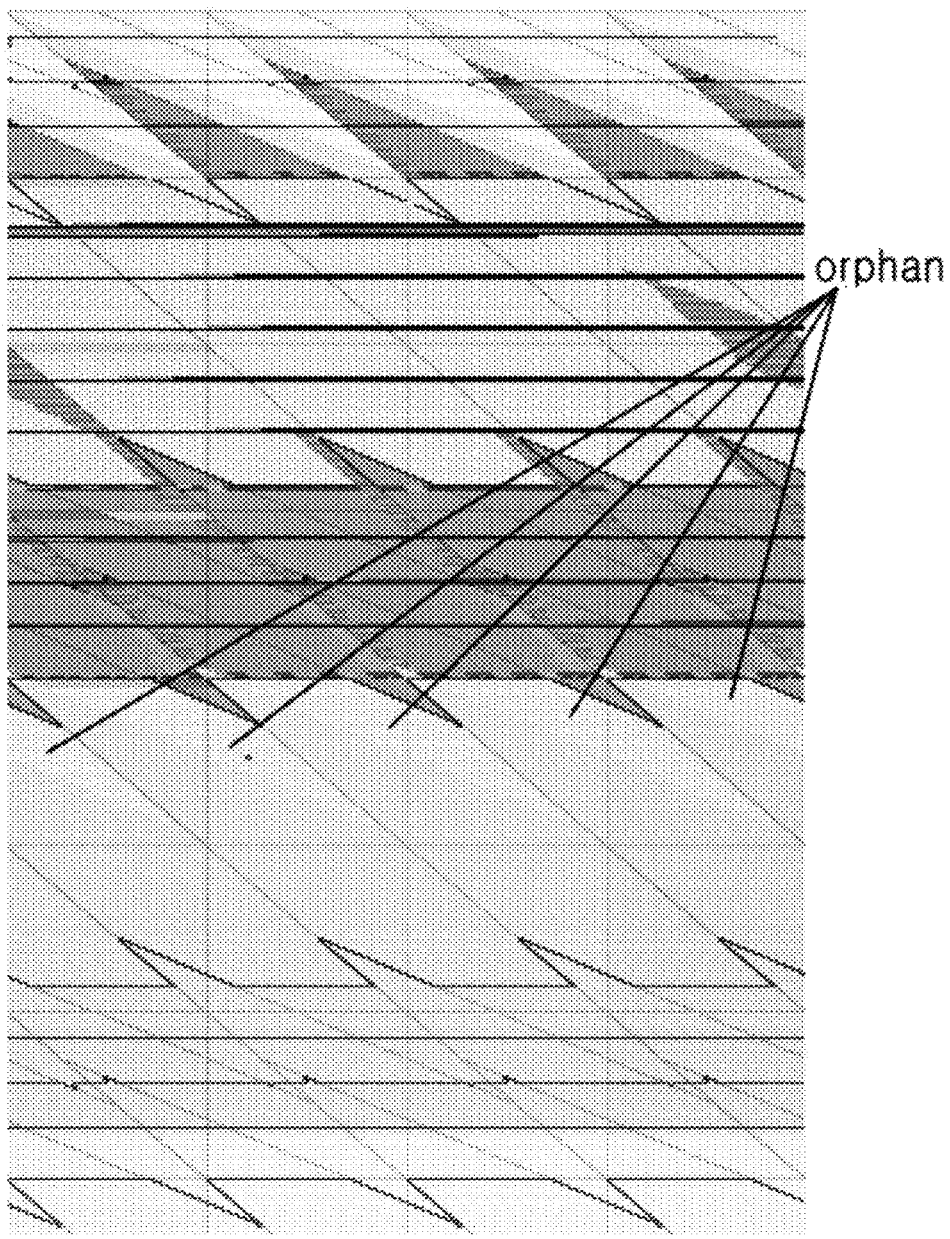
FIG. 62 is the stream structure indicating a third type orphan region after the interleaving, according to an exemplary embodiment.
Figure 63:
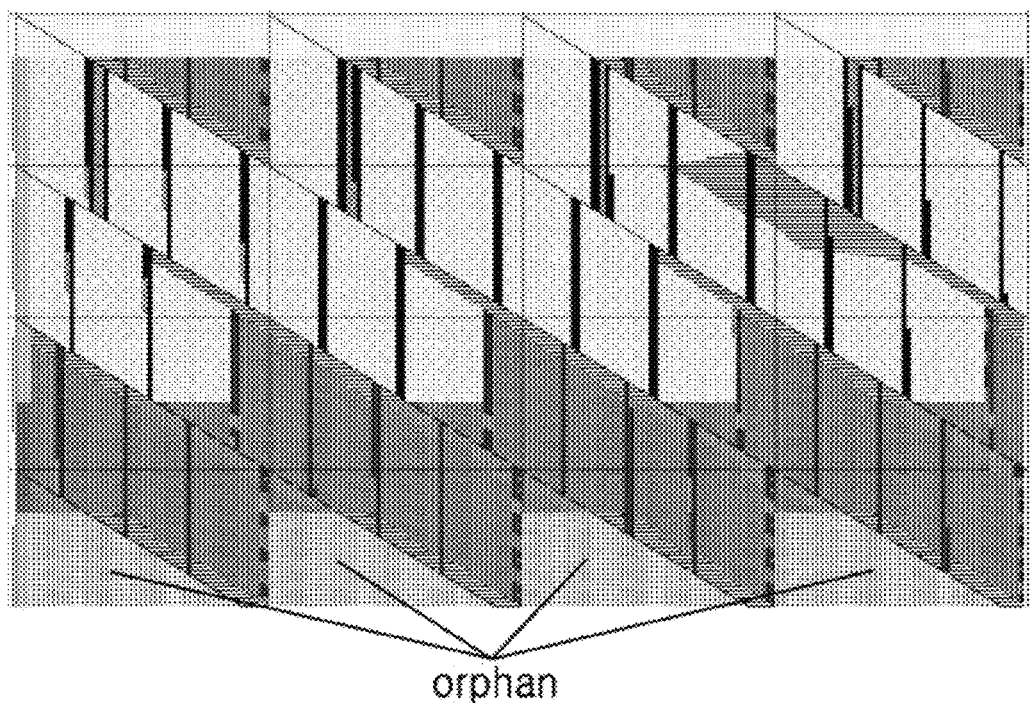
FIG. 63 is the stream structure indicating the third type orphan region before the interleaving, according to an exemplary embodiment.

FIG. 62 illustrates a stream structure showing the third type orphan region after interleaving according to an exemplary embodiment, and FIG. 63 illustrates a stream structure showing the third type orphan region before interleaving according to an exemplary embodiment.

According to the drawings, the orphan can be formed at various locations according to the arrangement patterns of the slot.

Meanwhile, the transport stream transmitted from the digital broadcast transmitter can be received and processed by the digital broadcast receiver.

That is, the digital broadcast receiver can include a receiver for receiving the transport stream encoded and interleaved while the plurality of slots of different types including at least one of the existing mobile data, the normal data, and the new mobile data in different formats are consecutively arranged, a demodulator for demodulating the transport stream, an equalizer for equalizing the demodulated transport stream, and a decoder for decoding the new mobile data from the equalized stream. Herein, the transport stream can include the orphan region to which data is not allocated because of the difference of the format between the consecutive slots, and at least one of the new mobile data, the training data, and the dummy data can be placed in the orphan region.

The digital broadcast receiver can detect and process only the data it can process according to its type, that is, according to whether it is the normal data receiver, the CMM receiver, the SFCMM receiver, the common receiver, etc.

Meanwhile, the signaling information can inform whether data exists in the orphan region and the type of data, as described above. That is, the digital broadcast receiver can further include a signaling decoder for decoding the signaling information and thus identifying whether the data exists in the orphan region and the type of the data.

[Signaling Data]

As described above, the information such as the number of the added existing or new mobile data packets or the code rate can be transmitted to the receiver as the signaling information.

For example, the signaling information can be transmitted using the reserved area of the TPC. In this case, "Signaling in Advance" can be achieved by transmitting information of the current frame over some sub-frames and information of a next frame over the other sub-frames. That is, a certain TPC parameter and FIC data can be signaled in advance.

Figure 55:
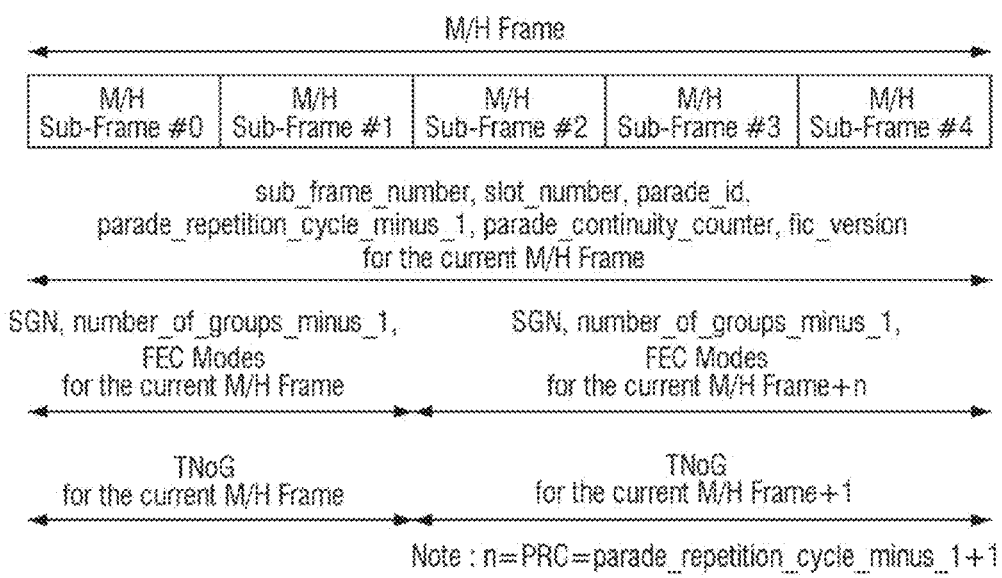
FIG. 55 is a pre-signaling method of next frame information, according to an exemplary embodiment.

More specifically, one M/H frame can be divided into five sub-frames as shown in FIG. 55. The TPC parameters such as sub_frame_number, slot_number, parade_id, parade_repetition_cycle_minus_1, parade_continuity_counter, fic_version, and the aforementioned added slot mode can transmit the information of the current frame over the five sub-frames. Meanwhile, the TPC parameters such as SGN, number_of_groups_minus_1, FEC Modes, TNoG, and the number of the existing or new mobile data packets added or the code rate as aforementioned can be differently recorded according to the sub-frame number. That is, the sub-frames #0 and #1 can transmit the information of the current frame, and the sub-frames #2, #3, and #4 can transmit the information of the next frame in consideration of Parade Repetition Cycle (PRC). As for TNoG, the sub-frames #0 and #1 can transmit only the information of the current frame, and the sub-frames #2, #3, and #4 can transmit the information of both of the current frame and the next frame.

In detail, the TPC information can be generated as the following table.

TABLE 18

| Syntax | No. of Bits | Format |
|---|---|---|
| TPC_data { | | |
|   sub-frame_number | 3 | uimsbf |
|   slot_number | 4 | uimsbf |
|   parade_id | 7 | uimsbf |
|   if(sub-frame_number ≤ 1){ | | |
|     current_starting_group_number | 4 | uimsbf |
|     current_number_of_groups_minus_1 } | 3 | uimsbf |
|   if(sub-frame_number ≥ 2){ | | |
|     next_starting_group_number | 4 | uimsbf |
|     next_number_of_groups_minus_1 } | 3 | uimsbf |
|   parade_repetition_cycle_minus_1 | 3 | uimsbf |
|   if(sub-frame_number ≤ 1){ | | |

TABLE 18-continued

| Syntax | | No. of Bits | Format |
|---|---|---|---|
|     current_rs_frame_mode | | 2 | bslbf |
|     current_rs_code_mode_primary | | 2 | bslbf |
|     current_rs_code_mode_secondary | | 2 | bslbf |
|     current_sccc_block_mode | | 2 | bslbf |
|     current_sccc_outer_code_mode_a | | 2 | bslbf |
|     current_sccc_outer_code_mode_b | | 2 | bslbf |
|     current_sccc_outer_code_mode_c | | 2 | bslbf |
|     current_sccc_outer_code_mode_d | } | 2 | bslbf |
| if(sub-frame_number ≥ 2){ | | | |
|     next_rs_frame_mode | | 2 | bslbf |
|     next_rs_code_mode_primary | | 2 | bslbf |
|     next_rs_code_mode_secondary | | 2 | bslbf |
|     next_sccc_block_mode | | 2 | bslbf |
|     next_sccc_outer_code_mode_a | | 2 | bslbf |
|     next_sccc_outer_code_mode_b | | 2 | bslbf |
|     next_sccc_outer_code_mode_c | | 2 | bslbf |
|     next_sccc_outer_code_mode_d | } | 2 | bslbf |
| fic_version | | 5 | uimsbf |
| parade_continuity_counter | | 4 | uimsbf |
| if(sub-frame_number ≤ 1){ | | | |
|     current_TNoG | | 5 | uimsbf |
|     reserved | } | 5 | bslbf |
| if(sub-frame_number ≥ 2){ | | | |
|     next_TNoG | | 5 | uimsbf |
|     current_TNoG | } | 5 | uimsbf |
| if(sub-frame_number ≤ 1){ | | | |
|     current_sccc_outer_code_mode_e | | 2 | bslbf |
|     current_scalable_mode | } | 2 | uimsbf |
| if(sub-frame_number ≥ 2){ | | | |
|     next_sccc_outer_code_mode_e | | 2 | bslbf |
|     next_scalable_mode | } | 2 | uimsbf |
| slot mode | | 2 | uimsbf |
| reserved | | 10 | bslbf |
| tpc_protocol_version | | 5 | bslbf |
| } | | | |

As shown in Table 18, when the sub-frame number is less than or equal to 1, that is, when the sub-frame number is #0 or #1, diverse information of the current M/H frame is transmitted. When the sub-frame number is greater than or equal to 2, that is, when the sub-frame number is #2, #3, or #4, diverse information of the next M/H frame can be transmitted by considering the PRC. Accordingly, the information of the next frame can be known in advance and thus the processing speed can be improved.

Meanwhile, the receiver structure can be modified according to variations of the above-described exemplary embodiments. That is, the receiver can decode the data which is combined variously according to the block mode and block-coded, and restore the existing mobile data, the normal data, and the new mobile data. Also, the receiver may identify the signaling information of the next frame in advance so as to prepare the process according to the identified information.

More specifically, in the digital broadcast receiver as constructed in FIG. 51, the receiver 5100 receives the stream generated by combining the data placed in the existing mobile data region and the new mobile data placed in the normal data region on the block basis and performing the SCCC-coding.

Herein, the stream is divided on the frame basis and one frame is divided into a plurality of sub-frames. At least some of the sub-frames can include the signaling information of the current frame, and the remaining sub-frames can include the signaling information of the next frame considering the PRC. For example, of the five sub-frames in total, the sub-frames #0 and #1 can include the information of the current frame, and the sub-frames #2, #3, and #4 can include the information of the next frame considering the PRC.

Also, the above-described stream can be the stream SCCC-coded by the digital broadcast transmitter at one of the ½ rate, the ⅓ rate, and the ¼ rate.

When the above-described stream is transmitted, the demodulator 5200 demodulates the stream and the equalizer 5300 equalizes the demodulated stream.

The decoder 5400 decodes at least one of the existing mobile data and the new mobile data from the equalized stream. In this case, the processing of the next frame can be prepared in advance using the frame information contained in each sub-frame.

As described above, the digital broadcast receiver can appropriately process the stream transmitted from the digital broadcast transmitter according to various exemplary embodiments.

Since the receiver according to various modified exemplary embodiments is similar to the other exemplary embodiments described above, explanation and illustration of the receiver are omitted.

Meanwhile, FIG. 56 is a diagram of the M/H group format before the data is interleaved in the above-described compatible mode, that is, in the scalable mode 11a.

Referring to FIG. 56, the M/H group including the mobile data includes 208 data segments. When the M/H group is distributed over 156 packets in the M/H slot generated on 156-packet basis, the 156 packets are spread over the 208 data segments as the interleaving result according to an interleaving rule of the interleaver 430.

The mobile data group of the 208 data segments is divided into 15 mobile data blocks. Specifically, the mobile data group includes blocks B1 through B10 and blocks SB1 through SB5. The blocks B1 through B10 can correspond to the mobile data placed in the existing mobile data region as shown in FIG. 8. By contrast, the blocks SB1 through SB5 can correspond to the new mobile data allocated to the existing normal data region. SB5 is the region including the MPEG header and the RS parity for the sake of the backward compatibility.

The blocks B1 through B10 each include 16 segments in the same way as the existing mobile data region, block SB4 can include 31 segments, and the blocks SB2 and SB3 each can include 14 segments. The block SB1 can have a different length of the distributed segment according to the mode. When no normal data is transmitted in all of the frames, that is, when the whole data rate of 19.4 Mbps is filled with the mobile data, the block SB1 can include 32 segments. When some of the normal data is transmitted, the block SB1 can include 31 segments.

The block SB5 is the region in which the MPEG header and the RS parity existing in 51 segments of the body region are distributed. When no normal data is transmitted in all of the frames, that is, when the whole data rate of 19.4 Mbps is filled with the mobile data, the mobile data can be stuffed to define the block SB5. This corresponds to the above-described incompatible mode. As above, when all of the data is allocated as the mobile data and thus there is no need to consider the compatibility, the region including the distributed MPEG header and RS parity existing for the compatibility with the receiver which receives the existing normal data, can be re-defined and used as the mobile data.

As above, the blocks, that is, B1 through B10 and SB1 through SB5 can be combined and block-coded in various fashions.

That is, when the SCCC block mode is 00 (separate block), the SCCC outer code mode is applied differently according to the group regions (A, B, C, D). By contrast, when the SCCC block mode is 01 (paired block), the SCCC outer code mode is to be the same for all of the regions. For example, SB1 and SB4, which are the newly added mobile data blocks, comply with the SCCC outer code mode set in the group region C, and the blocks SB2 and SB3 comply with the SCCC outer code mode set in the group region D. Lastly, the block SB5 complies with the SCCC outer code mode set in the group region A.

In particular, when the block SB5 is derived, the service is performed only with the mobile data. In this case, different SB5 coding can be applied by considering the compatibility between the receiver for receiving the existing mobile data and the receiver for additionally receiving the new mobile data.

That is, when the block mode of the slot from which block SB5 is derived is separate, the primary ensemble is filled with the 1.0 mobile data and the secondary ensemble is filled with the 1.1 mobile data and thus the compatibility with the receivers for receiving the mobile data is to be maintained. Accordingly, the block SB5 can be independently coded.

Meanwhile, when the block mode of the slot from which block SB5 is derived is paired, only 1.1 mobile data is stuffed as a single frame and thus the compatibility with the existing mobile data receiver is not to be considered. Hence, the block SB5 can be absorbed into the existing body region and coded.

More specifically, like the incompatible mode, that is, the scalable mode 11, when the new mobile data is placed in all of the second regions in one slot, different coding of SB5 can be applied according to the block mode. For example, when the block mode set for the corresponding slot is the separate mode including both of the existing mobile data and the new mobile data, the block including the MPEG header and the RS parity region, that is, SB5, can be coded independently from the body region in the corresponding slot. By contrast, when the block mode is the paired mode including only the new mobile data, the block including the MPEG header and the RS parity region, that is, SB5, can be coded along with the remaining portion of the body region. As described above, the block-coding can be performed in various ways.

Hence, the digital broadcast receiver for receiving the transport stream checks the mode according to the signaling data, and detects and reproduces the new mobile data according to the mode. In other words, when the new mobile data is transmitted in the paired block mode in the above-described incompatible mode (that is, the fifth mode or the scalable mode 11), the block SB5 can be decoded together with the mobile data included in the existing body region, rather than decoding separately.

As described above, when the known data, that is, the training sequence exists, the memories of the trellis encoder are initialized before the training sequence is trellis-encoded. In this case, the region provided for the memory initialization, that is, the initialization byte, is arranged before the training sequence.

FIG. 56 illustrates a stream structure after the interleaving. Referring to FIG. 56, the training sequence appears in the body region in the form of a plurality of long training sequences and also appears in the head/tail region in the form of a plurality of long training sequences. Specifically, 5 long training sequences in total appear in the head/tail region. Unlike the first and the fifth training sequences, with respect to the second, third, and fourth training sequences, the trellis initialization byte can begin after a certain byte, rather than starting from the first byte of each segment.

Such location shift of the trellis initialization byte is not limited to the head/tail region. That is, in some of the plurality of long training sequences included in the body region, the trellis initialization byte may be designed to begin after a certain byte of each segment.

[PL, SOBL, and SIBL Sizes According to the Block Mode]

Meanwhile, the sizes of RS Frame Portion Length (PL), SCCC Output Block Length (SOBL), and SCCC Input Block Length (SIBL) can vary according to the block mode. The following table shows the PL of the primary RS frame when the RS frame mode is 00 (i.e., single frame), the SCCC block mode is 00 (i.e., separate block), and the SCCC block extension mode is 01.

TABLE 19

SCCC Outer Code Mode Combinations

| For Region A and M/H Block SB5 | For Region B | For Region C, M/H Blocks SB1 and SB4 | For Region D, M/H Blocks SB2 and SB3 | PL Scalable Mode 00 | Scalable Mode 01 | Scalable Mode 10 | Scalable Mode 11 | Scalable Mode 11a |
|---|---|---|---|---|---|---|---|---|
| 00 | 00 | 00 | 00 | 10440 | 11094 | 11748 | 13884 | 12444 |
| 00 | 00 | 00 | 10 | 10138 | 10678 | 11216 | 13126 | 11766 |
| 00 | 00 | 00 | 01 | 9987 | 10470 | 10950 | 12747 | 11427 |
| 00 | 00 | 10 | 00 | 9810 | 10360 | 10912 | 12698 | 11522 |
| 00 | 00 | 10 | 10 | 9508 | 9944 | 10380 | 11940 | 10844 |
| 00 | 00 | 10 | 01 | 9357 | 9736 | 10114 | 11561 | 10505 |
| 00 | 00 | 01 | 00 | 9495 | 9993 | 10494 | 12105 | 11061 |
| 00 | 00 | 01 | 10 | 9193 | 9577 | 9962 | 11347 | 10383 |
| 00 | 00 | 01 | 01 | 9042 | 9369 | 9696 | 10968 | 10044 |
| 00 | 10 | 00 | 00 | 9626 | 10280 | 10934 | 13070 | 11630 |
| 00 | 10 | 00 | 10 | 9324 | 9864 | 10402 | 12312 | 10952 |
| 00 | 10 | 00 | 01 | 9173 | 9656 | 10136 | 11933 | 10613 |
| 00 | 10 | 10 | 00 | 8996 | 9546 | 10098 | 11884 | 10708 |
| 00 | 10 | 10 | 10 | 8694 | 9130 | 9566 | 11126 | 10030 |
| 00 | 10 | 10 | 01 | 8543 | 8922 | 9300 | 10747 | 9691 |
| 00 | 10 | 01 | 00 | 8681 | 9179 | 9680 | 11291 | 10247 |
| 00 | 10 | 01 | 10 | 8379 | 8763 | 9148 | 10533 | 9569 |
| 00 | 10 | 01 | 01 | 8228 | 8555 | 8882 | 10154 | 9230 |
| 00 | 01 | 00 | 00 | 9219 | 9873 | 10527 | 12663 | 11223 |
| 00 | 01 | 00 | 10 | 8917 | 9457 | 9995 | 11905 | 10545 |
| 00 | 01 | 00 | 01 | 8766 | 9249 | 9729 | 11526 | 10206 |
| 00 | 01 | 10 | 00 | 8589 | 9139 | 9691 | 11477 | 10301 |
| 00 | 01 | 10 | 10 | 8287 | 8723 | 9159 | 10719 | 9623 |
| 00 | 01 | 10 | 01 | 8136 | 8515 | 8893 | 10340 | 9284 |
| 00 | 01 | 01 | 00 | 8274 | 8772 | 9273 | 10884 | 9840 |

TABLE 19-continued

SCCC Outer Code Mode Combinations

| For Region A and M/H Block SB5 | For Region B | For Region C, M/H Blocks SB1 and SB4 | For Region D, M/H Blocks SB2 and SB3 | PL Scalable Mode 00 | Scalable Mode 01 | Scalable Mode 10 | Scalable Mode 11 | Scalable Mode 11a |
|---|---|---|---|---|---|---|---|---|
| 00 | 01 | 01 | 10 | 7972 | 8356 | 8741 | 10126 | 9162 |
| 00 | 01 | 01 | 01 | 7821 | 8148 | 8475 | 9747 | 8823 |
| 10 | 00 | 00 | 00 | 8706 | 9360 | 10014 | 12422 | 10710 |
| 10 | 00 | 00 | 10 | 8404 | 8944 | 9482 | 11256 | 10032 |
| 10 | 00 | 00 | 01 | 8253 | 8736 | 9216 | 10877 | 9693 |
| 10 | 00 | 10 | 00 | 8076 | 8626 | 9178 | 10828 | 9788 |
| 10 | 00 | 10 | 10 | 7774 | 8210 | 8646 | 10070 | 9110 |
| 10 | 00 | 10 | 01 | 7623 | 8002 | 8380 | 9691 | 8771 |
| 10 | 00 | 01 | 00 | 7761 | 8259 | 8760 | 10235 | 9327 |
| 10 | 00 | 01 | 10 | 7459 | 7843 | 8228 | 9477 | 8649 |
| 10 | 00 | 01 | 01 | 7308 | 7635 | 7962 | 9098 | 8310 |
| 10 | 10 | 00 | 00 | 7892 | 8546 | 9200 | 11200 | 9896 |
| 10 | 10 | 00 | 10 | 7590 | 8130 | 8668 | 10442 | 9218 |
| 10 | 10 | 00 | 01 | 7439 | 7922 | 8402 | 10063 | 8879 |
| 10 | 10 | 10 | 00 | 7262 | 7812 | 8364 | 10014 | 8974 |
| 10 | 10 | 10 | 10 | 6960 | 7396 | 7832 | 9256 | 8296 |
| 10 | 10 | 10 | 01 | 6809 | 7188 | 7566 | 8877 | 7957 |
| 10 | 10 | 01 | 00 | 6947 | 7445 | 7946 | 9421 | 8513 |
| 10 | 10 | 01 | 10 | 6645 | 7029 | 7414 | 8663 | 7835 |
| 10 | 10 | 01 | 01 | 6494 | 6821 | 7148 | 8284 | 7496 |
| 10 | 01 | 00 | 00 | 7485 | 8139 | 8793 | 10793 | 9489 |
| 10 | 01 | 00 | 10 | 7183 | 7723 | 8261 | 10035 | 8811 |
| 10 | 01 | 00 | 01 | 7032 | 7515 | 7995 | 9656 | 8472 |
| 10 | 01 | 10 | 00 | 6855 | 7405 | 7957 | 9607 | 8567 |
| 10 | 01 | 10 | 10 | 6553 | 6989 | 7425 | 8849 | 7889 |
| 10 | 01 | 10 | 01 | 6402 | 6781 | 7159 | 8470 | 7550 |
| 10 | 01 | 01 | 00 | 6540 | 7038 | 7539 | 9014 | 8106 |
| 10 | 01 | 01 | 10 | 6238 | 6622 | 7007 | 8256 | 7428 |
| 10 | 01 | 01 | 01 | 6087 | 6414 | 6741 | 7877 | 7089 |
| 01 | 00 | 00 | 00 | 7839 | 8493 | 9147 | 11079 | 9843 |
| 01 | 00 | 00 | 10 | 7537 | 8077 | 8615 | 10321 | 9165 |
| 01 | 00 | 00 | 01 | 7386 | 7869 | 8349 | 9942 | 8826 |
| 01 | 00 | 10 | 00 | 7209 | 7759 | 8311 | 9893 | 8921 |
| 01 | 00 | 10 | 10 | 6907 | 7343 | 7779 | 9135 | 8243 |
| 01 | 00 | 10 | 01 | 6756 | 7135 | 7513 | 8756 | 7904 |
| 01 | 00 | 01 | 00 | 6894 | 7392 | 7893 | 9300 | 8460 |
| 01 | 00 | 01 | 10 | 6592 | 6976 | 7361 | 8542 | 7782 |
| 01 | 00 | 01 | 01 | 6441 | 6768 | 7095 | 8163 | 7443 |
| 01 | 10 | 00 | 00 | 7025 | 7679 | 8333 | 10265 | 9029 |
| 01 | 10 | 00 | 10 | 6723 | 7263 | 7801 | 9507 | 8351 |
| 01 | 10 | 00 | 01 | 6572 | 7055 | 7535 | 9128 | 8012 |
| 01 | 10 | 10 | 00 | 6395 | 6945 | 7497 | 9079 | 8107 |
| 01 | 10 | 10 | 10 | 6093 | 6529 | 6965 | 8321 | 7429 |
| 01 | 10 | 10 | 01 | 5942 | 6321 | 6699 | 7942 | 7090 |
| 01 | 10 | 01 | 00 | 6080 | 6578 | 7079 | 8486 | 7646 |
| 01 | 10 | 01 | 10 | 5778 | 6162 | 6547 | 7728 | 6968 |
| 01 | 10 | 01 | 01 | 5627 | 5954 | 6281 | 7349 | 6629 |
| 01 | 01 | 00 | 00 | 6618 | 7272 | 7926 | 9858 | 8622 |
| 01 | 01 | 00 | 10 | 6316 | 6856 | 7394 | 9100 | 7944 |
| 01 | 01 | 00 | 01 | 6165 | 6648 | 7128 | 8721 | 7605 |
| 01 | 01 | 10 | 00 | 5988 | 6538 | 7090 | 8672 | 7700 |
| 01 | 01 | 10 | 10 | 5686 | 6122 | 6558 | 7914 | 7022 |
| 01 | 01 | 10 | 01 | 5535 | 5914 | 6292 | 7535 | 6683 |
| 01 | 01 | 01 | 00 | 5673 | 6171 | 6672 | 8079 | 7239 |
| 01 | 01 | 01 | 10 | 5371 | 5755 | 6140 | 7321 | 6561 |
| 01 | 01 | 01 | 01 | 5220 | 5547 | 5874 | 6942 | 6222 |
| Others | | | | Undefined | Undefined | Undefined | Undefined | Undefined |

Also, the following table shows the PL of the primary RS frame when the RS frame mode is 00 (i.e., single frame), the SCCC block mode is 01 (i.e., paired block), and the SCCC block extension mode is 01.

TABLE 20

| SCCC Outer Code Mode | PL | | | | |
|---|---|---|---|---|---|
| | Scalable Mode 00 | Scalable Mode 01 | Scalable Mode 10 | Scalable Mode 11 | Scalable Mode 11a |
| 00 | 10440 | 11094 | 11748 | 13884 | 12444 |
| 10 | 6960 | 7396 | 7832 | 9256 | 8296 |

TABLE 20-continued

| SCCC Outer Code Mode | PL | | | | |
|---|---|---|---|---|---|
| | Scalable Mode 00 | Scalable Mode 01 | Scalable Mode 10 | Scalable Mode 11 | Scalable Mode 11a |
| 01 | 5220 | 5547 | 5874 | 6942 | 6222 |
| Others | | | Undefined | | |

Also, the following table shows the PL of the secondary RS frame when the RS frame mode is 01 (i.e., dual frame), the SCCC block mode is 00 (i.e., separate block), and the SCCC block extension mode is 01.

TABLE 21

| SCCC Outer Code Mode Combinations | | | PL | | | | |
|---|---|---|---|---|---|---|---|
| For Region C, M/H Blocks SB1 and SB4 | For Region D, M/H Blocks SB2 and SB3 | For M/H Block SB5 | Scalable Mode 00 | Scalable Mode 01 | Scalable Mode 10 | Scalable Mode 11 | Scalable Mode 11a |
| 00 | 00 | 00 | 2796 | 3450 | 4104 | 6240 | 4800 |
| 00 | 10 | 00 | 2494 | 3034 | 3572 | 5482 | 4122 |
| 00 | 01 | 00 | 2343 | 2826 | 3306 | 5103 | 3783 |
| 10 | 00 | 00 | 2166 | 2716 | 3268 | 5054 | 3878 |
| 10 | 10 | 00 | 1864 | 2300 | 2736 | 4296 | 3200 |
| 10 | 01 | 00 | 1713 | 2092 | 2470 | 3917 | 2861 |
| 01 | 00 | 00 | 1851 | 2349 | 2850 | 4461 | 3417 |
| 01 | 10 | 00 | 1549 | 1933 | 2318 | 3703 | 2739 |
| 01 | 01 | 00 | 1398 | 1725 | 2052 | 3324 | 2400 |
| 00 | 00 | 01 | 2796 | 3450 | 4104 | 6036 | 4800 |
| 00 | 10 | 01 | 2494 | 3034 | 3572 | 5278 | 4122 |
| 00 | 01 | 01 | 2343 | 2826 | 3306 | 4899 | 3783 |
| 10 | 00 | 01 | 2166 | 2716 | 3268 | 4850 | 3878 |
| 10 | 10 | 01 | 1864 | 2300 | 2736 | 4092 | 3200 |
| 10 | 01 | 01 | 1713 | 2092 | 2470 | 3713 | 2861 |
| 01 | 00 | 01 | 1851 | 2349 | 2850 | 4257 | 3417 |
| 01 | 10 | 01 | 1549 | 1933 | 2318 | 3499 | 2739 |
| 01 | 01 | 01 | 1398 | 1725 | 2052 | 3120 | 2400 |
| Others | | | Undefined | Undefined | Undefined | Undefined | Undefined |

Also, the following table shows the SOBL and the SIBL when the SCCC block mode is 00 (i.e., separate block), the RS frame mode is 00 (i.e., single frame), and the SCCC block extension mode is 01.

TABLE 22

| SCCC Block | SOBL | | | | | SIBL | | | | |
|---|---|---|---|---|---|---|---|---|---|---|
| | Scalable Mode 00 | Scalable Mode 01 | Scalable Mode 10 | Scalable Mode 11 | Scalable Mode 11a | Scalable Mode 00 | Scalable Mode 01 | Scalable Mode 10 | Scalable Mode 11 | Scalable Mode 11a |
| | | | | | | 1/2 rate | | | | |
| SCB1 (B1 + SB3) | 888 | 1212 | 1536 | 2280 | 1932 | 444 | 606 | 768 | 1140 | 966 |
| SCB2 (B2 + SB4) | 1872 | 2160 | 2412 | 3432 | 2568 | 936 | 1080 | 1206 | 1716 | 1284 |
| SCB3 (B3) | 2376 | 2376 | 2376 | 2376 | 2376 | 1188 | 1188 | 1188 | 1188 | 1188 |
| SCB4 (B4) | 2388 | 2388 | 2388 | 2388 | 2388 | 1194 | 1194 | 1194 | 1194 | 1194 |
| SCB5 (B5) | 2772 | 2772 | 2772 | 2772 | 2772 | 1386 | 1386 | 1386 | 1386 | 1386 |
| SCB6 (B6) | 2472 | 2472 | 2472 | 2472 | 2472 | 1236 | 1236 | 1236 | 1236 | 1236 |
| SCB7 (B7) | 2772 | 2772 | 2772 | 2772 | 2772 | 1386 | 1386 | 1386 | 1386 | 1386 |
| SCB8 (B8) | 2508 | 2508 | 2508 | 2508 | 2508 | 1254 | 1254 | 1254 | 1254 | 1254 |
| SCB9 (B9 + SB1) | 1908 | 2244 | 2604 | 3684 | 2964 | 954 | 1122 | 1302 | 1842 | 1482 |

TABLE 22-continued

| | SOBL | | | | | SIBL | | | | |
|---|---|---|---|---|---|---|---|---|---|---|
| SCCC Block | Scalable Mode 00 | Scalable Mode 01 | Scalable Mode 10 | Scalable Mode 11 | Scalable Mode 11a | Scalable Mode 00 | Scalable Mode 01 | Scalable Mode 10 | Scalable Mode 11 | Scalable Mode 11a |
| SCB10 (B10 + SB2) | 924 | 1284 | 1656 | 2268 | 2136 | 462 | 642 | 828 | 1134 | 1068 |
| SCB11 (SB5) | 0 | 0 | 0 | 816 | 0 | 0 | 0 | 0 | 408 | 0 |
| | | | | | | | | 1/3 rate | | |
| SCB1 (B1 + SB3) | 888 | 1212 | 1536 | 2280 | 1932 | 296 | 404 | 512 | 760 | 644 |
| SCB2 (B2 + SB4) | 1872 | 2160 | 2412 | 3432 | 2568 | 624 | 720 | 804 | 1144 | 856 |
| SCB3 (B3) | 2376 | 2376 | 2376 | 2376 | 2376 | 792 | 792 | 792 | 792 | 792 |
| SCB4 (B4) | 2388 | 2388 | 2388 | 2388 | 2388 | 796 | 796 | 796 | 796 | 796 |
| SCB5 (B5) | 2772 | 2772 | 2772 | 2772 | 2772 | 924 | 924 | 924 | 924 | 924 |
| SCB6 (B6) | 2472 | 2472 | 2472 | 2472 | 2472 | 824 | 824 | 824 | 824 | 824 |
| SCB7 (B7) | 2772 | 2772 | 2772 | 2772 | 2772 | 924 | 924 | 924 | 924 | 924 |
| SCB8 (B8) | 2508 | 2508 | 2508 | 2508 | 2508 | 836 | 836 | 836 | 836 | 836 |
| SCB9 (B9 + SB1) | 1908 | 2244 | 2604 | 3684 | 2964 | 636 | 748 | 868 | 1228 | 988 |
| SCB10 (B10 + SB2) | 924 | 1284 | 1656 | 2268 | 2136 | 308 | 428 | 552 | 756 | 712 |
| SCB11 (SB5) | 0 | 0 | 0 | 816 | 0 | 0 | 0 | 0 | 272 | 0 |
| | | | | | | | | 1/4 rate | | |
| SCB1 (B1 + SB3) | 888 | 1212 | 1536 | 2280 | 1932 | 222 | 303 | 384 | 570 | 483 |
| SCB2 (B2 + SB4) | 1872 | 2160 | 2412 | 3432 | 2568 | 468 | 540 | 603 | 858 | 642 |
| SCB3 (B3) | 2376 | 2376 | 2376 | 2376 | 2376 | 594 | 594 | 594 | 594 | 594 |
| SCB4 (B4) | 2388 | 2388 | 2388 | 2388 | 2388 | 597 | 597 | 597 | 597 | 597 |
| SCB5 (B5) | 2772 | 2772 | 2772 | 2772 | 2772 | 693 | 693 | 693 | 693 | 693 |
| SCB6 (B6) | 2472 | 2472 | 2472 | 2472 | 2472 | 618 | 618 | 618 | 618 | 618 |
| SCB7 (B7) | 2772 | 2772 | 2772 | 2772 | 2772 | 693 | 693 | 693 | 693 | 693 |
| SCB8 (B8) | 2508 | 2508 | 2508 | 2508 | 2508 | 627 | 627 | 627 | 627 | 627 |
| SCB9 (B9 + SB1) | 1908 | 2244 | 2604 | 3684 | 2964 | 477 | 561 | 651 | 921 | 741 |
| SCB10 (B10 + SB2) | 924 | 1284 | 1656 | 2268 | 2136 | 231 | 321 | 414 | 567 | 534 |
| SCB11 (SB5) | 0 | 0 | 0 | 816 | 0 | 0 | 0 | 0 | 204 | 0 |

The following table shows the SOBL and the SIBL when the SCCC block mode is 01 (i.e., paired block), the RS frame mode is 01 (i.e., dual frame), and the SCCC block extension mode is 01.

TABLE 23

| | SOBL | | | | | SIBL | | | | |
|---|---|---|---|---|---|---|---|---|---|---|
| SCCC Block | Scalable Mode 00 | Scalable Mode 01 | Scalable Mode 10 | Scalable Mode 11 | Scalable Mode 11a | Scalable Mode 00 | Scalable Mode 01 | Scalable Mode 10 | Scalable Mode 11 | Scalable Mode 11a |
| | | | | | | | | 1/2 rate | | |
| SCB1 (B1 + B6 + SB3) | 3360 | 3684 | 4008 | 4752 | 4404 | 1680 | 1842 | 2004 | 2376 | 2202 |
| SCB2 (B2 + B7 + SB4) | 4644 | 4932 | 5184 | 6204 | 5340 | 2322 | 2466 | 2592 | 3102 | 2670 |
| SCB3 (B3 + B8) | 4884 | 4884 | 4884 | 4884 | 4884 | 2442 | 2442 | 2442 | 2442 | 2442 |
| SCB4 (B4 + B9 + SB1) | 4296 | 4632 | 4992 | 6072 | 5352 | 2148 | 2316 | 2496 | 3036 | 2676 |
| SCB5 (B5 + B10 + SB2) | 3696 | 4056 | 4428 | 5040 | 4908 | 1848 | 2028 | 2214 | 2520 | 2454 |
| SCB6 (SB5) | 0 | 0 | 0 | 816 | 0 | 0 | 0 | 0 | 408 | 0 |
| | | | | | | | | 1/3 rate | | |
| SCB1 (B1 + B6 + SB3) | 3360 | 3684 | 4008 | 4752 | 4404 | 1120 | 1228 | 1336 | 1584 | 1468 |
| SCB2 (B2 + B7 + SB4) | 4644 | 4932 | 5184 | 6204 | 5340 | 1548 | 1644 | 1728 | 2068 | 1780 |

TABLE 23-continued

| | SOBL | | | | | SIBL | | | | |
|---|---|---|---|---|---|---|---|---|---|---|
| SCCC Block | Scalable Mode 00 | Scalable Mode 01 | Scalable Mode 10 | Scalable Mode 11 | Scalable Mode 11a | Scalable Mode 00 | Scalable Mode 01 | Scalable Mode 10 | Scalable Mode 11 | Scalable Mode 11a |
| SCB3 (B3 + B8) | 4884 | 4884 | 4884 | 4884 | 4884 | 1628 | 1628 | 1628 | 1628 | 1628 |
| SCB4 (B4 + B9 + SB1) | 4296 | 4632 | 4992 | 6072 | 5352 | 1432 | 1544 | 1664 | 2024 | 1784 |
| SCB5 (B5 + B10 + SB2) | 3696 | 4056 | 4428 | 5040 | 4908 | 1232 | 1352 | 1476 | 1680 | 1636 |
| SCB6 (SB5) | 0 | 0 | 0 | 816 | 0 | 0 | 0 | 0 | 272 | 0 |
| | | | | | | | | 1/4 rate | | |
| SCB1 (B1 + B6 + SB3) | 3360 | 3684 | 4008 | 4752 | 4404 | 840 | 921 | 1002 | 1188 | 1101 |
| SCB2 (B2 + B7 + SB4) | 4644 | 4932 | 5184 | 6204 | 5340 | 1161 | 1233 | 1296 | 1551 | 1335 |
| SCB3 (B3 + B8) | 4884 | 4884 | 4884 | 4884 | 4884 | 1221 | 1221 | 1221 | 1221 | 1221 |
| SCB4 (B4 + B9 + SB1) | 4296 | 4632 | 4992 | 6072 | 5352 | 1074 | 1158 | 1248 | 1518 | 1338 |
| SCB5 (B5 + B10 + SB2) | 3696 | 4056 | 4428 | 5040 | 4908 | 924 | 1014 | 1107 | 1260 | 1227 |
| SCB6 (SB5) | 0 | 0 | 0 | 816 | 0 | 0 | 0 | 0 | 204 | 0 |

As above, the PL, the SOBL, and the SIBL in various sizes can be realized according to the block mode. The data written in the tables above is merely exemplary and it is understood that the data is not limited to this example in one or more other exemplary embodiments.

[Initialization]

Meanwhile, when the known data, that is, the training data, is included in the stream as described above, the initialization is performed. That is, an ATSC-M/H transmission system initializes the trellis encoder according to the training sequence to generate and then defines the known byte so that the receiver can recognize the training sequence.

In the group format of the BEM 00 mode, the trellis initialization byte is located on a boundary surface of the sawteeth and the known byte is distributed after that. When the trellis encoding is performed from the top segment to the bottom segment and from the left byte to the right byte, the trellis encoding is performed in the boundary surface between the sawteeth filled with data of a different slot and thus a trellis encoder memory value cannot be predicted in the boundary surface between the sawteeth filled with data of a next current slot. Thus, the trellis encoder should be initialized in every boundary surface of the sawteeth. As shown in FIGS. 56 and 57, the initialization byte can be distributed over each sawteeth boundary of the head region including the blocks B1 and B2, and also over each sawteeth boundary of the tail region including the blocks SB1 through SB4.

When certain two slots are adjacent to each other as the BEM 00, short training data of each head/tail region are located and continuously connected on the same segment, thus serving as one long training data. When the two BEM 00 slots are adjacent to each other and thus the training is concatenated, only the first maximum 12 initialization bytes of the segment in which the training data exists are used as an initialization mode and the initialization byte existing in a portion in which the sawteeth are engaged with each other is input and trellis-encoded like the known byte.

An intermediate initialization byte in the sawteeth-engaged portion, except for the first maximum 12 initialization bytes of the segment, may be input as the known byte or the initialization byte according to whether the BEM 00 slot is adjacent to the same slot or adjacent to a different slot other than the BEM 00 slot. That is, the operation of the trellis encoder may be multiplexed in the normal mode or in the initialization mode during the intermediate initialization byte period. Since the generated symbol differs according to the mode in which the trellis encoder multiplexes the input, the symbol value to be used by the receiver as the training can differ. Accordingly, in order to minimize confusion of the receiver, when two BEM 00 slots are adjacent to each other to construct the long training, based on the symbol generated by multiplexing all of the intermediate initialization bytes to the known byte, when the BEM 00 slot is not adjacent to the same slot, the intermediate initialization byte value to be used in the initialization mode can be determined. That is, the intermediate initialization byte value can be determined to produce the same value as the long training symbol value generated in the case of the concatenation. At this time, the value can be different from the symbol value generated in the concatenation during the first two symbols of the intermediate initialization byte.

As above, the stream processing method of the digital broadcast transmitter for generating the long training sequence on the boundary of the consecutive slots can be realized.

That is, the stream processing method of the transmitter can include a stream generating operation for generating the stream which consecutively arranges the slots including the plurality of blocks and a transmitting operation for encoding and interleaving the stream, and outputting a transport stream.

Herein, when the slots set to the block extension mode 00 for using all of the blocks of the corresponding slot are consecutively arranged, the stream generating operation can place the known data in a preset segment of each of adjacent slots so that the long training sequence is formed on the boundary between the adjacent slots engaged with each other in the form of the sawteeth. The block extension mode 00 is the mode which uses the above-described blocks B1 and B2 in the slot. Accordingly, on the boundary of the next slot, the sawteeth portion of the preceding slot and the sawteeth portion of the following slot are engaged with each other. In this case, the known data is arranged in an appropriate segment position of the preceding slot and in an appropriate segment position of the following slot so that the known data is connected on the sawteeth portions of the two slots. More specifically, when the known data is placed in the 130th segment of the preceding slot and the 15th segment of the following slot, the known data is connected on the boundary to thus form one long training sequence.

When first known data placed in the sawteeth portion of the preceding slot of the adjacent slots and second known data placed in the sawteeth portion of the following slot of the adjacent slots are alternately connected to each other on the boundary, a value of the first known data and a value of the second known data may be preset for forming the long training sequence which is known to the digital broadcast receiver.

Alternatively, the known data may be inserted so as to have the same sequence as the long training sequence used in the slot of the block extension mode 01 in which some block of the corresponding slot is provided to other slots, with reference to the long training sequence.

FIG. 64 illustrates a stream structure before interleaving when the block extension mode is 00 according to an exemplary embodiment, and FIG. 65 illustrates a stream structure after interleaving when the block extension mode is 00 according to an exemplary embodiment.

Meanwhile, when the known data is placed in the form of the long training sequence as described above, it is not necessary to perform the initialization for every known data. Hence, in this case, the method can further include an operation for initializing the trellis encoder before trellis-encoding the known data corresponding to the first portion of the long training sequence.

By contrast, when the slots set to different block extension modes are consecutively arranged, the known data cannot continue on the boundary. Accordingly, in this case, the transmitting operation can initialize the trellis encoder before the known data placed in the sawteeth portion on the boundary between the consecutive slots is trellis-encoded.

Meanwhile, when the known data is arranged and transmitted on the boundary in the form of the long training sequence, a stream processing method of the digital broadcast receiver can be accordingly realized.

That is, the stream processing method of the digital broadcast receiver can include a receiving operation for receiving the transport stream encoded and interleaved with the slots including the plurality of the blocks consecutively arranged, a demodulating operation for demodulating the received transport stream, an equalizing operation for equalizing the demodulated transport stream, and a decoding operation for decoding the new mobile data from the equalized stream.

Herein, each slot of the transport stream can include at least one of the normal data, the existing mobile data, and the new mobile data.

When the slots set to the block extension mode 00 for using all of the blocks in a corresponding slot are consecutively arranged, the transport stream can arrange the known data in a preset segment of each of the adjacent slots so that the long training sequence is formed on the boundary of the adjacent slots engaged with each other in the form of the sawteeth.

As described above, each known data on the boundary between consecutive preceding and following slots can be continued so as to form the long training sequence known to the digital broadcast transmitter.

The long training sequence can have the same sequence as the long training sequence used in the slot of the block extension mode 01 for providing some blocks in the corresponding slot to other slots, with reference to the long training sequence.

The digital broadcast receiver can know whether such a long sequence is used or not by identifying the block extension mode of each slot.

That is, the stream processing method of the digital broadcast receiver can further include an operation for identifying the block extension mode of each slot by decoding the signaling data for each slot. More specifically, the block extension mode can be recorded on the TPC of each slot.

In this case, the digital broadcast receiver can defer the known data detecting and processing until the block extension mode of the next slot is identified, even when the reception of one slot is completed. That is, when the signaling data of the following slot among the adjacent slots is completely decoded and thus the block extension mode of the following slot is identified as 00, the method can include an operation for detecting and processing the known data of the sawteeth portion on the boundary between the adjacent slots as the long training sequence.

According to another exemplary embodiment, the signaling data of each slot may be realized to inform information of adjacent slots in advance.

In this case, the digital broadcast receiver may identify both of the block extension modes of the preceding slot and the following slot by decoding the signaling data of the preceding slot of the adjacent slots.

As such, the stream processing method of the digital broadcast transmitter and the digital broadcast receiver can be performed by the digital broadcast transmitter and the digital broadcast receiver having the structure as shown in the drawings as explained above. For example, the digital broadcast receiver can further include a detector for detecting and processing the known data, in addition to the fundamental components such as receiver, demodulator, equalizer, and decoder. In this case, upon determining that two slots of the block extension mode 00 are received, the detector can detect the long training data placed on the boundary between the slots and use it for the error correction. Also, the detection result may be provided to at least one of the demodulator, the equalizer, and the decoder.

[Location of Training Data Considering RS Parity]

With respect to the segment of the predetermined RS parity value, the receiver can normally operate without causing error only when the pre-calculated RS parity value is changed as the data of the segment is changed during the trellis encoder initialization. When the packet includes the trellis initialization byte, the non-systematic RS parity 20 bytes of the corresponding packet cannot precede the trellis initialization byte. The trellis initialization byte can exist only at a location where this constraint condition is satisfied, and this initialization byte can generate the training data.

As shown in FIGS. 64 and 65, in order to place the trellis initialization byte ahead of the RS parity, the RS parity location is changed differently from the group format of the BEM 01 slot. That is, in the group format of the BEM 01 slot, only the RS parity is located in the first 5 segments among the 208 data segments after interleaving. However, in the case of the BEM 00 slot, the RS parity location can be changed so that a lower portion of the block B2 is filled as shown in FIGS. 64 and 65.

When the changed RS parity is considered, the training data is distributed over the BEM 00 slot such that the first, second and third training data is located in the 7th and 8th segments, the in the 20th and 21st segments, and in the 31st and 32nd segments of the block B1 and B2 region. The changed RS parities can be arranged in the 33rd through 37th segments of the block B1 and B2 region. Also, the 1st, 2nd, 3rd, 4th, and 5th training data can be located in the 134th and 135th segments, the 150th and 151st segments, the 163rd and 164th segments, the 176th and the 177th segments, and the 187th and 188th segments of the tail region, respectively.

When two BEM 00 slots are adjacent to generate the concatenated long training data, the first training data of the block B1 and B2 region can be connected to the third training data of the tail region, the second training data of the block B1 and B2 region can be connected to the 4th training data of the tail region, and the third training data of block B1 and B2 region can be connected to the 5th training data of the tail region.

As described above, the training data can be placed in various fashions and initialized.

The digital broadcast receiver detects the training data from the location where the training data is placed. More specifically, the detector or the signaling decoder as shown in FIG. 52 can detect information indicating the arrangement location of the training data. Thus, the training data can be detected from the identified location and the error can be corrected.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses, transmitters, and receivers can include circuitry, a processor, a microprocessor, etc., and may execute a computer program stored in a computer-readable medium Although a few exemplary embodiments have been shown and described, it will be appreciated by those skilled in the art that changes may be made in these exemplary embodiments without departing from the principles and spirit of the general inventive concept, the scope of which is defined in the appended claims and their equivalents.

The invention claimed is:

1. A stream processing method of a digital broadcast transmitter, the stream processing method comprising:
   generating a stream in which a plurality of slots of different formats is consecutively arranged; and
   encoding and interleaving the generated stream, and outputting the encoded and interleaved stream as a transport stream,
   wherein the generating the stream comprises arranging at least one of training data and dummy data in an orphan region generated according to a difference of the formats between consecutive slots of the plurality of slots.

2. The stream processing method of claim 1, wherein:
   the orphan region is one of:
      a first type orphan region generated in a head portion of a Scalabale Full Channel Mobile Mode (SFCMM) slot when a Core Mobile Mode (CMM) slot and the SFCMM slot of a block extension mode 01 are consecutively arranged, or when a full main slot comprising only the normal data and the SFCMM slot of the block extension mode 01 are consecutively arranged,
      a second type orphan region generated in a tail portion of the CMM slot when the SFCMM slot of the block extension mode 01 and the CMM slot are consecutively arranged, and
      a third type orphan region generated in a body portion of the full main slot when the SFCMM slot of the block extension mode 01 and the full main slot comprising only the normal data are consecutively arranged.

3. The stream processing method of claim 1, wherein, the generating the stream comprises:
   when the new mobile data is placed in the orphan region, adding, to the stream, signaling data indicating a presence and a type of the new mobile data placed in the orphan region.

4. The stream processing method of claim 1, wherein the encoding the stream comprises:
   when the training data is placed in the orphan region, initializing a trellis encoder according to the training data and trellis-encoding, by the initialized trellis encoder, the training data.

5. A digital broadcast transmitter comprising:
   a stream generator which generates a stream in which a plurality of slots of different formats is consecutively arranged; and
   an exciter which encodes and interleaves the generated stream, and outputs the encoded and interleaved stream as a transport stream,
   wherein the stream generator arranges at least one of training data and dummy data in an orphan region generated according to a difference of the formats between consecutive slots of the plurality of slots.

6. The digital broadcast transmitter of claim 5, wherein:
   the orphan region is one of:
      a first type orphan region generated in a head portion of a Scalabale Full Channel Mobile Mode (SFCMM) slot when a Core Mobile Mode (CMM) slot and the SFCMM slot of a block extension mode 01 are consecutively arranged, or when a full main slot comprising only the normal data and the SFCMM slot of the block extension mode 01 are consecutively arranged,
      a second type orphan region generated in a tail portion of the CMM slot when the SFCMM slot of the block extension mode 01 and the CMM slot are consecutively arranged, and
      a third type orphan region generated in a body portion of the full main slot when the SFCMM slot of the block extension mode 01 and the full main slot comprising only the normal data are consecutively arranged.

7. The digital broadcast transmitter of claim 5, wherein, when the new mobile data is placed in the orphan region, the stream generator adds, to the stream, signaling data indicating a presence and a type of the new mobile data placed in the orphan region.

8. The digital broadcast transmitter of claim 5, wherein, when the training data is placed in the orphan region, the exciter initializes a trellis encoder according to the training data and the initialized trellis encoder trellis-encodes the training data.

9. A stream processing method of a digital broadcast receiver, the stream processing method comprising:
   receiving a transport stream encoded and interleaved while a plurality of slots of different formats are consecutively arranged;
   demodulating the received transport stream;
   equalizing the demodulated transport stream; and
   decoding second mobile data from the equalized stream, wherein the transport stream comprises an orphan region generated by a difference of the formats between consecutive slots of the plurality of slots, and at least one of the second mobile data, training data, and dummy data is placed in the orphan region.

10. The stream processing method of claim 9, wherein: the orphan region is one of:
a first type orphan region generated in a head portion of a Scalabale Full Channel Mobile Mode (SFCMM) slot when a Core Mobile Mode (CMM) slot and the SFCMM slot of a block extension mode 01 are consecutively arranged, or when a full main slot comprising only the normal data and the SFCMM slot of the block extension mode 01 are consecutively arranged,
a second type orphan region generated in a tail portion of the CMM slot when the SFCMM slot of the block extension mode 01 and the CMM slot are consecutively arranged, and
a third type orphan region generated in a body portion of the full main slot when the SFCMM slot of the block extension mode 01 and the full main slot comprising only the normal data are consecutively arranged.

11. The stream processing method of claim 9, further comprising:
identifying a presence and a type of data in the orphan region by decoding signaling information.

12. A digital broadcast receiver comprising:
a receiver which receives a transport stream encoded and interleaved while a plurality of slots of different formats is consecutively arranged;
a demodulator which demodulates the received transport stream;
an equalizer which equalizes the demodulated transport stream; and
a decoder which decodes second mobile data from the equalized stream,
wherein the transport stream comprises an orphan region generated by a difference of the formats between consecutive slots of the plurality of slots, and at least one of the second mobile data, training data, and dummy data is placed in the orphan region.

13. The digital broadcast receiver of claim 12, wherein: the orphan region is one of:
a first type orphan region generated in a head portion of a Scalabale Full Channel Mobile Mode (SFCMM) slot when a Core Mobile Mode (CMM) slot and the SFCMM slot of a block extension mode 01 are consecutively arranged, or when a full main slot comprising only the normal data and the SFCMM slot of the block extension mode 01 are consecutively arranged,
a second type orphan region generated in a tail portion of the CMM slot when the SFCMM slot of the block extension mode 01 and the CMM slot are consecutively arranged, and
a third type orphan region generated in a body portion of the full main slot when the SFCMM slot of the block extension mode 01 and the full main slot comprising only the normal data are consecutively arranged.

14. The digital broadcast receiver of claim 12, further comprising:
a signaling decoder which identifies a presence and a type of data in the orphan region by decoding signaling information.

15. The stream processing method of claim 1, wherein the CMM slot is a slot which arranges exiting mobile data in a first region allocated for the exiting mobile data and arranges the normal data in a second region allocated for the normal data; and
the SFCMM slot is a slot which arranges a new mobile data according to a set mode, in at least part of a whole region covering the first region and the second region.

16. The digital broadcast transmitter of claim 5, wherein the CMM slot is a slot which arranges an existing mobile data in a first region allocated for the existing mobile data and arranges the normal data in a second region allocated for the normal data; and
the SFCMM slot is a slot which arranges a new mobile data according to a set mode, in at least part of a whole region covering the first region and the second region.

17. The stream processing method of claim 9, wherein the CMM slot is a slot which arranges first mobile data in a first region allocated for the first mobile data and arranges the normal data in a second region allocated for the normal data; and
the SFCMM slot is a slot which arranges the second mobile data according to a set mode, in at least part of a whole region covering the first region and the second region.

18. The digital broadcast receiver of claim 12, wherein the CMM slot is a slot which arranges first mobile data in a first region allocated for the first mobile data and arranges the normal data in a second region allocated for the normal data; and
the SFCMM slot is a slot which arranges the second mobile data according to a set mode, in at least part of a whole region covering the first region and the second region.

19. A computer readable recording medium having recorded thereon a program executable by a computer for performing the method of claim 1.

20. A computer readable recording medium having recorded thereon a program executable by a computer for performing the method of claim 9.

21. The stream processing method of claim 1, wherein the arranging arranges at least one of training data and dummy data in the orphan region generated in a different region, according to the difference of the formats between consecutive slots of the plurality of slots.

22. The stream processing method of claim 1, wherein no two consecutive slots have a same format.

* * * * *